(12) United States Patent
Enomoto et al.

(10) Patent No.: US 10,972,946 B2
(45) Date of Patent: Apr. 6, 2021

(54) TERMINAL DEVICE, MME, AND CONTROL METHOD

(71) Applicant: SHARP KABUSHIKI KAISHA, Sakai (JP)

(72) Inventors: Masayuki Enomoto, Sakai (JP); Masafumi Aramoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/212,232

(22) Filed: Dec. 6, 2018

(65) Prior Publication Data

US 2019/0110230 A1 Apr. 11, 2019

Related U.S. Application Data

(63) Continuation of application No. 15/506,477, filed as application No. PCT/JP2015/074449 on Aug. 28, 2015.

(30) Foreign Application Priority Data

Sep. 25, 2014 (JP) .................................. 2014-194539

(51) Int. Cl.
*H04W 36/00* (2009.01)
*H04W 12/06* (2021.01)
(Continued)

(52) U.S. Cl.
CPC ... *H04W 36/0033* (2013.01); *H04W 12/0602* (2019.01); *H04W 36/0061* (2013.01);
(Continued)

(58) Field of Classification Search
CPC ......... H04W 36/0033; H04W 36/0061; H04W 36/08
See application file for complete search history.

(56) References Cited

U.S. PATENT DOCUMENTS

| 8,861,426 B2 | 10/2014 | Lim et al. |
| 9,826,389 B2 | 11/2017 | Karampatsis et al. |

(Continued)

FOREIGN PATENT DOCUMENTS

| CA | 2 812 953 A1 | 4/2012 |
| JP | WO2011/129107 A1 | 10/2011 |

(Continued)

OTHER PUBLICATIONS

3GPP TR 22.828 V13.0.0 (Jun. 2014), Technical Report; 3rd Generation Partnership Project; Technical Specification Group Services and System Aspects; Study on co-ordinated Packet data network Gateway (PGW) Change for Selected IP Traffic Offload (CSIPTO), Release 13, 18 pages.

(Continued)

*Primary Examiner* — Ronald B Abelson
(74) *Attorney, Agent, or Firm* — Birch, Stewart, Kolasch & Birch, LLP

(57) ABSTRACT

A user equipment (UE) transmits a packet data network (PDN) connectivity request message to a mobility management entity (MME), receives a PDN connectivity accept message, and establishes a PDN connection with a second local gateway (LGW) in accordance with the PDN connectivity accept message. Thus, it is possible to provide a communication system and the like for a purpose of implementing the optimal communication control for enabling the UE to continue communication by switching a previously established PDN connection to a new PDN connection using a more optimal gateway.

12 Claims, 16 Drawing Sheets

(51) Int. Cl.
*H04W 36/08* (2009.01)
*H04W 36/12* (2009.01)
*H04W 60/04* (2009.01)
*H04W 8/08* (2009.01)
*H04W 36/18* (2009.01)
*H04W 36/32* (2009.01)
*H04W 36/38* (2009.01)

(52) U.S. Cl.
CPC ............ *H04W 36/08* (2013.01); *H04W 8/082* (2013.01); *H04W 36/12* (2013.01); *H04W 36/18* (2013.01); *H04W 36/32* (2013.01); *H04W 36/38* (2013.01); *H04W 60/04* (2013.01)

(56) References Cited

U.S. PATENT DOCUMENTS

| | | | |
|---|---|---|---|
| 2002/0112076 A1* | 8/2002 | Rueda | G06F 15/16 |
| 2003/0058813 A1* | 3/2003 | Viola | H04Q 7/00 |
| 2004/0246933 A1* | 12/2004 | Valko | H04Q 7/24 |
| 2005/0047329 A1* | 3/2005 | Almog | H04L 12/26 |
| 2008/0259873 A1 | 10/2008 | Ahmavaara et al. | |
| 2012/0076121 A1 | 3/2012 | Choi et al. | |
| 2012/0110193 A1 | 5/2012 | Zhou et al. | |
| 2012/0257598 A1 | 10/2012 | Karampatsis et al. | |
| 2012/0269167 A1 | 10/2012 | Velev et al. | |
| 2012/0307799 A1 | 12/2012 | Taleb et al. | |
| 2013/0003698 A1 | 1/2013 | Olvera-Hernandez et al. | |
| 2013/0028172 A1 | 1/2013 | Lim et al. | |
| 2013/0089076 A1 | 4/2013 | Olvera-Hernandez et al. | |
| 2013/0230024 A1 | 9/2013 | Lim et al. | |
| 2014/0003241 A1 | 1/2014 | Kim et al. | |
| 2014/0029579 A1 | 1/2014 | Cho et al. | |
| 2015/0092540 A1 | 4/2015 | Choudhary et al. | |
| 2016/0262058 A1 | 9/2016 | Jeong et al. | |
| 2017/0041968 A1 | 2/2017 | Jin | |
| 2018/0077560 A1 | 3/2018 | Karampatsis et al. | |

FOREIGN PATENT DOCUMENTS

| | | |
|---|---|---|
| JP | 2013-519279 A | 5/2013 |
| JP | 2013/538031 A | 10/2013 |
| JP | 2014-509820 A | 4/2014 |
| JP | 2014-512762 A | 5/2014 |
| JP | 5774022 B2 | 9/2015 |
| KR | 10-2012-0128177 A | 11/2012 |
| WO | WO 2012/044628 A1 | 4/2012 |
| WO | WO 2012/066759 A1 | 5/2012 |
| WO | WO 2012/135793 A2 | 10/2012 |
| WO | WO 2012/138099 A2 | 10/2012 |
| WO | WO 2012/157959 A2 | 11/2012 |
| WO | WO 2012/006417 A2 | 1/2013 |

OTHER PUBLICATIONS

3GPP TR 23.829 V10.0.1 (Oct. 2011), Technical Report, 3rd Generation Partnership Project; Technical Specification Group Services and System Aspects; Local IP Access and Selected IP Traffic Offload (LIPA-SIPTO), Release 10, 43 pages.

3GPP TS 23.401 V10.12.0 (Jun. 2014), Technical Specification, 3rd Generation Partnership Project; Group Services and System Aspects; General Packet Radio Service (GPRS) enhancements for Evolved Universal Terrestrial Radio Access Network (E-UTRAN) access, Release 10, 279 pages.

Non-Final Office Action issued in corresponding U.S. Appl. No. 15/506,477 dated Jun. 6, 2018.

* cited by examiner

HANDOVER COMMAND

| INFORMATION ELEMENT | DIRECTION | TYPE | LENGTH |
|---|---|---|---|
| MESSAGE TYPE | MSC-BSS | M | 1 |
| LAYER 3 INFORMATION | MSC-BSS | M | 11-n |
| CELL ID | MSC-BSS | O | 3-10 |
| INFORMATION FROM NEW BSS TO OLD BSS | MSC-BSS | O | 2-n |
| TALKER PRIORITY | MSC-BSS | O | 2 |
| TRANSPARENT INFORMATION FROM CN TO MS | MSC-BSS | O | 19-n |
| *INDICATOR 1* | *MSC-BSS* | *O* | *1* |

FIG. 9

TRACKING AREA UPDATE REQUEST

| IEI | INFORMATION ELEMENT | TYPE/REFERENCE | PRESENCE | FORMAT | LENGTH |
|---|---|---|---|---|---|
| | PROTOCOL IDENTIFIER | PROTOCOL IDENTIFIER | M | V | 1/2 |
| | SECURITY HEADER TYPE | SECURITY HEADER TYPE | M | V | 1/2 |
| | TRACKING AREA UPDATE REQUEST MESSAGE ID | MESSAGE TYPE | M | V | 1 |
| | EPS UPDATE TYPE | EPS UPDATE TYPE | M | V | 1/2 |
| | NAS KEY SET ID | NAS KEY SET ID | M | V | 1/2 |
| | OLD GUTI | EPS MOBILE ID | M | LV | 12 |
| B- | NON-CURRENT NATIVE NAS KEY SET ID | NAS KEY SET ID | O | TV | 1 |
| 8- | GPRS ENCRYPTION KEY SET SEQUENCE NUMBER | GPRS ENCRYPTION KEY SET SEQUENCE NUMBER | O | TV | 1 |
| 19 | OLD P-TMSI SIGNATURE | P-TMSI SIGNATURE | O | TV | 4 |
| 50 | ADDITIONAL GUTI | EPS MOBILE ID | O | TLV | 13 |
| 55 | NONCE$_E$ | NONCE | O | TV | 5 |
| 58 | UE NETWORK CAPABILITY | UE NETWORK CAPABILITY | O | TLV | 4-15 |
| 52 | LAST VISITED REGISTERED TAI | TRACKING AREA ID | O | TV | 6 |
| 5C | DRX PARAMETER | DRX PARAMETER | O | TV | 3 |
| A- | UPDATE OF REQUIRED UE RADIO CAPABILITY INFORMATION | REQUIRED UE RADIO CAPABILITY INFORMATION | O | TV | 1 |
| 57 | EPS BEARER CONTEXT STATUS | EPS BEARER CONTEXT STATUS | O | TLV | 4 |
| 31 | MS NETWORK CAPABILITY | MS NETWORK CAPABILITY | O | TLV | 4-10 |
| 13 | OLD LOCATION AREA ID | LOCATION AREA ID | O | TV | 6 |
| 9- | TMSI STATUS | TMSI STATUS | O | TV | 1 |
| 11 | MOBILE STATION CLASSIFICATION SYMBOL 2 | MOBILE STATION CLASSIFICATION SYMBOL 2 | O | TLV | 5 |
| 20 | MOBILE STATION CLASSIFICATION SYMBOL 3 | MOBILE STATION CLASSIFICATION SYMBOL 3 | O | TLV | 2-34 |
| 40 | SUPPORTED CODECS | SUPPORTED CODEC LIST | O | TLV | 5-n |
| F- | ADDITIONAL UPDATE TYPE | ADDITIONAL UPDATE TYPE | O | TV | 1 |
| 5D | PREFERENCE OF VOICE AREA AND USAGE CONFIGURATION OF UE | PREFERENCE OF VOICE AREA AND USAGE CONFIGURATION OF UE | O | TLV | 3 |
| E- | OLD GUTI TYPE | GUTI TYPE | O | TV | 1 |
| D- | DEVICE PROPERTIES | DEVICE PROPERTIES | O | TV | 1 |
| C- | MS NETWORK FEATURE SUPPORT | MS NETWORK FEATURE SUPPORT | O | TV | 1 |
| 10 | TMSI BASED NRI CONTAINER | NRI CONTAINER | O | TLV | 4 |
| F1 | T3324 VALUE | GPRS TIMER | O | TV | 2 |
| 6A | T3412 EXTENDED VALUE | GPRS TIMER 3 | O | TLV | 3 |
| | INDICATOR 2 | INDICATOR 2 | O | TV | 1 |

FIG. 11A

TRACKING AREA UPDATE ACCEPT

| IEI | INFORMATION ELEMENT | TYPE/REFERENCE | PRESENCE | FORMAT | LENGTH |
|---|---|---|---|---|---|
|  | PROTOCOL IDENTIFIER | PROTOCOL IDENTIFIER | M | V | 1/2 |
|  | SECURITY HEADER TYPE | SECURITY HEADER TYPE | M | V | 1/2 |
|  | TRACKING AREA ACCEPT MESSAGE ID | MESSAGE TYPE | M | V | 1 |
|  | EPS UPDATE RESULT | EPS UPDATE RESULT | M | V | 1/2 |
|  | SPARE HALF OCTET | SPARE HALF OCTET | M | V | 1/2 |
| 5A | T3412 VALUE | GPRS TIMER | O | TV | 2 |
| 50 | GUTI | EPS MOBILE ID | O | TLV | 13 |
| 54 | TAI LIST | TRACKING AREA ID LIST | O | TLV | 8-98 |
| 57 | EPS BEARER CONTEXT STATUS | EPS BEARER CONTEXT STATUS | O | TLV | 4 |
| 13 | LOCATION AREA ID | LOCATION AREA ID | O | TV | 6 |
| 23 | MS ID | MOBILE ID | O | TLV | 7/10 |
| 53 | EMM CAUSE | EMM CAUSE | O | TV | 2 |
| 17 | T3402 VALUE | GPRS TIMER | O | TV | 2 |
| 59 | T3423 VALUE | GPRS TIMER | O | TV | 2 |
| 4A | EQUIVALENT PLMNs | PLMN LIST | O | TLV | 5-47 |
| 34 | EMERGENCY NUMBER LIST | EMERGENCY NUMBER LIST | O | TLV | 5-50 |
| 64 | EPS NETWORK FEATURE SUPPORT | EPS NETWORK FEATURE SUPPORT | O | TLV | 3 |
| F- | ADDITIONAL UPDATE RESULT | ADDITIONAL UPDATE RESULT | O | TV | 1 |
| 5E | T3412 EXTENDED VALUE | GPRS TIMER 3 | O | TLV | 3 |
| F1 | T3324 VALUE | GPRS TIMER | O | TV | 2 |
|  | *INDICATOR 3* | *INDICATOR 3* | O | V | 1 |

FIG. 11B

PDF CONNECTION REQUEST

| IEI | INFORMATION ELEMENT | TYPE/REFERENCE | PRESENCE | FORMAT | LENGTH |
|---|---|---|---|---|---|
| | PROTOCOL IDENTIFIER | PROTOCOL IDENTIFIER | M | V | 1/2 |
| | EPS BEARER ID | EPS BEARER ID | M | V | 1/2 |
| | PROCEDURE PROCESSING ID | PROCEDURE PROCESSING ID | M | V | 1 |
| | PDN CONNECTION REQUEST MESSAGE ID | MESSAGE TYPE | M | V | 1 |
| | REQUEST TYPE | REQUEST TYPE | M | V | 1/2 |
| | PND TYPE | PDN TYPE | M | V | 1/2 |
| D- | EMS INFORMATION TRANSFER FLAG | EMS INFORMATION TRANSFER FLAG | O | TV | 1 |
| 28 | ACCESS POINT NAME | ACCESS POINT NAME | O | TLV | 3-102 |
| 27 | PROTOCOL CONFIGURATION OPTIONS | PROTOCOL CONFIGURATION OPTIONS | O | TLV | 3-253 |
| C- | DEVICE PROPERTIES | DEVICE PROPERTIES | O | TV | 1 |
| | INDICATOR 4 | INDICATOR 4 | O | V | 1 |

FIG. 14

TERMINAL DEVICE, MME, AND CONTROL METHOD

CROSS-REFERENCE TO RELATED APPLICATIONS

This application is a Continuation of copending application Ser. No. 15/506,477, filed on Feb. 24, 2017, which is the National Phase under 35 U.S.C. § 371 of International Application No. PCT/JP2015/074449, filed on Aug. 28, 2015, which claims the benefit under 35 U.S.C. § 119(a) to Patent Application No. 2014-194539, filed in Japan on Sep. 25, 2014, all of which are hereby expressly incorporated by reference into the present application.

TECHNICAL FIELD

The present invention relates to a terminal device, an MME, and a control method.

BACKGROUND ART

In the 3rd Generation Partnership Project (3GPP), which is a standardization organization for a mobile communication system, a plan is in process to standardize specifications for the Evolved Packet System (EPS) described in Non Patent Literature 1 described below, as a next-generation mobile communication system.

Furthermore, Non Patent Literature 2 described below discloses a method of implementing Selected IP Traffic Offload (SIPTO). SIPTO is a function to provide an offload communication path in which a User Equipment (UE: a terminal device) is connected to an eNodeB (eNB: a base station device) but does not pass through a core network of a mobile communication system. In this case, the UE establishes an offload communication path for SIPTO by using a gateway device close to the position of the UE.

The 3GPP defines a Local GW (LGW) as a gateway device at the time of establishing an offload communication path for SIPTO, and discusses that the UE connecting to the eNB establishes a packet data network (PDN) connection for SIPTO with the LGW and exchanges data with a device on a network via a broadband network by using the PDN connection for SIPTO. It should be noted that upon establishment of the PDN connection for SIPTO, the UE is capable of establishing a communication path with an LGW close to the position of the UE and performing communication by using an optimal offload communication path.

The UE is also capable of continuing communication by changing the eNB in accordance with the movement thereof. In this case, the UE maintains the PDN connection for SIPTO established between the UE and the LGW, and is capable of continuing offload communication by using the PDN connection for SIPTO.

However, it is assumed that a plurality of LGWs are arranged in a communication system. Therefore, there may be an LGW close to the locationof the UE relative to the LGW selected at the time of establishing the PDN connection for SIPTO in accordance with the movement of the UE.

The offload communication path has a higher offload effect when being offloaded from a gateway closer to the position of the UE. Thus, due to the movement of the UE, it may be possible that the PDN connection for SIPTO established by the UE becomes a communication path that is not necessarily optimal.

Taking into consideration the above circumstances, as described in Non Patent Literature 3, the 3 GPP for standardizing the mobile communication system stipulates, as a required condition, a previously established PDN connection is to be switched to a new PDN connection using a more optimal gateway device to continue communication.

CITATION LIST

Non Patent Literature

NPL 1: 3GPP TS23.401 General Packet Radio Service (GPRS) enhancements for Evolved Universal Terrestrial Radio Access Network (E-UTRAN) access NPL 2: 3GPP TR 23.829 Local IP Access and Selected IP Traffic Offload NPL 3: 3GPP TR 22.828 Study on Co-ordinated P-GW change for SIPTO

SUMMARY OF INVENTION

Technical Problem

However, at present, a specific measure of continuing communication by switching a previously established PDN connection to a new PDN connection using a more optimal gateway device has not been revealed.

In addition, as for switching of the communication path, a method having high seamlessness by which disconnection is minimized, for example, is desirable.

The present invention has been made in light of the above circumstances, and it is an object of the present invention to provide a communication system and the like for a purpose of implementing the optimal communication control for enabling the UE to continue communication by switching a previously established PDN connection to a new PDN connection using a more optimal gateway.

Solution to Problem

In order to accomplish the object described above, the present invention is contrived to provide the following measures.

A terminal device is configured to: establish a first PDN connection with a first gateway; transmit a tracking area update request message to a base station and receive, as a response to the tracking area update request message, a tracking area update accept message including identification information indicating that at least a PDN connection is reestablished; transmit, on the basis of the reception of the identification information, to a Mobility Mngement Entity (MME), a PDN connectivity request message for establishing a second PDN connection; establish, on the basis of the transmission of the PDN connectivity request message, the second PDN connection with a second gateway; and delete the first PDN connection after establishing the second PDN connection.

The terminal device is configured to: execute handover from a first base station to a second base station; in the handover, receive a handover command message from the first base station, the handover command message including identification information indicating that at least a tracking area update procedure is executed; and transmit, on the basis of the reception of the identification information, to the second base station, a tracking area update request message.

A terminal device is configured to: establish a first PDN connection with a first gateway; execute handover from a first base station to a second base station; in the handover, receive a handover command message from the first base station, the handover command message including identification information indicating that at least a PDN connection is reestablished; transmit, on the basis of the reception of the identification information, to an MME, a PDN connectivity request message for establishing a first PDN connection; establish, on the basis of the transmission of the PDN connectivity request message, a second PDN connection with a second gateway; and delete the first PDN connection after establishing the second PDN connection.

The terminal device is configured to: establish the first PDN connection by transmitting, to the MME, a PDN connectivity request message including at least an Access Point Name (APN) permitted to establish a PDN connection using a different gateway as an endpoint. The PDN connectivity request message for establishing the second PDN connection is transmitted with at least the APN included therein.

The terminal device is configured to: request establishment of the second PDN connection and deletion of the first PDN connection by transmitting the PDN connectivity request message for establishing the second PDN connection; establish the second PDN connection; and deleting the first PDN connection.

An MME is configured to: receive a tracking area update request message transmitted by a base station in response to transmission of a tracking area update request message by a terminal device having a first PDN connection with a first gateway; transmit, as a response to the tracking area update request message, to the terminal device, a tracking area update accept message including identification information indicating that at least a PDN connection is reestablished; receive, from the terminal device, a PDN connectivity request message for establishing a second PDN connection; establish, on the basis of the reception of the PDN connectivity request message, the second PDN connection between a second gateway and the terminal device; and delete the first PDN connection after establishing the second PDN connection.

The MME is configured to: receive a handover request message from the base station; and transmit, to the base station, a handover command message that is a response to the handover request message and includes identification information for requesting execution of at least a tracking area update procedure.

An MME is configured to: receive, from a base station device, a handover request message for handover of a terminal device having a first PDN connection with a first gateway; transmit, to the base station, a handover command message that is a response to the handover request message and includes identification information indicating that at least a PDN connection is reestablished; receive, from the terminal device, a PDN connectivity request message for establishing a second PDN connection; establish, on the basis of the reception of the PDN connectivity request message, the second PDN connection between a second gateway and the terminal device; and delete the first PDN connection after establishing the second PDN connection.

The MME is configured to: establish the first PDN connection by transmitting, to the MME, a PDN connectivity request message including at least an APN permitted to establish a PDN connection using a different gateway as an endpoint; and receive a PDN connectivity request message for establishing the second PDN connection, the message including at least the APN.

The MME is configured to: on the basis of the reception of the PDN connectivity request message for establishing the second PDN connection, establish the second PDN connection and delete the first PDN connection.

The first PDN connection is a PDN connection for SIPTO.

A method of controlling a terminal device includes the steps of: establishing a first PDN connection with a first gateway; transmitting a tracking area update request message to a base station and receiving, as a response to the tracking area update request message, a tracking area update accept message including identification information indicating that at least a PDN connection is reestablished; transmitting, on the basis of the reception of the identification information, to an MME, a PDN connectivity request message for establishing a second PDN connection; establishing, on the basis of the transmission of the PDN connectivity request message, the second PDN connection with a second gateway; and deleting the first PDN connection after establishing the second PDN connection.

The method includes the steps of: in handover, receiving a handover command message from a first base station, the handover command message including identification information indicating that at least a tracking area update procedure is executed; and transmitting, on the basis of the reception of the identification information, to a second base station, a tracking area update request message.

A method of controlling a terminal device includes the steps of: establishing a first PDN connection with a first gateway; in handover, receiving a handover command message from a first base station, the handover command message including identification information indicating that at least a PDN connection is reestablished; transmitting, on the basis of the reception of the identification information, to an MME, a PDN connectivity request message for establishing the first PDN connection; establishing, on the basis of the transmission of the PDN connectivity request message, a second PDN connection with a second gateway; and deleting the first PDN connection after establishing the second PDN connection.

The method includes the steps of: establishing the first PDN connection by transmitting, to the MME, a PDN connectivity request message including at least an APN permitted to establish a PDN connection using a different gateway as an endpoint; and transmitting the APN included in a PDN connectivity request message for establishing the second PDN connection.

The method includes the steps of: requesting establishment of the second PDN connection and deletion of the first PDN connection by transmitting the PDN connectivity request message for establishing the second PDN connection; establishing the second PDN connection; and deleting the first PDN connection.

A method of controlling an MME includes the steps of: receiving a tracking area update request message transmitted by a base station in response to transmission of a tracking area update request message by a terminal device having a first PDN connection with a first gateway; transmitting, as a response to the tracking area update request message, to the terminal device, a tracking area update accept message including identification information indicating that at least a PDN connection is reestablished; receiving, from the terminal device, a PDN connectivity request message for establishing a second PDN connection; establishing, on the basis of the reception of the PDN connectivity request message, the second PDN connection between a second gateway and the terminal device; and deleting the first PDN connection after establishing the second PDN connection.

The method includes the steps of: receiving a handover request message from the base station; and transmitting, to the base station, a handover command message that is a response to the handover request message and includes identification information for requesting execution of at least a tracking area update procedure.

A method of controlling an MME includes the steps of: receiving, from a base station device, a handover request message for handover of a terminal device having a first PDN connection with a first gateway; transmitting, to the base station, a handover command message that is a response to the handover request message and includes identification information indicating that at least a PDN connection is reestablished; receiving, from the terminal device, a PDN connectivity request message for establishing a second PDN connection; establishing, on the basis of the reception of the PDN connectivity request message, the second PDN connection between a second gateway and the terminal device; and deleting the first PDN connection after establishing the second PDN connection.

The method includes the steps of: establishing the first PDN connection by transmitting, to the MME, a PDN connectivity request message including at least an APN permitted to establish a PDN connection using a different gateway as an endpoint; and receiving the APN included in the PDN connectivity request message for establishing the second PDN connection.

The method includes the steps of: on the basis of the reception of the PDN connectivity request message for establishing the second PDN connection, establishing the second PDN connection; and deleting the first PDN connection.

The first PDN connection is a PDN connection for SIPTO.

Advantageous Effects of Invention

According to the present invention, an UE is capable of continuing communication of the UE by switching a previously established PDN connection with a gateway to a new PDN connection using a more optimal gateway.

BRIEF DESCRIPTION OF DRAWINGS

FIG. 9 is a diagram illustrating a handover command message according to the embodiment.

FIG. 11A is a chart for describing a tracking area update message according to the embodiment.

FIG. 11B is a chart for describing the tracking area update message according to the embodiment.

FIG. 14 is a chart for describing a PDN connectivity request message according to the embodiment.

DESCRIPTION OF EMBODIMENTS

Hereinafter, a preferred embodiment for carrying out the present invention will be described with reference to the drawings. It is noted that as an example, the present embodiment is described in detail by using the drawings of an embodiment of a mobile communication system to which the present invention is applied.

1. First Embodiment

Firstly, a first embodiment to which the present invention is applied will be described with reference to the drawings.

1.1 Overview of Mobile Communication System

Figure 1A:
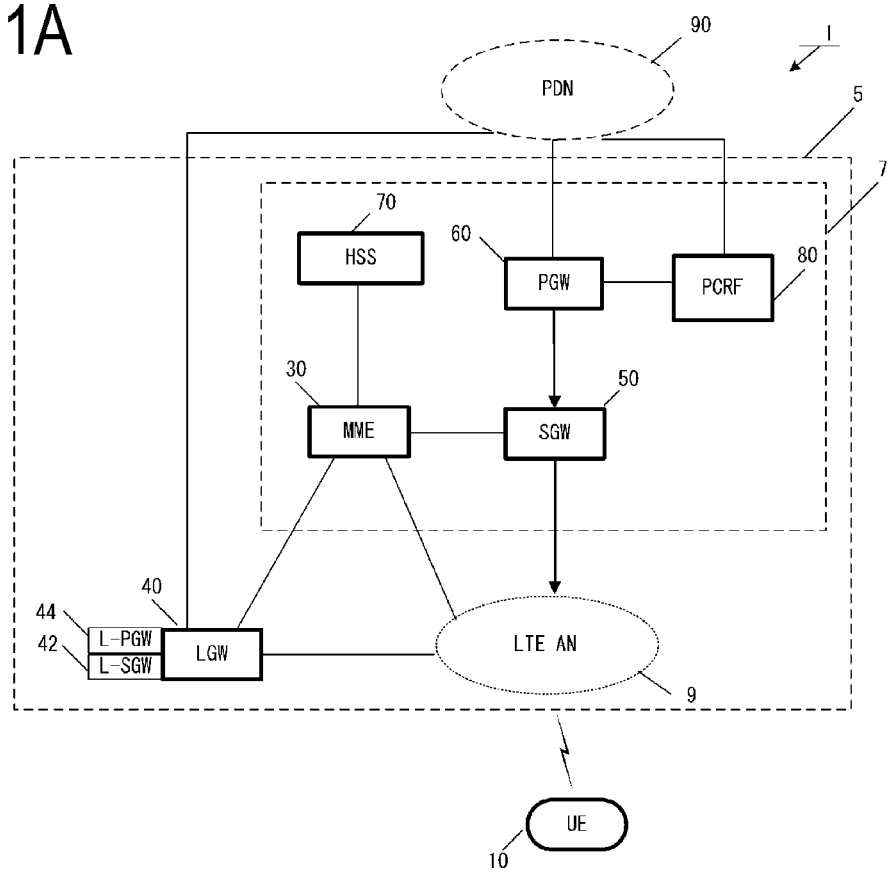
FIGS. 1A and 1B are diagrams illustrating an overview of a mobile communication system 1 according to a first embodiment.

FIG. 1 is a diagram illustrating an overview of a mobile communication system 1 according to the present embodiment. As illustrated in FIG. 1A, the mobile communication system 1 is constituted by connecting an UE (terminal device) 10 and a PDN 90 via an IP mobile communication network 5. The UE 10 is connected to the IP mobile communication network 5 and the IP mobile communication network 5 is connected to the PDN 90.

The IP mobile communication network 5 may be a network constituted of a core network and a radio access network operated by a mobile communication carrier, and may be a broadband network operated by a fixed-line communication carrier, for example. Here, the broadband network may be an IP communication network that is operated by a communication carrier and is connected through ADSL (Asymmetric Digital Subscriber Line) etc. to provide high speed communication through a digital line such as an optical fiber. In addition, the broadband network is not limited thereto, and may be a radio-accessible network through WiMAX (Worldwide Interoperability for Microwave Access) etc.

The UE 10 is a communication terminal that is connected by using an access system such as a Long Term Evolution (LTE) and a Wireless LAN (WLAN). When the UE is provided with a 3GPP LTE communication interface or a WLAN communication interface, the UE is capable of connecting to an IP access network.

A specific example thereof includes a mobile phone terminal and a smart phone, as well as a tablet type computer, personal computer, and home electric appliance that are provided with a communication function.

The PDN 90 refers to a network providing a network service by which data is exchanged by a packet, for example, the Internet and IMS. Furthermore, the PDN 90 may be a network providing a group communication service such as a group call.

The UE 10 connects to the IP mobile communication network to establish a communication path, and establish connectivity with the PDN 90. Thus, the UE 10 implements data exchange with the PDN 90.

The PDN 90 is connected to the IP access network by using a wired line, etc. For example, the PDN 90 is comprised of ADSL, an optical fiber, etc. However, the PDN 90 is not limited thereto, and may be a radio access network such as an LTE, a WLAN, WiMAX, etc.

1.1.1 Constitution Example of IP Mobile Communication Network

As illustrated in FIG. 1, the mobile communication system 1 is constituted of the UE 10, the IP mobile communication network 5, and the PDN 90.

The IP mobile communication network 5 is constituted of a core network 7 and the radio access network.

The core network 7 includes an MME 30, an Local Gateway (LGW) 40, an Serving Gateway (SGW) 50, a Packet Data Network Gateway (PGW) (access control device) 60, an Home Subscriber Server (HSS) 70, and a Policy and charging rules function (PCRF) 80.

It should be noted that in the core network 7, a plurality of MMEs 30, such as an MME 30A and an MME 30B, may be arranged.

Further, in the core network 7, a plurality of SGWs 50, such as an SGW 50A and an SGW 50B, may be arranged.

Furthermore, in the core network 7, a plurality of PGWs 60, such as a PGW 60A and a PGW 60B, may be arranged.

Furthermore, in the core network 7, a plurality of LGWs 40, such as an LGW 40A and an LGW 40B, may be arranged. In addition, the LGW 40 may be included into a core network and arranged, or may be included in the radio access network and arranged.

The radio access network is connected to the core network 7.

Furthermore, the UE 10 is capable of wirelessly connecting to the radio access network.

The radio access network is capable of constituting an LTE access network (LTE AN) 9 connectable to the LTE access system. The LTE AN 9 may be a network including a base station device using the LTE access system, may be an access network in a public network, or may be a home network configured at home.

It is noted that each device is constituted in much the same way as in conventional devices in the mobile communication system using an EPS, and thus, detail description thereof is omitted. The functions thereof can be simply described as follows: the PGW 60 is connected to the PDN 90, the SGW 50, and the PCRF 80, and delivers user data by functioning as a gateway device between the PDN 90 and the core network 7.

The SGW 50 is connected to the PGW 60, the MME 30, and the LTE AN 9, and delivers user data by functioning as a gateway device between the core network 7 and the LTE AN 9.

The PGW 60 is a gateway device connecting the core network 7 and the PDN 90, and delivers user data. It should be noted that the PGW 60 is capable of establishing a PDN connection with the UE 10 and implementing data exchange, by using the PDN connection, with a communication device arranged in the UE 10 and the PDN 60. The LGW 40 is connected to the MME 30, the LTE AN 9, and the PDN 90, and delivers user data by functioning as a gateway device for the PDN 90. In addition, the LGW 40 may be connected to a broadband network, and may be connected to the PDN 90 via the broadband network. Thus, the LGW 40 is a gateway device establishing, with the UE 10, a communication path for offload. That is, the LGW 40 is an endpoint of a PDN connection for SIPTO established by the UE 10, and is a device executing offload to the broadband network and the PDN 90.

It is noted that the LGW 40 may be included in an access network such as the LTE AN 9, and the LGW 40 may be constituted with an eNB 20 included in the LTE AN 9, as a single device.

It is noted that the LGW 40 may include two function units, a Local-PGW (L-PGW) 44 and a Local-SGW (L-SGW) 42. In addition, the L-PGW 44 and the L-SGW 42 may be included in different devices.

In this case, the L-PGW 44 is connected to the MME 30, the LTE AN 9, and the PDN 90, and delivers user data by functioning as a gateway device for the PDN 90. Furthermore, the L-PGW 44 may be connected to a broadband network, and may be connected to the PDN 90 via the broadband network. Thus, the LGW 40 is a gateway device establishing, with the UE 10, a communication path for offload. That is, the L-PGW 44 is an endpoint of a PDN connection for SIPTO established by the UE 10, and is a device executing offload to the broadband network and the PDN 90.

In addition, the L-SGW 42 is an intermediate device between the eNB 20 and the L-PGW 44. That is, the L-SGW 42 may be a gateway device connecting the eNB 20 and the L-PGW 44.

It should be noted that both the L-PGW 44 and the L-SGW 42 may be included in an access network such as the LTE AN 9. Furthermore, the L-SGW 42 may be constituted with the eNB 20 included in the LTE AN 9 as a single device, and the L-PGW 44 may be constituted as an independent device.

Alternatively, the L-PGW 44 and the L-SGW 42 may be included in the core network 7.

The MME 30 is connected to the SGW 50, the LTE AN 9, and the LGW 40, and is a control device performing location management and access control of the UE 10 via the LTE AN 9.

The HSS 70 is connected to the SGW 50 and an AAA 55, and manages subscriber information.

The PCRF 80 is connected to the PGW 60, and manages QoS for data delivery.

Figure 1B:
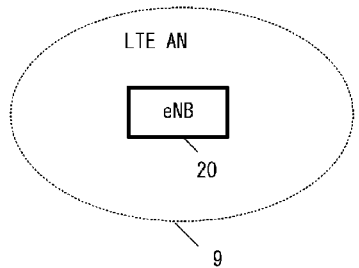
Figure 2:
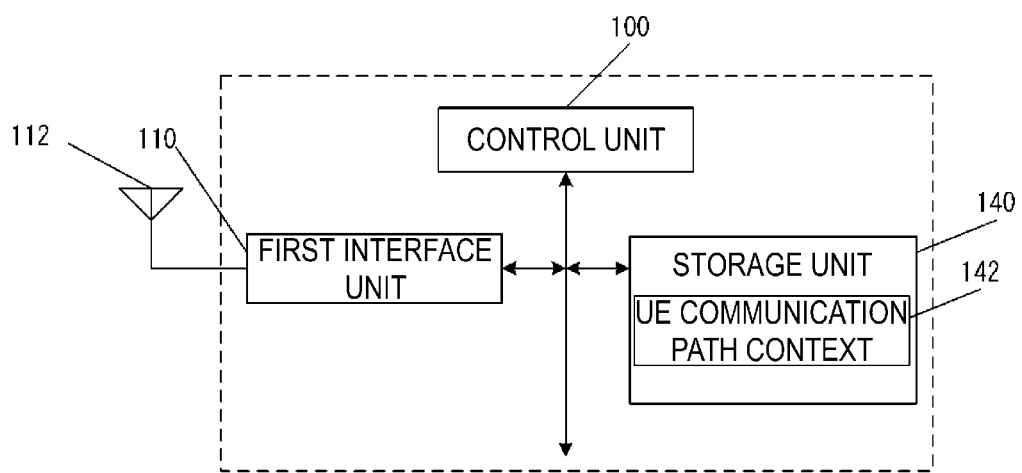
FIG. 2 is a diagram illustrating a functional constitution of a UE according to an embodiment.

Meanwhile, as illustrated in FIG. 1B, a radio access network includes devices to which the UE 10 actually connects (for example, a base station device), and the like. Various devices adapted to the radio access network are considered as devices used in these connections; however, in the present embodiment, the LTE AN 9 includes the eNB 20. The eNB 20 is a radio base station to which the UE 10 connects in an LTE access system, and the LTE AN 9 may include one or a plurality of radio base stations.

It should be noted that in the present specification, the UE 10 being connected to a radio access network refers to the UE 10 being connected to a base station device included in the radio access network, and data, signals, and the like being exchanged also traverse those base station devices.

For example, the UE 10 being connected to the LTE AN 9 refers to the UE 10 connected via the eNB 20.

1.2 Device Constitution

Next, the constitution of each device will be described briefly by using the drawings.

1.2.1 UE Constitution

Figure 3:
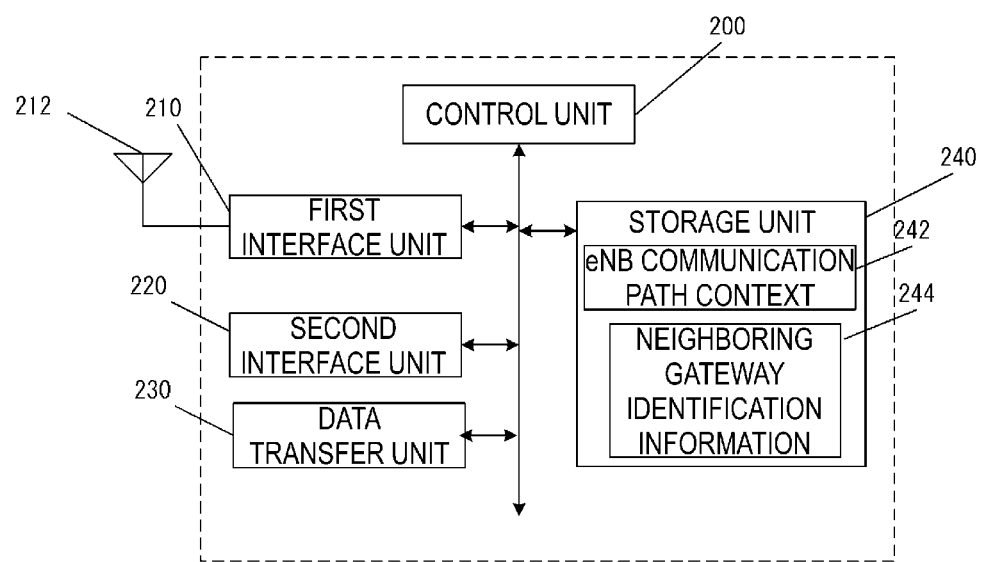
FIG. 3 is a diagram illustrating a functional constitution of an eNB according to the embodiment.
Figure 4:
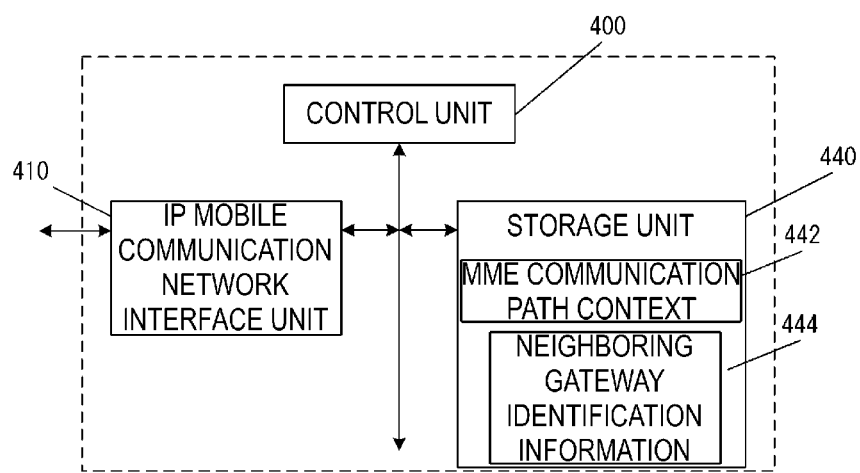
FIG. 4 is a diagram illustrating a functional constitution of an MME according to the embodiment.

A functional constitution of the UE 10 according to the present embodiment will be described on the basis of FIG. 3. In the UE 10, a first interface unit 110 and a storage unit 140 are connected to a control unit 100 via a bus.

The control unit 100 is a function unit configured to control the UE 10. The control unit 100 implements various processes by reading out and executing various information and various programs stored in the storage unit 140.

The first interface unit 110 is a function unit that connects to the LTE AN 9 by an LTE access system and implements data exchange through radio communication. An external antenna 112 is connected to the first interface unit 110 in order to perform data exchange by the LTE access system.

The storage unit 140 is a function unit that stores a program, data, etc. required for various operations of the UE 10. The storage unit 140 is comprised of a semiconductor memory, a Hard Disk Drive (HDD), etc., for example. In addition, the storage unit 140 stores a UE communication path context 142.

The UE communication path context 142 is a group of information stored by corresponding to a communication path established by the UE, and may include an Access Point Name (APN), a bearer ID, a PDN connection ID, a Tunnel Endpoint Identifier (TEID), base station identification information, service identification information, group identification information, information indicating a capability of establishing a PDN connection for SIPTO that is an offload communication path (capability information 1), permission information indicating that a communication carrier permits the UE 10 to establish a PDN connection for SIPTO that is an offload communication path (permission information 1), and the like.

Here, the capability information 1 may be capability information indicating that a capability of establishing a communication path for SIPTO and a capability of switching to a PDN connection having a different gateway are provided.

Alternatively, the capability information indicating that a capability for establishing a communication path for SIPTO is provided may be stored as the capability information 1, and the capability information indicating that a capability for switching to a PDN connection having a different gateway is provided may be managed as capability information 2.

Here, the permission information 1 may be permission information indicating that the communication carrier permits establishment of a communication path for SIPTO and switching to a PDN connection having a different gateway.

Alternatively, the permission information that permits establishment of a communication path for SIPTO may be stored as the permission information 1, and the permission information indicating that the communication carrier permits switching to a PDN connection having a different gateway may be managed as permission information 2.

It should be noted that the UE 10 may establish a plurality of communication paths. That is, the UE 10 may create and manage the UE communication path context 142 for each established PDN connection.

The APN is identification information that is used for selecting a gateway device serving as an endpoint of a PDN connection established by the UE 10 in the IP mobile communication network 5. Furthermore, the APN may be identification information that corresponds to the PDN 90. When different PDNs 90 are constituted for each service such as an IMS and video distribution, the APN may be used as identification information that identifies a service. It should be noted that an APN for offload communication capable of establishing a SIPTO capable PDN connection and an APN not performing offload communication may be managed as different APNs. In this case, a gateway selected in the APN for offload may be the LGW 40, and a gateway selected in the APN not performing offload communication may be the PGW 60 included in the core network 7.

In addition, the APN may correspond to permission information that permits switching to a PDN connection using a different gateway as an endpoint.

For example, an APN 1 is an APN capable of establishing a PDN connection for SIPTO and is an APN in which switching to a PDN connection using a different gateway as an endpoint is not permitted, an APN 2 is an APN capable of establishing a PDN connection for SIPTO and is an APN in which switching to a PDN connection using a different gateway as an endpoint is permitted, an APN 3 is an APN not capable of establishing a PDN connection for SIPTO and is an APN in which switching to a PDN connection using a different gateway as an endpoint is not permitted, and an APN 4 is an APN not capable of establishing a PDN connection for SIPTO and is an APN in which switching to a PDN connection using a different gateway as an endpoint is permitted.

It should be noted that the UE 10 may hold a plurality of such APNs and establish a PDN connection corresponding to each APN. Thus, the UE 10 is capable of establishing a plurality of PDN connections. For example, a PDN connection for offload established by using the APN 1 and a PDN connection for communication via the core network 7 established by using the APN 3 may be established.

It should be noted that establishing a PDN connection by using an APN may mean that the UE 10 transmits, including at least an APN, a PDN connectivity request message to the MME 30 and establishes a PDN connection on the basis of the transmitted PDN connectivity request.

The bearer ID is information that identifies a radio bearer that is a radio communication path between the UE 10 and the eNB 20, the radio communication path being established by the UE 10 when connecting to the eNB 20 in the LTE AN 9.

The bearer ID may be an EPS bearer ID, radio bearer ID, or a Linked Bearer ID (LBI). It should be noted that the LBI is information associated with the bearer ID.

Furthermore, the UE 10 may manage, as a default bearer, a bearer ID for a bearer assigned when connecting to the PDN for the first time, and if another bearer is assigned in the same PDN connection, the UE 10 may manage the another bearer as the EPS bearer ID.

The PDN connection ID is information that identifies a PDN connection that is a logical path with the PGW 60 or the LGW 40 established by the UE 10. The UE 10 may manage a PDN connection ID announced from the MME 30, or in order for the UE 10 to manage a PDN connection, the UE 10 may individually configured and manage a PDN connection ID.

Furthermore, if the UE 10 is announced, from a network (the MME 30 or the eNB 20), of a PDN connection ID for a non-optimal first PDN connection, the UE 10 may utilize the PDN connection ID to start a PDN connectivity procedure. That is, the UE 10 may transmit a PDN connectivity request wherein a PDN connection ID announced from the MME 30 or the eNB 20. It is noted that by including the PDN connection ID, it may indicate reestablishment of a PDN connection for SIPTO.

It is noted that the PDN connection ID may be managed by associating with the APN. By associating the PDN connection ID with the APN, if a non-optimal PDN connection ID is announced from the network (the MME 30 or the eNB 20), the PDN connectivity procedure may be started by utilizing the APN associated with the PDN connection ID. That is, the UE 10 may transmit the PDN connectivity request including therein the APN associated with the PDN connection ID announced from the MME 30 or the eNB 20.

Furthermore, if the APN is announced from the network (the MME 30 or the eNB 20), the UE 10 may start the PDN connectivity procedure by utilizing the announced APN. That is, the UE 10 may transmit the PDN connectivity request that includes the APN announced from the MME 30 or the eNB 20.

Furthermore, the UE 10 may associate the PDN connection ID, the APN, and an IP address assigned from the network (the MME 30 or the eNB 20), and manage the same. It should be noted that the IP address may be a PDN address.

By associating the APN and the IP address, if the IP address is announced, the UE 10 may utilize the APN associated with the IP address to start the PDN connectivity procedure. That is, the UE 10 may transmit the PDN connectivity request that includes the APN associated with the IP address announced from the MME 30.

Here, the UE 10 may transmit the PDN connectivity request including therein the IP address (PDN address) and the APN.

Furthermore, the UE 10 may associate the PDN connection, the APN, and the bearer ID assigned from the network (the MME 30 or the eNB 20), and manage the same. By associating the PDN connection ID, the APN, and the bearer ID, if the bearer ID is announced from the network (the MME 30 or the eNB 20), the PDN connectivity procedure may be started by utilizing the APN associated with the bearer ID. That is, the UE 10 may transmit the PDN connectivity request that includes the APN associated with the bearer ID announced from the MME 30 or the eNB 20.

Furthermore, if the bearer ID is announced from the network (the MME 30 or the eNB 20) to the UE 10, the UE 10 may utilize the bearer ID to start the PDN connectivity procedure. That is, the UE 10 may transmit the PDN connectivity request that includes the bearer ID announced from the MME 30 or the eNB 20.

It should be noted that the UE 10 may indicate reestablishment of the PDN connection for SIPTO by including the bearer ID in the PDN connectivity request.

It is noted that a method of managing the PDN connection has been described by utilizing the PDN connection in the above description; however, the PDN connection ID may not be managed as long as the bearer ID, APN, IP address, etc. are associated and managed for each PDN connection.

The TEID is identification information of a tunnel communication path constituting the PDN connection and used for delivering user data. The TEID may be identification information of a tunnel communication path established on the basis of a GTP protocol, a Mobile IP protocol, a Proxy Mobile IP protocol.

The base station identification information may be information that identifies the eNB 20. Furthermore, the base station identification information may be constituted by combining a base station identification code and a carrier identification code that identifies a mobile communication carrier providing a communication service. In this way, it is possible to make the base station identification information unique in a plurality of mobile communication networks provided by a plurality of mobile communication carriers.

The service identification information is information that identifies a service provided in the IP mobile communication network 5 by a mobile communication carrier. The service identification information may be the APN, or may be service domain identification information such as a Fully Qualified Domain Name (FQDN). The service identification information is not limited thereto, and may be identification information corresponded to a service. In addition, a service may be a voice communication service based on the IMS or a video distribution service, and may be a service providing a group call. The service identification information is identification information that identifies such services.

Furthermore, service identification information capable of establishing a PDN connection for SIPTO and service identification information capable of switching to a PDN connection having a different gateway may be managed.

The group identification information may be information that identifies a group when two or more communication terminals constitute a group and perform communication among groups. Furthermore, if there is a plurality of contents to be distributed to the group, the group identification information may be information that identifies these contents.

For example, the group identification information may be information that identifies a terminal group when performing a broadcast call among a plurality of communication terminals. Alternatively, the group identification information may be information that identifies a session for a call. Or, the group identification information may be identification information that identifies a terminal receiving video distribution as a group when video is distributed to a plurality of communication terminals, and may be identification information that identifies distribution video when there is a plurality of videos.

The group identification information may be an IP multicast address, and may be a Temporary Mobile Subscriber Identity (TMSI) that is a temporary ID assigned by a communication carrier and used for user authentication. The group identification information is not limited thereto, and may be information that identifies a group, such as a mail address.

1.2.2 eNB Constitution

A functional constitution of the eNB 20 according to the present embodiment will be described on the basis of FIG. 5. In the eNB 20, a first interface unit 210, a second interface unit 220, a data transfer unit 230, and a storage unit 240 are connected to a control unit 200 via a bus.

The control unit 200 is a function unit configured to control the eNB 20. The control unit 200 implements various processes by reading out and executing various information and various programs stored in the storage unit 240.

The first interface unit 210 is a function unit that establishes a radio communication path with the UE 10 by the LTE access system and implements data exchange through radio communication. An external antenna 212 is connected to the first interface unit 210.

The second interface unit 220 is connected to a core network or the core network 7 by wired connection. The connection to the core network 7 may be performed by Ethernet (registered trademark), an optical fiber cable, etc.

The storage unit 240 is a function unit that stores a program, data, etc. required for various operations of the eNB 20. The storage unit 240 is constituted of a semiconductor memory, an HDD, etc., for example. In addition, the storage unit 240 stores an eNB communication path context 242 and close gateway identification information 244.

The eNB communication path context 242 is a group of information stored by corresponding to a communication path established with the UE 10, and may include an APN, a bearer ID, a PDN connection ID, a TEID, base station identification information, service identification information, group identification information, and the like.

The APN is identification information that is used for selecting a gateway device serving as an endpoint of a PDN connection established by the UE 10 in the IP mobile communication network 5. Furthermore, the APN may be identification information corresponding to the PDN 90. When different PDNs 90 are used for each service such as an IMS and video distribution, the APN may be used as identification information that identifies a service. It should be noted that an APN for offload communication capable of establishing a SIPTO capable PDN connection and an APN not performing offload communication may be managed as different APNs. In this case, a gateway selected in the APN for offload may be the LGW 40, and a gateway selected in the APN not performing offload communication may be the PGW 60 included in the core network 7.

In addition, the APN may correspond to permission information that permits switching to a PDN connection using a different gateway as an endpoint.

For example, an APN 1 is an APN capable of establishing a PDN connection for SIPTO and is an APN in which switching to a PDN connection using a different gateway as an endpoint is not permitted, an APN 2 is an APN capable of establishing a PDN connection for SIPTO and is an APN in which switching to a PDN connection using a different gateway as an endpoint is permitted, an APN 3 is an APN not capable of establishing a PDN connection for SIPTO and is an APN in which switching to a PDN connection using a different gateway as an endpoint is not permitted, and an APN 4 is an APN not capable of establishing a PDN connection for SIPTO and is an APN in which switching to a PDN connection using a different gateway as an endpoint is permitted.

The bearer ID is information that identifies a radio bearer that is a radio communication path between the UE 10 and the eNB 20, the radio communication path being established by the UE 10 when connecting to the eNB 20. The bearer ID may be an EPS bearer ID, and may be a radio bearer ID.

The PDN connection ID is information that identifies a PDN connection that is a logical path with the PGW 60 or the LGW 40 established by the UE 10.

The TEID is identification information of a tunnel communication path constituting the PDN connection and used for delivering user data. The TEID may be identification information of a tunnel communication path established on the basis of a GTP protocol, a Mobile IP protocol, a Proxy Mobile IP protocol.

The base station identification information may be information that identifies the eNB 20. Furthermore, the base station identification information may be constituted by combining a base station identification code and a carrier identification code that identifies a mobile communication carrier providing a communication service. In this way, it is possible to ensure that the base station identification information is unique in a plurality of mobile communication networks provided by a plurality of mobile communication carriers.

The service identification information is information that identifies a service provided in the IP mobile communication network 5 by a mobile communication carrier. The service identification information may be the APN, or may be service domain identification information such as an FQDN. The service identification information is not limited thereto, and may be identification information that corresponds to a service. In addition, a service may be a voice communication service based on the IMS or a video distribution service, and may be a service providing a group call. The service identification information is identification information that identifies such services.

Furthermore, service identification information capable of establishing a PDN connection for SIPTO and service identifier capable of switching to a PDN connection using a different gateway as an endpoint may be managed.

The group identification information may be information that identifies a group when two or more communication terminals constitute a group and perform communication among groups. Furthermore, if there is a plurality of contents to be distributed to the group, the group identification information may be information that identifies these contents.

For example, the group identification information may be information that identifies a terminal group when performing a broadcast call among a plurality of communication terminals. Alternatively, the group identification information may be information that identifies a session for a call. Or, the group identification information may be identification information that identifies a terminal receiving video distribution as a group when video is distributed to a plurality of communication terminals, and may be identification information that identifies distribution video when there is a plurality of videos.

The group identification information may be an IP multicast address, and may be a TMSI that is a temporary ID assigned by a communication carrier and used for user authentication. The group identification information is not limited thereto, and may be information that identifies a group, such as a mail address.

The eNB communication path context 242 may be held for each communication path. For example, if there is a plurality of communication paths established with the UE 10, the eNB communication path context 242 may be held for each communication path.

Here, the base station information of the eNB communication path context may store each piece of information that identifies the UE 10 and information that identifies the eNB 20.

Meanwhile, the close gateway identification information 244 manages an LGW address of the LGW 40 to which the eNB 20 is connected. When managing the close gateway identification information 244, the eNB 20 may send to the MME 30, the close gateway identification information 244 in a handover procedure. When managing the close gateway identification information 244, the eNB 20 may announce, to the MME 30, the close gateway identification information 244 in a tracking area procedure. When managing the close gateway identification information 244, the eNB 20 may send to the MME 30, the close gateway identification information 244 in the PDN connectivity procedure.

When sending the close gateway identification information 244 to the MME 30, the eNB 20 may cause the MME 30 to detect that the PDN connection is not optimal. When sending the close gateway identification information 244 to the MME 30, the eNB 20 may cause the MME 30 to utilize the close gateway identification information 244 for GW selection in the PDN connectivity procedure.

In addition, the close gateway identification information 244 stores identification information of a neighboring gateway of the eNB 20. The identification information of a gateway may be an IP address of the LGW, and may manage a Local HeNB ID (LHN ID). It should be noted that the LHN ID is a network identifier indicating the LGW 40 or a network of the eNB 20. The MME 30 is capable of designating a gateway on the basis of the LHN ID by storing the LHN ID by corresponding to a gateway address.

Furthermore, when managing the LHN ID, by announcing, to the MME 30, the LHN ID, the eNB 20 may cause the MME 30 to detect that the PDN connection is not optimal. By sending the LHN ID to the MME 30, the eNB 20 may cause the MME 30 to utilize the LHN ID for the GW selection in the PDN connectivity procedure.

In addition, the identification information of a gateway may store different information for each eNB 20. For example, an eNB 20A may store an IP address of an LGW 40A, and an eNB 20B may store an IP address of an LGW 40B.

It should be noted that the identification information of a gateway may be an address of the L-PGW 44. For example, the eNB 20A may store an IP address of an L-PGW 44A, and the eNB 20B may store an IP address of an L-PGW 44B.

In addition, the identification information of a gateway may be an IP address of the PGW 60. For example, the eNB 20A may store an IP address of a PGW 60A, and the eNB 20B may store an IP address of a PGW 60B.

The data transfer unit 230 is a function unit that transfers received data received from the UE 10 via the first interface unit 210 to the IP mobile communication network via the second interface unit 220, then transfers received data to the UE 10 received via the second interface unit 220 to the UE 10 by using the first interface unit 210.

1.2.3 MME Constitution

The MME 30 is a control device that determines permission or non-permission regarding establishment of the communication path for the UE 10 and service provision.

FIG. 5 illustrates a functional constitution of the MME 30. In the MME 30, an IP mobile communication network interface unit 410 and a storage unit 440 are connected to a control unit 400 via a bus.

The control unit 400 is a function unit configured to control the UE 10.

The control unit 400 implements various processes by reading out and executing various programs stored in the storage unit 440.

The IP mobile communication network interface unit 410 is a function unit through which the MME 30 connects to the IP mobile communication network 5.

The storage unit 440 is a function unit that stores a program, data, etc. required for various operations of the UE 10. The storage unit 440 is constituted of a semiconductor memory, an HDD, etc., for example. In addition, the storage unit 440 stores an MME communication path context 442 and close gateway identification information 444.

The MME communication path context 442 is a group of information stored by directly corresponding to a communication path established between the UE 10 and the eNB 20, and may include an APN, a bearer ID, a PDN connection ID, a TEID, base station identification information, service identification information, group identification information, information indicating a capability of the UE, permission information for the UE, and the like.

The APN is identification information that is used for selecting a gateway device serving as an endpoint of a PDN connection established by the UE 10 in the IP mobile communication network 5. Furthermore, the APN may be identification information that corresponds to the PDN 90. When different PDNs 90 are constituted for each service such as an IMS and video distribution, the APN may be used as identification information that identifies a service. It is noted that an APN for offload communication capable of establishing a SIPTO capable PDN connection and an APN not performing offload communication may be managed as different APNs. In this case, a gateway selected in the APN for offload may be the LGW 40, and a gateway selected in the APN not performing offload communication may be the PGW 60 included in the core network 7.

In addition, the APN may be corresponded to permission information that permits switching to a PDN connection using a different gateway as an endpoint.

For example, an APN 1 is an APN capable of establishing a PDN connection for SIPTO and is an APN in which switching to a PDN connection using a different gateway as an endpoint is not permitted, an APN 2 is an APN capable of establishing a PDN connection for SIPTO and is an APN in which switching to a PDN connection using a different gateway as an endpoint is permitted, an APN 3 is an APN not capable of establishing a PDN connection for SIPTO and is an APN in which switching to a PDN connection using a different gateway as an endpoint is not permitted, and an APN 4 is an APN not capable of establishing a PDN connection for SIPTO and is an APN in which switching to a PDN connection using a different gateway as an endpoint is permitted.

The MME 30 manages the APN available for the UE for each UE. There may be a plurality of APNs that are available for the UE. For example, the MME 30 may perform management such that a connection using the APN 1, the APN 2, the APN 3, and the APN 4 is permitted to the UE 10.

The bearer ID may be information that identifies a radio bearer that is a radio communication path between the UE 10 and the eNB 20, the radio communication path established by the UE 10 when connecting to the eNB 20 if the UE 10 connects to the eNB 20. The bearer ID may be an EPS bearer ID or a radio bearer ID.

In addition, the MME 30 may manage, as a default bearer, a bearer ID for a bearer assigned when connecting to the PDN for the first time, and when assigning another bearer in the same PDN connection, the MME 30 may manage the other bearer as the EPS bearer ID.

The PDN connection ID is information that identifies a PDN connection that is a logical path to the PGW 60 established by the UE 10. The MME 30 may be assigned a PDN connection ID from the PGW 60, and may manage the PDN connection ID. The MME 30 may announce, to the UE 10, the PDN connection ID assigned from the PGW 60.

The TEID is identification information of a tunnel communication path constituting the PDN connection and used for delivering user data. The TEID may be identification information of a tunnel communication path established on the basis of a GTP protocol, a Mobile IP protocol, a Proxy Mobile IP protocol.

The base station identification information may be information that identifies the eNB 20. Furthermore, the base station identification information may be constituted by combining a base station identification code and a carrier identification code that identifies a mobile communication carrier providing a communication service. In this way, it is possible to ensure that the base station identification information is unique in a plurality of mobile communication networks provided by a plurality of mobile communication carriers.

The service identification information is information that identifies a service provided in the IP mobile communication network 5 by a mobile communication carrier. The service identification information may be the APN or service domain identification information such as an FQDN. The service identification information is not limited thereto, and may be identification information corresponded to a service. In addition, a service may be a voice communication service based on the IMS or a video distribution service, and may be a service providing a group call. The service identification information is identification information that identifies such services. Furthermore, the service identification information may be service identification information capable of establishing a SIPTO capable PDN connection or service identification information capable of switching to a PDN connection using a different gateway as an endpoint.

The group identification information may be information that identifies a group when two or more communication terminals constitute a group and perform communication among groups. Furthermore, if there is a plurality of contents to be distributed to the group, the group identification information may be information that identifies these contents.

For example, the group identification information may be information that identifies a terminal group when performing a broadcast call among a plurality of communication terminals. Alternatively, the group identification information may be information that identifies a session for a call. Or, the group identification information may be identification information that identifies a terminal receiving video distribution as a group when video is distributed to a plurality of communication terminals, and may be identification information that identifies distribution video when there is a plurality of videos.

The group identification information may be an IP multicast address or a TMSI that is a temporary ID assigned by a communication carrier and used for user authentication. The group identification information is not limited thereto, and may be information that identifies a group, such as a mail address.

The MME communication path context 442 may be held for each communication path. For example, when the UE 10 establishes a plurality of communication paths with the eNB 20, the MME communication path context 442 may be held for each communication path.

In addition, the close gateway identification information 444 stores identification information of a neighboring gateway of the eNB 20.

The identification information of a gateway may be an IP address of the LGW, and may manage an LHN ID. It should be noted that the LHN ID is a network identifier indicating the LGW 40 or a network of the eNB 20. The MME 30 is capable of designating a gateway on the basis of the LHN ID by storing the LHN ID by corresponding to a gateway address.

Furthermore, when managing the LHN ID, by announcing, to the MME 30, the LHN ID, the eNB 20 may cause the MME 30 to detect that the PDN connection is not optimal. By announcing, to the MME 30, the LHN ID, the eNB 20 may cause the MME 30 to utilize the LHN ID for the GW selection in the PDN connectivity procedure.

In addition, the identification information of a gateway may store different information for each eNB 20. For example, the eNB 20A may store the IP address of the LGW 40A, and the eNB 20B may store the IP address of the LGW 40B.

It should be noted that the identification information of a gateway may be an address of the L-PGW 44. For example, the eNB 20A may store the IP address of the L-PGW 44A, and the eNB 20B may store the IP address of the L-PGW 44B.

In addition, the identification information of a gateway may be an IP address of the PGW 60. For example, the eNB 20A may store the IP address of the PGW 60A, and the eNB 20B may store the IP address of the PGW 60B.

It should be noted that such identification information of a gateway may be individually obtained from a base station such as the eNB 20A or the eNB 20B, and may be stored by corresponding to each base station. Furthermore, when the close gateway identification information 244 is announced from the eNB 20, the MME 30 may detect that the PDN connection is not optimal. Moreover, when receiving the close gateway identification information 244 in the PDN connectivity procedure from the eNB 20, the MME 30 may utilize the close gateway identification information 244 for the GW selection in the PDN connectivity procedure.

In addition, the MME 30 may manage the LHN ID along with the close gateway identification information 444. When the LHN ID is announced from the eNB 20, the MME 30 may detect that the PDN connection is not optimal. Furthermore, when receiving the LHN ID in the PDN connectivity procedure from the eNB 20, the MME 30 may utilize the LHN ID for the GW selection in the PDN connectivity procedure.

It should be noted that the capability information of the UE managed by the MME 30 may include information indicating a capability for establishing a PDN connection for SIPTO that is an offload communication path (capability information 1), permission information indicating that a communication carrier permits the UE 10 to establish a PDN connection for SIPTO that is an offload communication path (permission information 1), and the like.

Here, the capability information 1 may be capability information indicating that a capability for establishing a communication path for SIPTO and a capability of switching to a PDN connection having a different gateway are provided.

Alternatively, the MME 30 may manage the capability information 1 as the capability information indicating that a capability of establishing a communication path for SIPTO is provided, and may manage the capability information 2 as the capability information indicating that a capability of switching to a PDN connection having a different gateway is provided.

In addition, the permission information for the UE managed by the MME 30 may be permission information indicating that a communication carrier permits establishment of a communication path for SIPTO and switching to a PDN connection having a different gateway (permission information 1).

Alternatively, the MME 30 may manage the permission information 1 as permission information that permits establishment of a communication path for SIPTO, and may manage the permission information 2 as permission information indicating that a communication carrier permits switching to a PDN connection having a different gateway.

It should be noted that the permission information 1 may separately manage permission for SIPTO excluding SIPTO@LN and permission for SIPTO including SIPTO@LN. Here, SIPTO@LN is to offload the data exchange via the LGW 40. SIPTO excluding SIPTO@LN is to offload the data exchange via a Traffic Offload Function (TOP) etc.

Moreover, the MME 30 may manage the permission information 1 by separating the permission for SIPTO excluding SIPTO@LN, the permission for SIPTO including SIPTO@LN, and information that permits switching to a PDN connection having different gateway.

On the basis of the permission information 1 and the permission information 2, the MME 30 may announce, to the UE 10, the non-optimal PDN connection, and cause the UE 10 to establish a new PDN connection and to delete the non-optimal PDN connection.

Here, the PDN connection ID can be managed by associating with the APN. By associating the PDN connection ID and the APN, when detecting the non-optimal PDN connection, the MME 30 may announce, to the UE 10, the PDN connection ID, and cause the UE 10 to start the PDN connectivity procedure by utilizing the APN associated with the PDN connection ID. That is, the MME 30 may cause the UE 10 to transmit the PDN connectivity request, including therein the APN associated with the PDN connection ID announced by the MME 30.

The PDN connection ID can be managed by being associated with the bearer ID.

Furthermore, the PDN connection ID may be managed by being associated with the LGW address of the LGW 40 selected by the GW selection in the PDN connectivity procedure. Moreover, the MME 30 may detect the non-optimal PDN connection by comparing the LGW address managed by being associated with the PDN connection ID and the LGW address announced from the eNB 20.

Furthermore, the PDN connection ID may be managed by being associated with the LHN ID of the LGW 40 selected by the GW selection in the PDN connectivity procedure. Moreover, the MME 30 may detect the non-optimal PDN connection by comparing the LHN ID managed by being associated with the PDN connection ID and the LHN ID announced from the eNB 20.

Furthermore, the MME 30 may associate and manage the PDN connection ID, the APN, and the IP address. By associating the APN with the IP address, when the MME 30 notifies the IP address, the PDN connectivity procedure may be started by utilizing the APN associated with the IP address. That is, the MME 30 may cause the UE 10 to transmit the PDN connectivity request, including therein the APN associated with the IP address announced by the MME 30. It is noted that the IP address may be a PDN address. Here, the MME 30 may cause the UE 10 to transmit the PDN connectivity request, including therein the IP address (PDN address) and the APN.

Furthermore, the MME 30 may associate and manage the PDN connection ID, the APN, and the bearer ID. By associating the APN with the bearer ID, when the MME 30 notifies the bearer ID, the PDN connectivity procedure may be started by utilizing the APN associated with the bearer ID. That is, the MME 30 may cause the UE 10 to transmit the PDN connectivity request, including therein the APN associated with the bearer ID announced by the MME 30.

Furthermore, the MME 30 may associate and manage the capability information 1 or capability information 2 and the APN. By associating and managing the capability information 1 or capability information 2 and the APN, the MME 30 may determine whether to detect reestablishment of the PDN connection.

Furthermore, the MME 30 may associate and manage the permission information 1 or permission information 2 and the PDN connection ID. By managing the permission information 1 or permission information 2 and the PDN connection ID, the MME 30 may determine whether or not to execute a process of switching to a PDN connection using a different gateway as an endpoint.

It is noted that, in the above description, the information that identifies the PDN connection is not limited to the PDN connection ID, and may be the bearer ID, the APN, the IP address, and the like.

1.3. Description of Processing

Next, a specific method of switching a communication path in the above-described mobile communication system, will be described. A communication procedure in the present embodiment will be described by using FIG. 5.

Figure 5B:
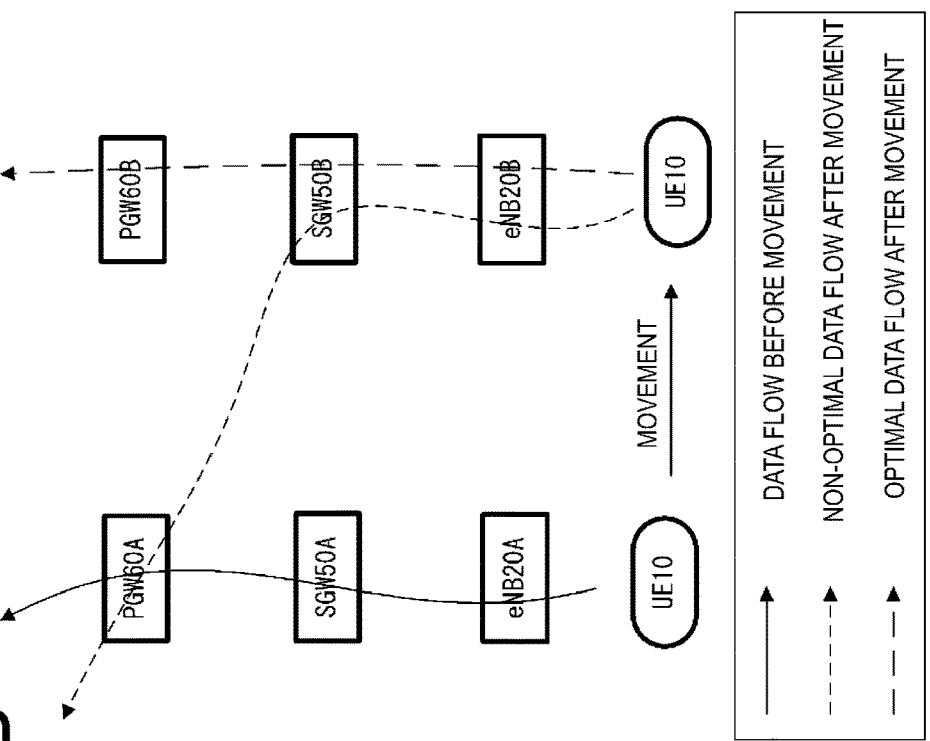
FIGS. 5A and 5B are diagrams illustrating a data flow.
Figure 5A:
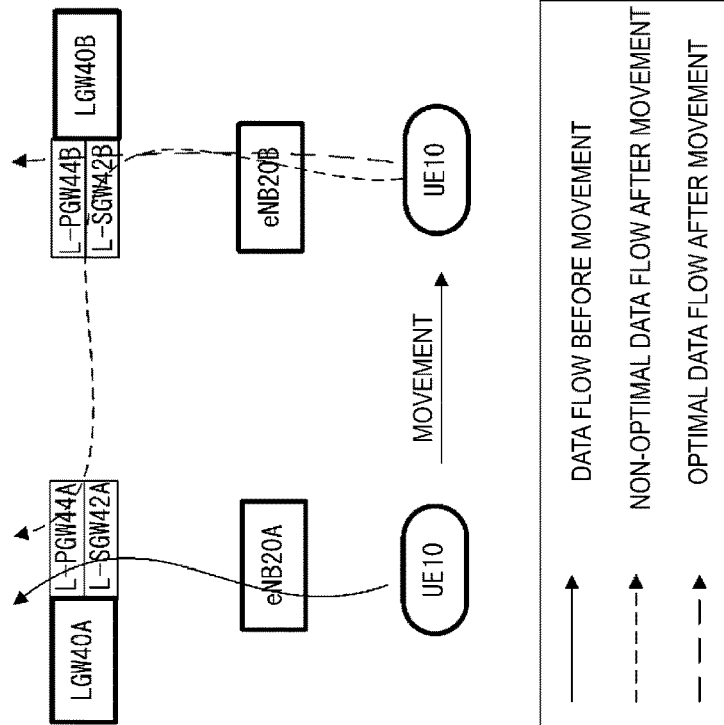

In FIG. 5A, the UE 10 first establishes a first PDN connection, then performs data communication by using the first PDN connection with a terminal that is a communication partner on the network.

Here, the first PDN connection may be a PDN connection for offload communication. That is, the first PDN connection may be a PDN connection for SIPTO established by the UE 10 and the LGW 40A via the eNB 20A.

It is noted that the LGW 40A may include an L-SGW 42A and an L-PGW 44A. In this case, the first PDN connection may be a PDN connection for SIPTO established by the UE 10 and the L-PGW 44A via the eNB 20A and the L-SGW 42A.

Next, the UE 10 changes a connection-destination base station from the eNB 20A to the eNB 20B in accordance with the movement. Here, a procedure of the movement may be the handover procedure, and may be the tracking area update procedure. It is noted that the tracking area update procedure may be a procedure executed when there is no data communication and when the UE 10 in an idle mode of releasing a radio resource moves.

In accordance with the movement of the UE 10, the UE 10 is capable of continuing communication by maintaining the first PDN connection. At that time, the first PDN connection becomes a PDN connection established between the UE 10 and the LGW 40 via the eNB 20B, as illustrated in FIG. 5A.

It should be noted that if the LGW 40A includes the L-SGW 42A and the L-PGW 44A, the first PDN connection may be a PDN connection for SIPTO established between the UE 10 and the L-PGW 44A via the eNB 20B and the L-SGW 42B.

Next, the UE 10 detects that the first PDN connection is not an optimal communication path, then the UE 10 establishes a second PDN connection.

Here, the second PDN connection may be a PDN connection for offload. That is, the second PDN connection may be a PDN connection for SIPTO that the UE 10 establishes with the LGW 40B via the eNB 20B.

It is noted that the LGW 40B may include the L-SGW 42B and the L-PGW 44B. In this case, the second PDN connection may be a PDN connection for SIPTO established between the UE 10 and the L-PGW 44B via the eNB 20B and the L-SGW 42B.

That is, the UE 10 establishes a new PDN connection with the LGW 40B that is a gateway device located closer compared to the LGW 40A that is establishing the first PDN connection.

Here, the UE 10 may establish the second PDN connection while maintaining the first PDN connection.

That is, the UE 10 may switch the offload communication from the first PDN connection to the second PDN connection in a state where the first PDN connection and the second PDN connection are simultaneously established. The switching of the offload communication may refer to the UE 10 communicating by using the second PDN connection, the connection having been established by using the first PDN connection.

In addition, after the switching of the offload communication, the UE 10 may delete the first PDN connection.

The UE 10 switches the offload communication after establishing the second PDN connection. By doing so, it is possible to reduce delay and packet loss etc. due to the switching of the communication path, and thus, increase seamlessness.

In this way, the UE 10 is capable of continuing communication by switching to an optimal communication path in accordance with the movement.

It should be noted that, as illustrated in FIG. 5A, the LGW 40A is arranged for a neighboring gateway of the eNB 20A, and the MME 30 and the eNB 20A stores information on the neighboring gateway by corresponding to the identification information of the eNB 20. If the LGW 40A is constituted separately as the L-PGW 44A and the L-SGW 42A, identification information of a neighboring gateway may be an address of the L-PGW 44A.

Furthermore, the LGW 40B is arranged for a neighboring gateway of the eNB 20B, and the MME 30 and the eNB 20B stores information on the neighboring gateway by corresponding to the identification information of the eNB 20B. If the LGW 40B is constituted separately as the L-PGW 44B and the L-SGW 42B, identification information of a neighboring gateway may be an address of the L-PGW 44B.

Hereinafter, a case in which the LGW 40 is constituted separately as the L-PGW 44 and the L-SGW 42, will be mainly described. If the L-PGW 44 and the LSGW 42 is constituted by the same device, a process described below including exchange of control information between the L-PGW 44 and the L-SGW 42 is considered as an internal process of the LGW 40. Furthermore, a process described below including exchange of control information of the L-PGW 44 or the L-SGW 42 is considered as a process of the LGW 40.

Hereinafter, the details of the above-described communication procedure will be described by using FIG. 6.

In the initial state of a communication procedure, the UE 10 performs data exchange with a communication device (Corresponding Node) included in the PDN, by using the first PDN connection.

It should be noted that the UE 10 may perform an attach procedure or the PDN connectivity procedure by using the APN 1 or APN 2 to establish the first PDN connection.

Next, in accordance with the movement of the UE 10, a handover procedure is executed. (S602).

After the handover procedure, the UE 10 continues communication by using the first PDN connection. Here, through the handover procedure, the UE 10 may detect that the first PDN connection is not an optimal PDN connection.

Alternatively, the UE 10 may detect establishment of a PDN connection using a different gateway as an endpoint.

In the handover procedure, that detection may be found by receiving identification information such as an indicator 1 from the eNB 20B or the MME 30. The indicator 1 may be information indicating that the first PDN connection is not an optimal PDN connection, information indicating a possibility of establishing a PDN connection using a different gateway as an endpoint, or information instructing reestablishment of the PDN connection. Furthermore, the indicator 1 may be information including an instruction to reestablish the PDN connection by using the same APN (the APN 1 or APN 2) as the APN used when establishing the first PDN connection.

Furthermore, the indicator 1 may be information including an instruction to start the tracking area update procedure executed by the initiative of the UE 10.

Next, the UE 10 detects a trigger of the tracking area update procedure (S604). The UE 10 may detect the trigger on the basis of the reception of the indicator 1. Or, after the handover, the UE 10 may detect the trigger on the basis of the transition to an idle mode. Or, after the handover, and after the transition to the idle mode, the UE 10 may detect the trigger on the basis of a timer used when starting the tracking area update.

Alternatively, the UE 10 may detect the trigger by combining two or more of these conditions. For example, the UE 10 may detect the trigger when having transitioned to the idle mode and receiving the indicator 1.

Next, the UE 10 may start the tracking area update procedure on the basis of the detection of the trigger (S606).

Furthermore, in the tracking area update procedure, the UE 10 may send identification information such as an indicator 2, etc. to the MME 30.

Here, the indicator 2 may be information that requests not to execute deletion of the first PDN connection by the initiative of the MME 30. Or, the indicator 2 may be information that requires establishment of a PDN connection using a different gateway as an endpoint.

In addition, specific information of the indicator 2 may be capability information such as capability information 1 or capability information 2.

It is noted that the UE 10 may determine on the basis of the reception of the indicator 1 whether or not to trigger the indicator 2. For example, the UE 10 may trigger the indicator 2 when the indicator 1 is obtained, and may not trigger the indicator 2 when the indicator 1 is not obtained.

Alternatively, the UE 10 may determine depending on the capability whether or not to announce the indicator 2. For example, the UE 10 may announce the indicator 2 when managing the capability information 1 or the capability information 2, and may not announce the indicator 2 when not managing the capability information 1 and the capability information 2.

In addition, in the tracking area update procedure, the UE 10 may obtain identification information such as an indicator 3 from the MME 30.

Here, the indicator 3 may be information indicating that the first PDN connection is not an optimal PDN connection, may be information indicating a possibility of establishing a PDN connection using a different gateway as an endpoint, may be information that instructs gateway rearrangement, or may be information instructing reestablishment of the PDN connection. Furthermore, the indicator 3 may be information including an instruction to reestablish the PDN connection by using the same APN (the APN 1 or APN 2) as the APN used when establishing the first PDN connection.

It should be noted that the MME 30 may detect that it is possible to establish the PDN connection using a different gateway as an endpoint, then trigger the indicator 3 on the basis of the detection.

The detection at the MME 30 may be performed on the basis of information obtained from the eNB 20 that is a movement-destination base station. For example, the detection may be performed on the basis of the identification information of a gateway transmitted by the eNB 20B.

In addition to the detection result, the MME 30 may determine on the basis of the reception of the indicator 2 whether or not to announce the indicator 3. For example, the MME 30 may announce the indicator 3 when the indicator 2 is obtained, and may not announce the indicator 3 when the indicator 2 is not obtained.

Alternatively, the MME 30 may determine depending on the capability originally provided in the UE 10 whether or not to trigger the indicator 3. For example, the MME 30 may trigger the indicator 3 when managing the capability information 1 or capability information 2 of the UE 10, and may not announce the indicator 3 when not managing the capability information 1 and the capability information 2.

Alternatively, the MME 30 may determine depending on the APN used when establishing the first PDN connection whether or not to trigger the indicator 3. For example, when the APN is an APN in which switching to the PDN connection using a different gateway as an endpoint is permitted, when the APN is an APN in which switching to the PDN connection using a different gateway as an endpoint is permitted, the MME 30 may not trigger the indicator 3.

In addition, the MME 30 may determine that a deletion procedure of the first PDN connection executed by the initiative of the MME 30 is not started during the tracking area update procedure.

The MME 30 may make this decision on the basis of the reception of the indicator 2. For example, the MME 30 may determine not to execute the deletion procedure of the PDN connection initiated by the MME when the indicator 2 is obtained, and may start the deletion procedure of the PDN connection initiated by the MME when the indicator 2 is not obtained.

Alternatively, the MME 30 may make this decision depending on the capability that the UE 10 originally has. For example, the MME 30 may determine not to execute the deletion procedure of the PDN connection initiated by the MME when managing the capability information 1 or capability information 2 of the UE 10, and may start the deletion procedure of the PDN connection initiated by the MME when not managing the capability information 1 and the capability information 2.

Alternatively, the MME 30 may make this decision depending on the APN used when establishing the first PDN connection. For example, when the APN is an APN in which switching to the PDN connection using a different gateway as an endpoint is permitted, the MME 30 may determine not to execute the deletion procedure of the PDN connection initiated by the MME, and when the APN is an APN in which switching to the PDN connection using a different gateway as an endpoint is permitted, the MME 30 may start the deletion procedure of the PDN connection initiated by the MME.

Moreover, the MME 30 may make a decision by combining these conditions.

Next, the UE 10 starts the PDN connectivity procedure (S608). The UE 10 may start the PDN connectivity procedure on the basis of the obtainment of the indicator 1. Or, the UE 10 may start the PDN connectivity procedure on the basis of the obtainment of the indicator 3. Or, the UE 10 may start the PDN connectivity procedure on the basis of the obtainment of the indicator 1 and the indicator 3.

That is, the UE 10 may start the PDN connectivity procedure on the basis of the detection of the trigger following the handover procedure, or may start the PDN connectivity procedure on the basis of the completion of the tracking update procedure. It should be noted that transmission of a PDN connectivity request message to the MME 30 by the UE 10 may be considered as the start of the PDN connectivity procedure.

It should be noted that the UE 10 may perform the PDN connectivity procedure by using the same APN as the APN used when establishing the first PDN connection. Here, the PDN connectivity procedure using the APN may be a PDN connectivity procedure started when the UE 10 transmits a PDN connectivity request message including the APN.

Alternatively, the UE 10 may perform the PDN connectivity procedure by using a different APN. For example, the APN 3 or the APN 4 may be used to request establishment of the PDN connection that is not for offload.

Or, an APN different from the APN 1 (such as an APN 5) may be used to establish a PDN connection. Here, in much the same way as in the APN 1, the APN 5 may be an APN capable of establishing a PDN connection for SIPTO and be an APN in which switching to a PDN connection using a different gateway as an endpoint is not permitted.

Or, an APN different from the APN 2 (such as an APN 6) may be used to establish a PDN connection. Here, in much the same way as in the APN 2, the APN 6 may be an APN capable of establishing a PDN connection for SIPTO and act as an APN in which switching to a PDN connection using a different gateway as an endpoint is permitted.

The UE 10 executes the PDN connectivity procedure and establishes the second PDN connection.

In this way, the UE 10 is capable of establishing the second PDN connection while the first PDN connection is still established.

It should be noted that on the basis of the establishment of the second PDN connection, the UE 10 may continue communication by switching to the second PDN connection, the communication having been performed by using the first PDN connection.

More specifically, the UE 10 may execute the switching of the PDN connection by managing communication flow information and routing information that had been corresponded to the first PDN connection by corresponding to the second PDN connection.

The UE 10 may continue communication by changing the IP address when switching the PDN connection. More specifically, an IP address corresponded to the first PDN connection may be changed to an IP address corresponded to the second PDN connection. It should be noted that the UE 10 may obtain the IP address through the PDN connectivity procedure.

Next, after the PDN connectivity procedure is completed, a PDN disconnection procedure is performed (S610). Here, through the PDN connectivity procedure, it is possible to delete the first PDN connection that is not optimal.

The PDN disconnection procedure may be a PDN disconnection procedure initiated by the UE 10, or may be a PDN disconnection procedure initiated by the MME 30.

It should be noted that the UE 10 may start the PDN disconnection procedure requested to the UE 10 immediately after the completion of the PDN connectivity procedure, start the PDN disconnection procedure requested to the UE 10 after transitioning data exchange to the PDN connection established through the PDN connectivity procedure, or start the PDN disconnection procedure requested to the UE 10, triggered by the completion of data exchange and the transition to idle mode.

On the other hand, the MME 30 may start the PDN disconnection procedure requested from the MME 30 in linkage with the PDN connectivity procedure for establishing the PDN connection. The MME 30 may start the PDN disconnection procedure requested from the MME 30 on the basis of information that reestablishes the PDN connection, the information being included in the PDN connectivity request in the PDN connectivity procedure.

A method of selecting, by the MME 30, a PDN connection subject to the PDN disconnection is judged on the basis of information indicating the start of the PDN disconnection procedure, the information included in the PDN connectivity request transmitted by the UE 10. The MME 30 manages information regarding the PDN connection established by the UE 10, and thus, the MME 30 may utilize information included in the PDN connectivity request to select a PDN connection subject to the PDN disconnection.

According to the processing flow described above, the UE 10 is capable of starting data exchange not by maintaining data exchange through the first PDN connection that is not optimal, but through the optimal second PDN connection.

Furthermore, the present embodiment enables switching with high seamlessness due to reduced packet loss and switching delay, compared to a case in which the second PDN connection is established after the first PDN connection is deleted.

1.3.1 Handover Procedure 1

Next, an example of a more detailed procedure of the handover procedure (S602) described by using FIG. 6 will be described as a handover procedure 1 by using FIG. 7.

In the initial state in the handover procedure 1, the UE 10 is connected to the eNB 20A and is establishing a first PDN connection. The UE 10 is in a state in which data exchange with a communication device (Corresponding Node) included in the PDN 90 is possible by using the first PDN connection.

It should be noted that the UE 10 is establishing the first PDN connection by using the APN 2. Therefore, the first PDN connection may be a PDN connection for SIPTO established between the UE 10 and the L-PGW 44A via the eNB 20A and the L-SGW 42A.

The eNB 20A, a movement-source base station of the UE 10, executes a handover decision process (S702). In the handover decision process, the eNB 20A determines to start the handover procedure by which the UE 10 switches the connection destination to the eNB 20B. It should noted that the decision of the handover may be made on the basis of a measurement result of a peripheral base station transmitted by the UE 10.

The eNB 20A transmits, on the basis of the decision of the handover, a handover request message to the eNB 20B (S704).

Here, the handover request transmitted by the eNB 20A may be transmitted, including therein the close gateway identification information 244 managed by the eNB 20A.

Next, the eNB 20B may obtain, in accordance with the reception of the handover request from the eNB 20A, identification information of a neighboring gateway included in the handover request.

In addition, the eNB 20B can detect the necessity for gateway switching. Here, gateway switching may refer to the detection of the switching of the PDN connection currently established by the UE 10 by reestablishing a new PDN connection. Furthermore, the new PDN connection may be a PDN connection established by using, as an endpoint, a gateway different from that of the currently established PDN connection. A specific detection method will be described, below.

The eNB 20B can determine to perform gateway switching by detecting that the close gateway identification information 244 of the eNB 20B is different from the obtained identification information of a neighboring gateway of the eNB 20A.

As described above, the identification information of a gateway may be an L-PGW or LGW address, or may be an LHN ID.

For example, the gateway switching can be determined to be performed on the basis of the fact that the identification information of a neighboring gateway of the eNB 20B is an address of the L-PGW 44B, and the identification information of a neighboring gateway of the eNB 20A is an L-PGW 44A.

Alternatively, the eNB 20A can determine to perform gateway switching by detecting that the identification information of a gateway that is an endpoint of the PDN connection currently established by the UE 10 is different from the obtained identification information of a neighboring gateway of the eNB 20B.

As described above, the identification information of a gateway may be the LHN ID. Here, the eNB 20A can determine to perform gateway switching when the identification information of a gateway that is an endpoint of the PDN connection currently established by the UE 10 is different from the L-PGW or LGW address selected on the basis of the LHN ID.

Furthermore, the eNB 20B can determine, on the basis of the identification information of a neighboring gateway, a gateway device serving as an endpoint of a new PDN connection. For example, the LGW 40B (or the L-PGW 44B) that is a neighboring gateway of the eNB 20B may be selected as an endpoint of the new PDN connection.

In this way, the eNB 20B can detect, by using the identification information of a neighboring gateway, that the PDN connection currently established by the UE 10 is not optimal. Furthermore, reestablishment of an optimal PDN connection may be detected.

It is noted that when the identification information of a gateway is the LHN-ID, it is also possible to detect the necessity of gateway switching by using a similar method.

Furthermore, whether or not to perform gateway switching can be determined on the basis of the permission information of the UE 10.

For example, the eNB 20B can determine to perform gateway switching when the UE 10 is permitted to switch to a PDN connection using a different gateway as an endpoint, such as the permission information 2 or permission information 4.

Alternatively, whether or not to perform gateway switching can be determined on the basis of the permission information of the UE 10.

For example, the eNB 20B can determine to perform gateway switching when the UE 10 is permitted to switch to a PDN connection using a different gateway as an endpoint, such as the permission information 2.

Alternatively, the eNB 20B can determine to perform gateway switching when the UE 10 is permitted to establish a PDN connection for SIPTO, such as the permission information 1.

It should be noted that the type of permission information used as the basis for determining performance of gateway switching can be configured by the communication carrier.

Alternatively, whether or not to perform gateway switching can be determined on the basis of the capability information of the UE 10.

For example, the eNB 20B can determine to perform gateway switching when the UE 10 is capable of switching to a PDN connection using a different gateway as an endpoint, such as the capability information 2.

Alternatively, the eNB 20B can determine to perform gateway switching when the UE 10 is capable of establishing a PDN connection for SIPTO, such as the capability information 1.

It is noted that the type of capability information used as the basis determining performance of gateway switching can be configured by the communication carrier.

Alternatively, whether or not to perform gateway switching can be determined on the basis of the APN.

For example, the eNB 20B can determine to perform gateway switching when the APN used by the UE 10 for establishing the currently established PDN connection is an APN in which switching to a PDN connection using a different gateway as an endpoint is permitted.

Alternatively, the eNB 20B can determine to perform gateway switching when the APN used by the UE 10 for establishing the currently established PDN connection is an APN in which establishment of a PDN connection for SIPTO is permitted.

It should be noted that the type of capability information used as the basis of the determining performance of gateway switching can be configured by the communication carrier.

Furthermore, whether or not to perform gateway switching can be determined by combining two or more of the above-described conditions.

Thus, a PDN connection to be reestablished may be a PDN connection managed by associating with permission information such as the permission information 1 or the permission information 2. Furthermore, the PDN connection to be reestablished may be a PDN connection managed by associating with capability information such as the capability information 1 or the capability information 2.

In addition, the PDN connection to be reestablished may be a part of a plurality of established PDN connections. That is, the UE 10 is capable of selecting a PDN connection to be reestablished from among the plurality of established PDN connections, and establishing a new PDN connection. Furthermore, the UE 10 continues communication by switching to a newly established PDN connection, the communication having been performed by using the PDN connection selected for reestablishment.

It should be noted that the UE 10 may select a PDN connection to be reestablished on the basis of the identification information such as the APN. For example, the UE 10 may select a PDN connection established by using the APN in which switching to a PDN connection using a different gateway as an endpoint is permitted. Alternatively, the UE 10 may select a PDN connection established by using the APN in which establishment of a PDN connection for SIPTO is permitted. Alternatively, the UE 10 may receive identification information of a PDN connection to be switched from the core network 7, and select a PDN connection on the basis of the identification information. More specifically, the UE 10 may receive identification information of a PDN connection from a device included in the core network 7 such as the MME 30, and select a PDN connection.

It should be noted that in the present embodiment, the description assumes that the PDN connection to be reestablished is the first PDN connection.

According to the detection of gateway switching described above, when detecting gateway switching, the eNB 20B can transmit, to the eNB 20B, a handover request response message transmitted as a response to the handover request message while including the indicator 1 into the message. It should be noted that when not detecting gateway switching, the eNB 20B can transmit, to the eNB 20A, the handover request response message without including the indicator 1.

The eNB 20A receives the handover request response message.

Furthermore, an RRC reconfiguration request message is transmitted to the UE 10 on the basis of the reception of the handover request response message (S708). The RRC reconfiguration request message can be transmitted, including therein information that identifies the eNB 20, and announce a new connection destination.

Furthermore, the eNB 20A can transmit the RRC reconfiguration request message, including therein the identification information such as the indicator 1 received from the eNB 20B.

The eNB 20A can transmit the RRC reconfiguration request message RRC reconfiguration request message including therein the indicator 1 when receiving the indicator 1 from the eNB 20B, and may transmit the RRC reconfiguration request message without including the indicator 1 when receiving the indicator 1 from the eNB 20B.

The UE 10 receives the RRC reconfiguration request message. Thus, the UE 10 is capable of obtaining the indicator 1 included in the RRC reconfiguration request message.

It should be noted that the detection of the necessity of gateway switching can be performed not only by the eNB 20B but also by the eNB 20A.

For example, rather than transmitting with inclusion of the indicator 1 of the handover response message, the eNB 20B can transmit with inclusion of the close gateway identification information 244 managed by the eNB 20B.

Next, the eNB 20A can obtain, in accordance with the reception of the handover request response from the eNB 20B, identification information of a neighboring gateway included in the handover request response.

Here, the eNB 20A can detect the necessity for gateway switching. Here, gateway switching may refer to the detection of switching the PDN connection currently established by the UE 10 by reestablishing a new PDN connection. Furthermore, the new PDN connection may be a PDN connection established by using, as an endpoint, a gateway different from that of the currently established PDN connection. A specific detection method will be described, below.

The eNB 20A can determine to perform gateway switching by detecting that the close gateway identification information 244 of the eNB 20A is different from the obtained identification information of a neighboring gateway of the eNB 20B.

As described above, the identification information of a gateway may be an L-PGW, LGW address, or an LHN ID.

For example, the MME 30 can determine to perform gateway switching on the basis of the fact that the identification information of a neighboring gateway of the eNB 20B is an address of the L-PGW 44B, and the identification information of a neighboring gateway of the eNB 20A is an L-PGW 44A.

Alternatively, the eNB 20A can determine to perform gateway switching by detecting that the identification information of a gateway that is an endpoint of the PDN connection currently established by the UE 10 is different from the obtained identification information of a neighboring gateway of the eNB 20B.

As described above, the identification information of a gateway may be the LHN ID, and eNB 20A can determine to perform gateway switching when the identification information of a gateway that is an endpoint of the PDN connection currently established by the UE 10 is different from the L-PGW or LGW address selected on the basis of the LHN ID.

For example, gateway switching can be determined to be performed on the basis of the fact that the identification information of a neighboring gateway of the eNB 20B is an address of the L-PGW 44B, and the identification information of a neighboring gateway of the eNB 20A is an L-PGW 44A.

Furthermore, the eNB 20A can determine, on the basis of the identification information of a neighboring gateway, a gateway device serving as an endpoint of a new PDN connection. For example, the LGW 40B (or the L-PGW 44B) that is a neighboring gateway of the eNB 20B can be selected as an endpoint of the new PDN connection.

In this way, the eNB 20A can detect, by using the identification information of a neighboring gateway, that the PDN connection currently established by the UE 10 is not optimal. Furthermore, reestablishment of an optimal PDN connection can be detected.

It should be noted that when the identification information of a gateway is the LHN-ID, it is also possible to detect the necessity of gateway switching by using a similar method.

Furthermore, whether or not to perform gateway switching can be determined on the basis of the permission information of the UE 10.

For example, the eNB 20A can determine to perform gateway switching when the UE 10 is permitted to switch to a PDN connection using a different gateway as an endpoint, such as the permission information 2 or the permission information 4.

Alternatively, whether or not to perform gateway switching can be determined on the basis of the permission information of the UE 10.

For example, the eNB 20A can determine to perform gateway switching when the UE 10 is permitted to switch to a PDN connection using a different gateway as an endpoint, such as the permission information 2.

Alternatively, the eNB 20A can determine to perform gateway switching when the UE 10 is permitted to establish a PDN connection for SIPTO, such as the permission information 1.

It should be noted that the type of permission information used as the basis of the determination can be configured by the communication carrier.

Alternatively, whether or not to perform gateway switching can be determined on the basis of the capability information of the UE 10.

For example, the eNB 20A can determine to perform gateway switching when the UE 10 is capable of switching to a PDN connection using a different gateway as an endpoint, such as the capability information 2.

Alternatively, the eNB 20A can determine to perform gateway switching when the UE 10 is capable of establishing a PDN connection for SIPTO, such as the capability information 1.

It should be noted that the type of capability information used as the basis of the determination can be configured by the communication carrier.

Alternatively, whether or not to perform gateway switching can be determined on the basis of the APN.

For example, the eNB 20A can determine to perform gateway switching when the APN used by the UE 10 for establishing the currently established PDN connection is an APN in which switching to a PDN connection using a different gateway as an endpoint is permitted.

Alternatively, the eNB 20A can determine to perform gateway switching when the APN used by the UE 10 for establishing the currently established PDN connection is an APN in which establishment of a PDN connection for SIPTO is permitted.

It should be noted that the type of capability information used as the basis of the determination can be configured by the communication carrier.

Furthermore, whether or not to perform gateway switching can be determined by combining two or more of the above-described conditions.

Thus, a PDN connection to be reestablished may be a PDN connection managed by associating with permission information such as the permission information 1 or the permission information 2. Furthermore, the PDN connection to be reestablished may be a PDN connection managed by associating with capability information such as the capability information 1 or the capability information 2.

In addition, the PDN connection to be reestablished may be a part of a plurality of established PDN connections. In the present embodiment, the PDN connection to be reestablished is assumed to be the first PDN connection.

According to the above-described detection of gateway switching, when detecting gateway switching, the eNB 20A can transmit, to the UE 10, the RRC reconfiguration request message while including therein the indicator 1. It is noted that when not detecting gateway switching, the eNB 20A can transmit, to the UE 10, the RRC reconfiguration request message without including the indicator 1.

After the UE 10 receives the RRC reconfiguration request message, on the basis of the reception of the message, the UE 10 is detached from an old cell and is synchronized with a new cell (S710). Here, an old cell refers to a cell formed by the eNB 20A, and a new cell refers to a cell formed by the eNB 20B.

In addition, after being synchronized with the new cell, the UE 10 transmits an RRC reconfiguration complete message to the eNB 20B.

Furthermore, after transmitting the RRC reconfiguration request message, the eNB 20A transmits an SN state transmission message to the eNB 20B. In addition, after transmitting the SN state transmission message, data transfer to the eNB 20B is initiated. Here, data transfer refers to transferring, to the eNB 20B, user data that is received from the L-SGW 42A and destined to the UE 10.

Next, the eNB 20B transmits a path switch request to the MME 30 (S716).

On the other hand, in accordance with the path switch request, the MME 30 can transmit a session generation request to the L-SGW 42B that is a transmission destination of data from the eNB 20B (S718). Furthermore, the L-SGW 42B may transmit a bearer change request to the L-PGW 44A (S720). Furthermore, the L-PGW 44A can transmit a bearer change response to the L-SGW 42B (S722). The L-SGW 42B may transmit a session generation response to the MME 30 (S724).

Next, the MME 30 transmits, to the eNB 20B, a path switch response as a response to the received path switch request (S726).

It should be noted that in the procedures so far, a method in which the eNB 20B announces, to the UE 10, the indicator 1 via the eNB 20A is described; however, another notification method may be used.

For example, the MME 30 may announce, to the UE 10, the indicator 1 via the eNB 20B. A specific description will be described, below.

The path switch request transmitted by the eNB 20B, that is described in S716, can be transmitted, including therein the close gateway identification information 244 managed by the eNB 20B.

Next, in accordance with the reception of the path switch request from the eNB 20B, the MME 30 can obtain the identification information of a neighboring gateway included in the path switch request, and store the same in the close gateway identification information 444. It should be noted that the MME 30 can store the close gateway identification information 444 by associating with the eNB 20B.

Next, the MME 30 can detect the necessity of gateway switching. Here, gateway switching may refer to the detection of switching the PDN connection currently established by the UE 10 by reestablishing a new PDN connection. Furthermore, the new PDN connection can be a PDN connection established by using, as an endpoint, a gateway different from that of the currently established PDN connection. A specific detection method will be described, below.

The MME 30 can determine to perform gateway switching by detecting that the identification information of a neighboring gateway of the eNB 20B is different from the identification information of a neighboring gateway of the eNB 20A.

As described above, the identification information of a gateway may be an L-PGW or LGW address, or an LHN ID.

For example, the MME 30 can determine to perform gateway switching on the basis of the fact that the identification information of a neighboring gateway of the eNB 20B is an address of the L-PGW 44B, and the identification information of a neighboring gateway of the eNB 20A is an L-PGW 44A.

Alternatively, the MME 30 can determine to perform gateway switching by detecting that the identification information of a gateway that is an endpoint of the PDN connection currently established by the UE 10 is different from the obtained identification information of a neighboring gateway of the eNB 20B.

As described above, the identification information of a gateway may be the LHN ID, and eNB 20A can determine to perform gateway switching when the identification information of a gateway that is an endpoint of the PDN connection currently established by the UE 10 is different from the L-PGW or LGW address selected on the basis of the LHN ID.

For example, the gateway switching can be determined to be performed on the basis of the fact that the identification information of a neighboring gateway of the eNB 20B is an address of the L-PGW 44B, and the identification information of a neighboring gateway of the eNB 20A is an L-PGW 44A.

Furthermore, the MME 30 may determine, on the basis of the identification information of a neighboring gateway, a gateway device serving as an endpoint of a new PDN connection. For example, the MME 30 can select the LGW 40B (or the L-PGW 44B) that is a neighboring gateway of the eNB 20B, as an endpoint of the new PDN connection.

In this way, the MME 30 can detect, by using the identification information of a neighboring gateway, that the PDN connection currently established by the UE 10 is not optimal. Furthermore, reestablishment of an optimal PDN connection can be detected.

It should be noted that when the identification information of a gateway is the LHN-ID, it is also possible to detect the necessity of gateway switching by using a similar method.

Furthermore, whether or not to perform gateway switching can be determined on the basis of the permission information of the UE 10.

For example, the MME 30 can determine to perform gateway switching when the UE 10 is permitted to switch to a PDN connection using a different gateway as an endpoint, such as the permission information 2 or the permission information 4.

Alternatively, whether or not to perform gateway switching can be determined on the basis of the permission information of the UE 10.

For example, the MME 30 can determine to perform gateway switching when the UE 10 is permitted to switch to a PDN connection using a different gateway as an endpoint, such as the permission information 2.

Alternatively, the MME 30 can determine to perform gateway switching when the UE 10 is permitted to establish a PDN connection for SIPTO, such as the permission information 1.

It should be noted that the type of permission information used as the basis for determining performance of gateway switching can be configured by the communication carrier.

Alternatively, whether or not to perform gateway switching can be determined on the basis of the capability information of the UE 10.

For example, the MME 30 can determine to perform gateway switching when the UE 10 is capable of switching to a PDN connection using a different gateway as an endpoint, such as the capability information 2.

Alternatively, the MME 30 can determine to perform gateway switching when the UE 10 is capable of establishing a PDN connection for SIPTO, such as the capability information 1.

It should be noted that the type of capability information used as the basis for determining the performance of gateway switching can be configured by the communication carrier.

Alternatively, whether or not to perform gateway switching can be determined on the basis of the APN.

For example, the MME 30 can determine to perform gateway switching when the APN used by the UE 10 for establishing the currently established PDN connection is an APN in which switching to a PDN connection using a different gateway as an endpoint is permitted.

Alternatively, the MME 30 can determine to perform gateway switching when the APN used by the UE 10 for establishing the currently established PDN connection is an APN in which establishment of a PDN connection for SIPTO is permitted.

It should be noted that the type of capability information used as the basis determining the performance of gateway switching can be configured by the communication carrier.

Furthermore, whether or not to perform gateway switching can be determined by combining two or more of the conditions described above.

Thus, a PDN connection to be reestablished may be a PDN connection managed by associating with permission information such as the permission information 1 or the permission information 2. Furthermore, the PDN connection to be reestablished may be a PDN connection managed by associating with capability information such as the capability information 1 or the capability information 2.

In addition, the PDN connection to be reestablished may be a part of a plurality of established PDN connections. In the present embodiment, the PDN connection to be reestablished is assumed to be the first PDN connection.

According to the detection of gateway switching described above, when detecting gateway switching, the MME 30 can transmit, to the eNB 20B, the path switch response while including therein the indicator 1. It should be noted that when not detecting gateway switching, the MME 30 can transmit, to the eNB 20B, the path switch response without including the indicator 1.

Furthermore, the eNB 20 can receive the path switch response, and if the indicator 1 is included in the path switch response, the eNB 20 can transmit, to the UE 10, a message including the indicator 1.

It should be noted that the MME 30 can transmit the notification of the indicator 1 to the UE 10 via the eNB 20B, and in addition, the MME 30 can directly transmit, to the UE 10, control information including the indicator 1.

Here, when the UE 10 receives the indicator 1 and the indicator 1 is announced to the UE 10, it may detect that the PDN connection is not optimal by being notified of the indicator 1. Furthermore, when the indicator 1 is announced to the UE 10, the UE 10 can detect that it is possible to establish an optimal PDN connection for SIPTO. Furthermore, when the indicator 1 is announced, the UE 10 may detect GW switching.

In addition, the eNB 20B transmits to the eNB 20A, information indicating resource release (S728). Thus, the eNB 20A deletes the communication path for transferring data from the UE 10 to the eNB 20B.

On the other hand, the MME 30 transmits a session deletion request to the L-SGW 42B (S730). The L-SGW 42B receives the session deletion request from the MME 30, and deletes the session with the eNB 20A and the L-PGW 44A.

Next, the SGW 50 transmits a session deletion response to the MME 30 (S724).

The handover procedure 1 described above enables the UE 10 to continue communication while maintaining the first PDN connection. At that time, the first PDN connection becomes a PDN connection established between the UE 10 and the L-PGW 44A via the eNB 20B and the L-SGW 42B.

1.3.2 Handover Procedure 2

Figure 6:
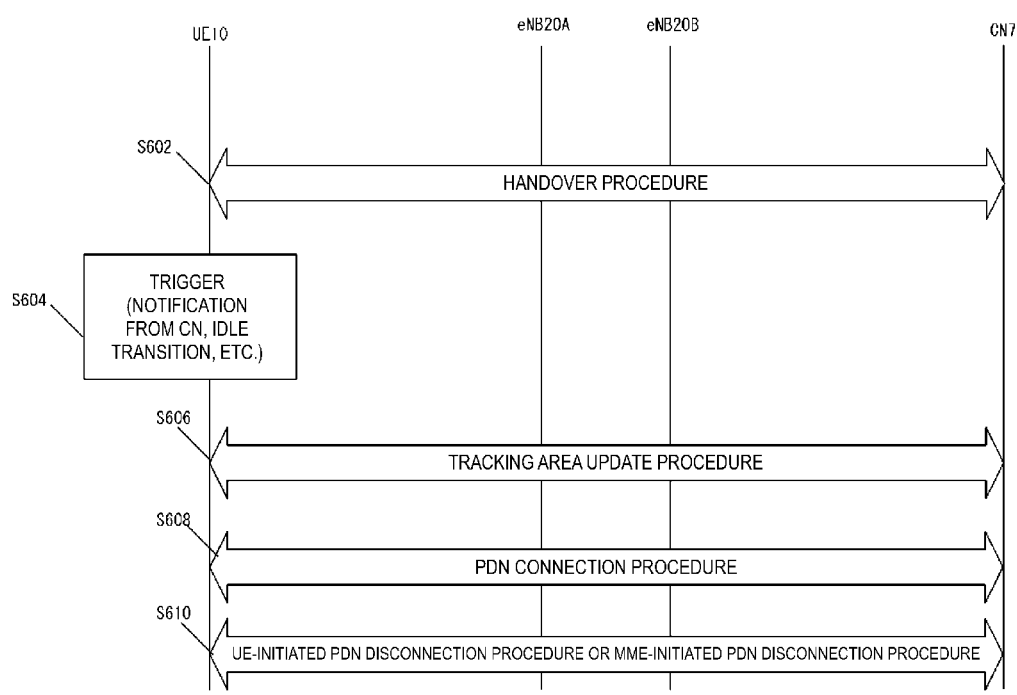
FIG. 6 is a diagram illustrating a processing flow.

In addition, the handover procedure (S602) described in FIG. 6 is not limited to the method described as the handover procedure 1, and other methods may be used.

Figure 8A:
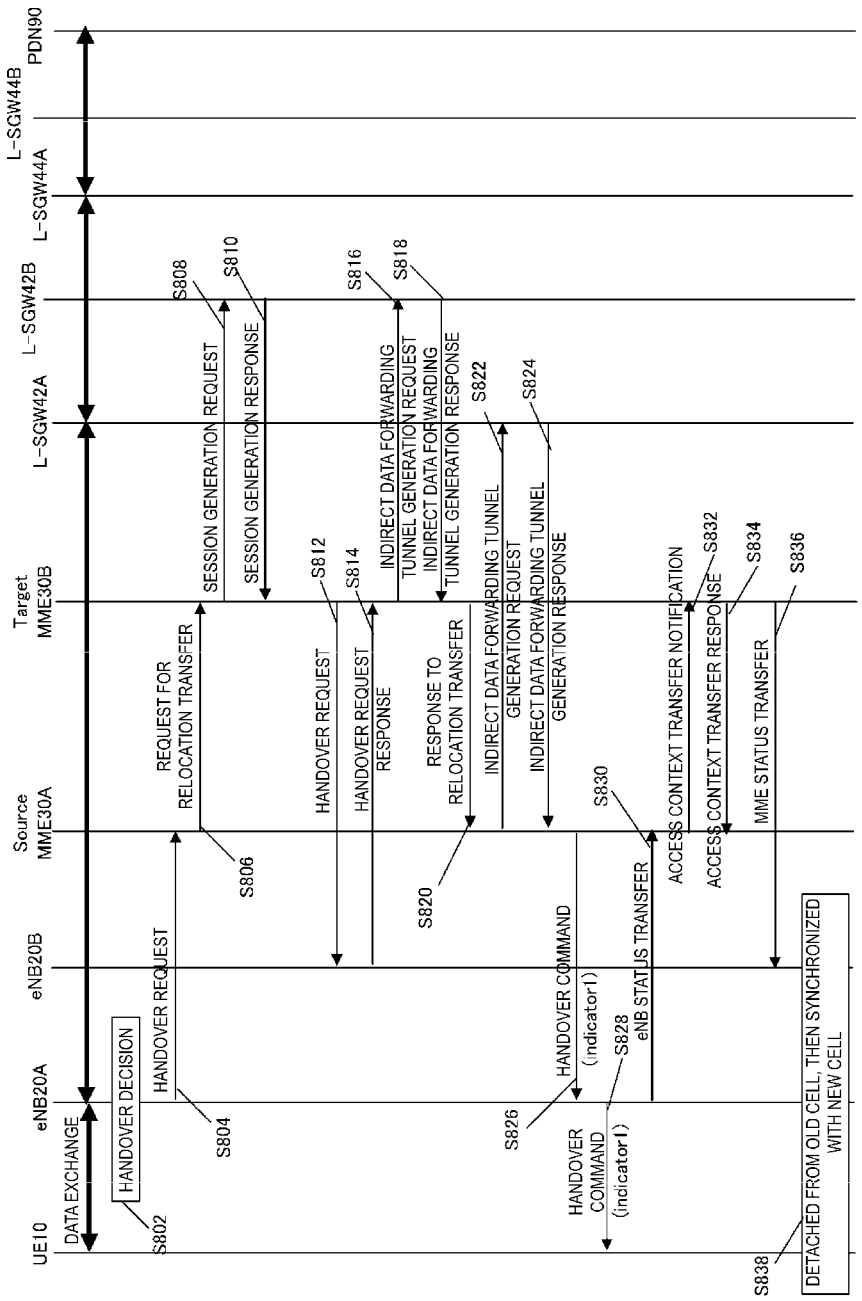
FIG. 8A is a diagram illustrating the handover procedure according to the embodiment.
Figure 8B:
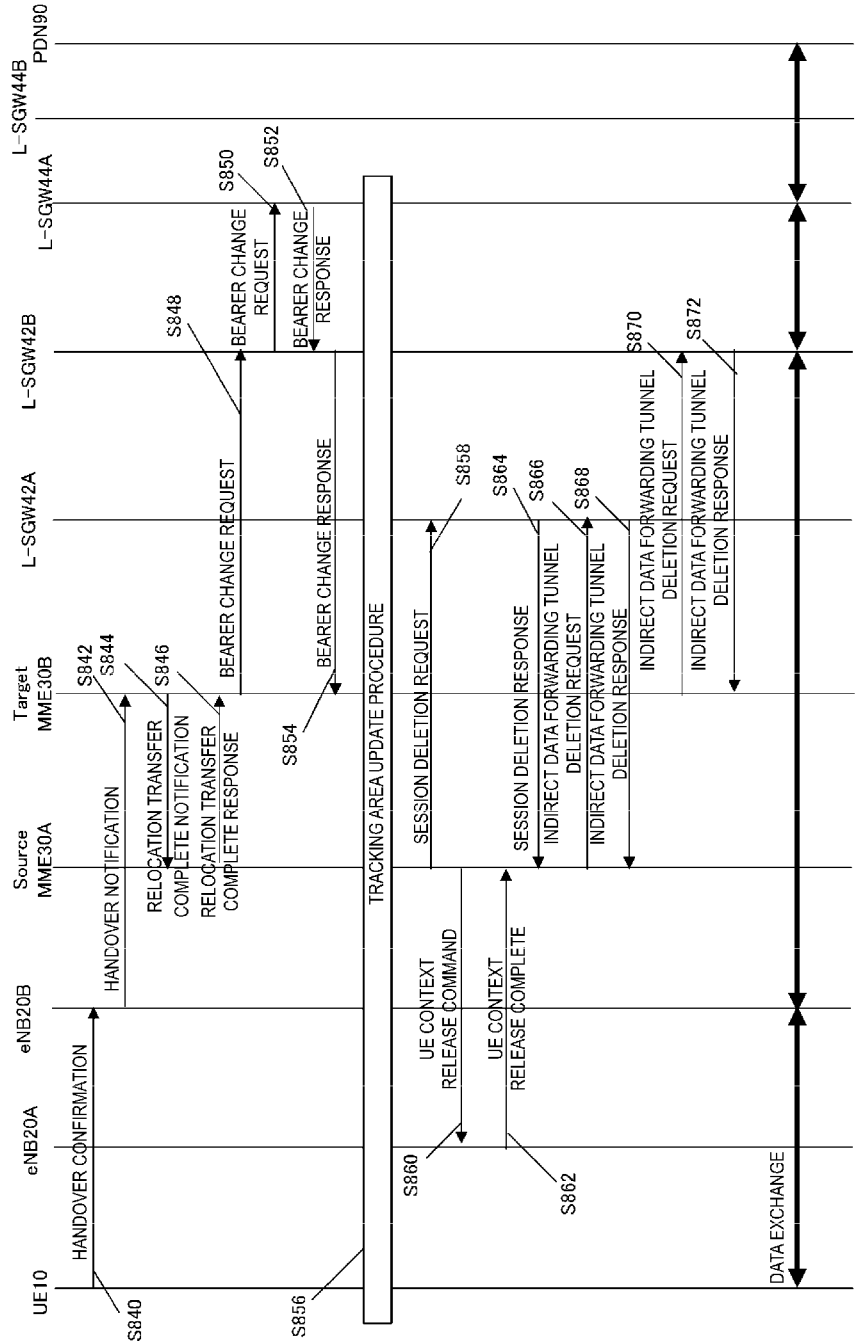
FIG. 8B is a diagram illustrating the handover procedure according to the embodiment.

A specific example of another method will be described, as the handover procedure 2, by using FIG. 8A and FIG. 8B. In the handover procedure 1, the UE 10 does not change the MME 30; however in the handover procedure 2, the UE 10 is capable of performing handover by changing the MME 30. In the below description, a handover procedure by which the MME 30A is changed to the MME 30B in the handover procedure 2 will be described; however, the MME is not necessarily changed. When the MME is not changed, exchange of control information between the MME 30A and the MME 30B in the below handover procedure is considered as an internal process executed within the MME.

Similar to the initial state in the handover procedure 1, in the initial state in the handover procedure 2, the UE 10 is connected to the eNB 20A and is establishing a first PDN connection. The UE 10 is in a state in which data exchange with a communication device (Corresponding Node) included in the PDN 90 is possible by using the first PDN connection.

It should be noted that the UE 10 is establishing the first PDN connection by using the APN 2. Therefore, the first PDN connection may be a PDN connection for SIPTO established between the UE 10 and the L-PGW 44A via the eNB 20A and the L-SGW 42A.

The eNB 20A, a movement-source base station of the UE 10, executes a handover decision process (S802). Through the handover decision process, the eNB 20A determines to start the handover procedure in which the UE 10 switches a connection destination to the eNB 20B. It should be noted that the decision of the handover may be made on the basis of a measurement result of a peripheral base station transmitted by the UE 10.

The eNB 20A transmits, on the basis of the decision of the handover, a handover request message to the MME 30A (S804). Here, requested handover includes information on the handover-destination eNB 20B and information on the MME 30B managing the eNB 20B.

It should be noted that identification information of a neighboring gateway managed by the eNB 20A, such as the LGW 40A or the L-PGW 44A may be included in the requested handover. By including the identification information of a neighboring gateway, the eNB 20A is capable of announcing, to the MME 30, a neighboring gateway capable of establishing a PDN connection for SIPTO.

Furthermore, an LHN ID indicating a network to which the LGW 40A or the L-PGW 44A is connected can be included in the requested handover. When the eNB 20A includes the LHN ID, it is possible to announce, to the MME 30A, the LGW 40A capable of establishing a PDN connection for SIPTO.

It is noted that if the eNB 20A is constituted (arranged) in the same device as that including the LGW 40A, the eNB 20A may include identification information of a neighboring gateway such as an LGW 40A or L-PGW 44A address, and if the LGW 40A is a stand-alone, the eNB 20A may include the LHN ID.

The MME 30A receives the requested handover and transmits, to the MME 30B, a request for relocation transfer (S806). Here, the MME 30A selects the MME 30B on the basis of information on the MME included in the requested handover. Here, the MME 30A can detect, on the basis of the information on the MME included in the requested handover, the relocation of the MME by detecting the MME 30B different from the MME 30A.

It should be noted that the MME 30A can include identification information of a neighboring gateway of the eNB 20A into the request for relocation transfer. Furthermore, the MME 30A may include the LHN ID. Furthermore, the MME 30A may include information on a movement-destination base station, such as identification information of the eNB 20B.

Here, the MME 30A can detect the MME 30A as opposed to the MME 30B, on the basis of the information on the MME included in the requested handover. Here, the MME 30A does not need to detect the relocation of the MME by detecting the MME 30A on the basis of the information on the MME included in the requested handover. When not detecting the MME 30A, the MME 30A does not need to transmit the relocation transfer request.

The following description focuses on a case in which the MME 30A detects the MME 30B on the basis of the information on the MME and then detects the relocation of the MME; however, the operation of the MME 30B may be performed by the MME 30A and a message may be transmitted to the MME 30A, not the MME 30B.

Furthermore, when the MME 30A does not detect the relocation of the MME, the MME 30A does not transmit a message to the MME 30B, the MME 30B does not transmit a message to the MME 30A, and an internal processing may be performed in the MME 30A.

Next, the MME 30B transmits a session generation request to the L-SGW 42B that serves as a transmission destination of data from the eNB 20B (S808). The L-SGW 42B transmits a session generation response to the MME 30B (S810). It should be noted that the transmission of the session generation request (S808) and the transmission of the session generation response (S810) are similar to the conventional procedure, and thus, detailed description thereof is omitted.

Next, the MME 30B transmits a handover request to the eNB 20B (S812). The eNB 20B that has received the handover request transmits a handover request response to the MME 30B (S814). It is noted that the handover request response may include identification information of a neighboring gateway of the eNB 20B, such as the LGW 40B or the L-PGW 44B. By including the identification information of a neighboring gateway, the eNB 20B is capable of announcing, to the MME 30B, a neighboring gateway capable of establishing a PDN connection for SIPTO.

Furthermore, the handover request may include the LHN ID indicating a network to which the LGW 40B or the L-PGW 44B is connected. When the eNB 20B includes the LHN ID, it is possible to announce, to the MME 30B, the LGW 40B for establishing a PDN connection for SIPTO.

It is noted that if the eNB 20B is constituted (arranged) in the same device as that including the LGW 40B, the eNB 20B may include identification information of a neighboring gateway such as an LGW 40B or L-PGW 44B address. Further, if the LGW 40B is constituted stand-alone, the eNB 20B may include the LHN ID.

In addition, the MME 30B transmits an indirect data forwarding tunnel generation request to the L-SGW 42B (S816). Furthermore, the L-SGW 42B transmits an indirect data forwarding tunnel generation response (S818). It should be noted that the indirect data forwarding tunnel generation request (S816) and the indirect data forwarding tunnel generation response (S818) are similar procedures to the conventional one, and thus, detailed description thereof is omitted.

In addition, the MME 30B transmits, to the MME 30A, a response to the relocation transfer (S820). It should be noted that the response to the relocation transfer can include information indicating that the PDN connection for SIPTO needs to be reestablished. Here, the MME 30B can include identification information of a neighboring gateway of the eNB 20B such as an LGW 40B or LPGW 44B address. Furthermore, the MME 30B can include the LHN ID of the LGW 40B or LPGW 44B.

The MME 30A receives the response to the relocation transfer (S820).

Next, the MME 30A transmits an indirect data forwarding tunnel generation request to the SGW 50A (S822). Furthermore, the SGW 50A transmits an indirect data forwarding tunnel generation response to the MME 30A (S824). It should be noted that the transmission of the indirect data forwarding tunnel generation request (S822) and the transmission of the indirect data forwarding tunnel response (S824) are similar procedures to the conventional one, and thus, detailed description thereof is omitted.

The MME 30A can transmit the indirect data forwarding tunnel generation request to the LGW 40A, not to the SGW 50A (S822). Furthermore, the LGW 40A can transmit the indirect data forwarding tunnel generation response to the MME 30A (S824).

Next, the MME 30A transmits a handover command to the eNB 20A (S826). Here, the MME 30A can include the indicator 1 into the handover command.

Here, the MME 30A detects the necessity of gateway switching, and on the basis of the detection result, the MME 30A may transmit the handover command by including it in the indicator 1.

A detection of gateway switching in the MME 30A and an example of procedure on the basis of the detection result will be described, below. It should be that gateway switching can refer to the detection of switching the PDN connection currently established by the UE 10 by reestablishing a new PDN connection. Furthermore, the new PDN connection may be a PDN connection established by using, as an endpoint, a gateway different from that of the currently established PDN connection.

The MME 30A can determine to perform gateway switching by detecting that the identification information of a neighboring gateway of the eNB 20B is different from the identification information of a neighboring gateway of the eNB 20A.

As described above, the identification information of a gateway can be an L-PGW or LGW address, or may be an LHN ID.

For example, the MME 30A can determine to perform gateway switching on the basis of the fact that the identification information of a neighboring gateway of the eNB 20B is an address of the L-PGW 44B, and the identification information of a neighboring gateway of the eNB 20A is an L-PGW 44A.

As described above, the identification information of a gateway can be the LHN ID. The MME 30A can determine to perform gateway switching when the identification information of a gateway that is an endpoint of the PDN connection currently established by the UE 10 is different from the L-PGW or LGW address selected on the basis of the LHN ID.

Here, the eNB 20A may transmit the handover request (S804) by including therein the close gateway identification information 244 managed by the eNB 20A. Thus, the MME 30A may obtain the close gateway identification information 244 managed by the eNB 20A.

Further, the eNB 20B may transmit the handover request response (S814) by including therein the close gateway identification information 244 managed by the eNB 20. In addition, the MME 30B can transmit the response to the relocation transfer (S820) by including in it the close gateway identification information 244 managed by the eNB 20. Thus, the MME 30A can obtain the close gateway identification information 244 managed by the eNB 20B.

Alternatively, the MME 30A can determine to perform gateway switching by detecting that the identification information of a gateway that is an endpoint of the PDN connection currently established by the UE 10 is different from the obtained identification information of a neighboring gateway of the eNB 20B.

As described above, the identification information of a gateway can be the LHN ID. The MME 30A can determine to perform gateway switching when the identification information of a gateway that is an endpoint of the PDN connection currently established by the UE 10 is different from the L-PGW or LGW address selected on the basis of the LHN ID.

For example, the MME 30A can determine to perform gateway switching on the basis of the fact that the identification information of a neighboring gateway of the eNB 20B is an address of the L-PGW 44B, and the identification information of a neighboring gateway of the eNB 20A is an L-PGW 44A.

It should be noted that the MME 30A manages, in the MME communication path context 442, identification information of a gateway that is an endpoint of the PDN connection currently established by the UE 10.

Furthermore, the close gateway identification information 244 managed by the eNB 20B can be obtained using the method described below. The eNB 20B can transmit the handover request response (S814) by including in it the close gateway identification information 244 managed by the eNB 20B. Furthermore, the MME 30B can transmit the response to relocation transfer (S820) by including in it the close gateway identification information 244 managed by the eNB 20B. Thus, the MME 30A can obtain the close gateway identification information 244 managed by the eNB 20B.

In this way, the MME 30A can detect, by using the identification information of a neighboring gateway, that the PDN connection currently established by the UE 10 is not optimal. Furthermore, reestablishment of an optimal PDN connection can be detected.

It should be noted that when the identification information of a gateway is the LHN-ID, it is also possible to detect the necessity of gateway switching by using a similar method.

Furthermore, whether or not to perform gateway switching can be determined on the basis of the permission information of the UE 10.

For example, the MME 30A can determine to perform gateway switching when the UE 10 is permitted to switch to a PDN connection using a different gateway as an endpoint, such as the permission information 2 or the permission information 4.

Alternatively, whether or not to perform gateway switching can be determined on the basis of the permission information of the UE 10.

For example, the MME 30A can determine to perform gateway switching when the UE 10 is permitted to switch to a PDN connection using a different gateway as an endpoint, such as the permission information 2.

Alternatively, the MME 30A can determine to perform gateway switching when the UE 10 is permitted to establish a PDN connection for SIPTO, such as the permission information 1.

It should be noted that the type of permission information used as the basis for determining the performance of gateway switching can be configured by the communication carrier.

Alternatively, whether or not to perform gateway switching can be determined on the basis of the capability information of the UE 10.

For example, the MME 30A can determine to perform gateway switching when the UE 10 is capable of switching to a PDN connection using a different gateway as an endpoint, such as the capability information 2.

Alternatively, the MME 30A can determine to perform gateway switching when the UE 10 is capable of establishing a PDN connection for SIPTO, such as the capability information 1.

It is noted that the type of capability information used as the basis for determining the performance of gateway switching can be configured by the communication carrier.

Alternatively, whether or not to perform gateway switching can be determined on the basis of the APN.

For example, the MME 30A can determine to perform gateway switching when the APN used by the UE 10 for establishing the currently established PDN connection is an APN in which switching to a PDN connection using a different gateway as an endpoint is permitted.

Alternatively, the MME 30A can determine to perform gateway switching when the APN used by the UE 10 for establishing the currently established PDN connection is an APN in which establishment of a PDN connection for SIPTO is permitted.

It is noted that the type of capability information used as the basis for determining the performance of gateway switching can be configured by the communication carrier.

Furthermore, whether or not to perform gateway switching can be determined by combining two or more of the above-described conditions.

Thus, a PDN connection to be reestablished can be a PDN connection managed by associating with permission information such as the permission information 1 or the permission information 2. Furthermore, the PDN connection to be reestablished may be a PDN connection managed by associating with capability information such as the capability information 1 or the capability information 2.

In addition, the PDN connection to be reestablished can be a part of a plurality of established PDN connections. In the present embodiment, the PDN connection to be reestablished is assumed to be the first PDN connection.

According to the detection of gateway switching described above, when detecting gateway switching, the MME 30 can transmit, to the eNB 20A, the handover command message while including it in the indicator 1. It should be noted that when not detecting gateway switching, the MME 30A can transmit, to the eNB 20A, the handover command message without including the indicator 1.

In addition, when announcing the indicator 1, the MME 30A can transmit the indicator 1 in association with information that identifies the PDN connection. Thus, the MME 30A can announce, to the UE 10, information that designates a PDN connection for which reestablishment is requested.

It should be noted that the information that identifies the PDN connection can be information corresponded to the PDN connection, such as a PDN connection ID, a bearer ID, an APN, an IP address (PDN address) or a TEID.

FIG. 9 illustrates an information element included in a handover command message. The handover command message is transmitted from the MME 30A to the eNB 20A. Furthermore, the handover command message is transferred from the eNB 20A to the UE 10.

As illustrated in FIG. 9, the handover command includes a message type, layer 3 information, a cell ID, information from a new BSS to an old BSS, talker priority, transparent information from CN to MS, and the indicator 1.

The message type includes an information element indicating the handover command. The layer 3 information includes a message of a radio interface required for the handover command. The cell ID includes an information element for identifying the eNB 20. The information from a new BSS to an old BSS includes an information element indicating whether or not to be received by the movement-destination eNB 20B.

The talker priority includes priority of a talker in a group call. The transparent information from CN to MS includes Single Radio Voice Call Continuity (SRVCC) access transfer information, etc. It should be noted that the SRVCC refers to continuing voice communication in the VoIP system and voice communication in the line switching system.

It should be noted that the indicator 1 can be managed under a different name. Here, the indicator 1 shown in FIG. 9 is described such that the indicator 1 is separately constituted from the information elements of the message type to the transparent information from CN to MS described above; however, the indicator 1 may be included in the information elements described above. For example, the indicator 1 can be included in the transparent information from CN to MS, or included in the layer 3 information.

The eNB 20A that has received the handover command transfers the handover command to the UE 10 (S828). The UE 10 receives the handover command from the eNB 20A.

It should be noted that when receiving the indicator 1 from the MME 30A, the eNB 20A can transmit, to the UE 10, the handover command while including it in the indicator 1.

Thus, the UE 10 may obtain the indicator 1.

Alternatively, the detection of whether or not to perform gateway switching can be performed by the MME 30B, rather than the MME 30A.

A detection of gateway switching in the MME 30B and an example of such a procedure on the basis of detection result will be described, below. It should be noted that gateway switching can refer to the detection of switching the PDN connection currently established by the UE 10 by reestablishing a new PDN connection. Furthermore, the new PDN connection can be a PDN connection established by using a gateway different from that of the currently established PDN connection as an endpoint.

The MME 30B can determine to perform gateway switching by detecting that the identification information of a neighboring gateway of the eNB 20B is different from the identification information of a neighboring gateway of the eNB 20A.

As described above, the identification information of a gateway can be an L-PGW or LGW address, or may be an LHN ID.

For example, the MME 30 can determine to perform gateway switching on the basis of the fact that the identification information of a neighboring gateway of the eNB 20B is an address of the L-PGW 44B, and the identification information of a neighboring gateway of the eNB 20A is an L-PGW 44A.

As described above, the identification information of a gateway can be the LHN ID. The MME 30B can determine to perform gateway switching when the identification information of a gateway that is an endpoint of the PDN connection currently established by the UE 10 is different from the L-PGW or LGW address selected on the basis of the LHN ID.

Here, the eNB 20A can transmit the handover request (S804) by including in it the close gateway identification information 244 managed by the eNB 20A. Furthermore, the MME 30A can transmit the relocation transfer request (S806) with the close gateway identification information 244 managed by the eNB 20A. Thus, the MME 30B can obtain the close gateway identification information 244 managed by the eNB 20A.

In addition, the eNB 20B can transmit the handover request response (S814) by including in it the close gateway identification information 244 managed by the eNB 20B. Thus, the MME 30B can obtain the close gateway identification information 244 managed by the eNB 20B.

Alternatively, the MME 30B can determine to perform gateway switching by detecting that the identification information of a gateway that is an endpoint of the PDN connection currently established by the UE 10 is different from the obtained identification information of a neighboring gateway of the eNB 20B.

As described above, the identification information of a gateway can be the LHN ID. The MME 30B, the eNB 20A can determine to perform gateway switching when the identification information of a gateway that is an endpoint of the PDN connection currently established by the UE 10 is different from the L-PGW or LGW address selected on the basis of the LHN ID.

For example, the MME 30B can determine to perform gateway switching on the basis of the fact that the identification information of a neighboring gateway of the eNB 20B is an address of the L-PGW 44B, and the identification information of a neighboring gateway of the eNB 20A is an L-PGW 44A.

It should be noted that the MME 30B manages, in the MME communication path context 442, identification information of a gateway that is an endpoint of the PDN connection currently established by the UE 10. Here, the MME communication path context 442 can be obtained from the MME 30A. Moreover, the MME communication path context 442 can be obtained from the one that is included in the relocation transfer request and transmitted.

Another method of obtaining the close gateway identification information 244 managed by the eNB 20B is described method below. The eNB 20B may transmit the handover request response (S814) by including therein the close gateway identification information 244 managed by the eNB 20B. Thus, the MME 30B may obtain the close gateway identification information 244 managed by the eNB 20B.

In this way, the MME 30B can detect, by using the identification information of a neighboring gateway, that the PDN connection currently established by the UE 10 is not optimal. Furthermore, reestablishment of an optimal PDN connection can be detected. It should be noted that when the identification information of a gateway is the LHN-ID, it is also possible to detect the necessity of gateway switching by using a similar method.

Furthermore, whether or not to perform gateway switching can be determined on the basis of the permission information of the UE 10.

For example, the MME 30B can determine to perform gateway switching when the UE 10 is permitted to switch to a PDN connection using a different gateway as an endpoint, such as the permission information 2 or the permission information 4.

Alternatively, whether or not to perform gateway switching can be determined on the basis of the permission information of the UE 10.

For example, the MME 30B can determine to perform gateway switching when the UE 10 is permitted to switch to a PDN connection using a different gateway as an endpoint, such as the permission information 2.

Alternatively, the MME 30B can determine to perform gateway switching when the UE 10 is permitted to establish a PDN connection for SIPTO, such as the permission information 1.

It should be noted that the type of permission information used as the basis for determining the performance of gateway selection can be configured by the communication carrier.

Alternatively, whether or not to perform gateway switching can be determined on the basis of the capability information of the UE 10.

For example, the MME 30B can determine to perform gateway switching when the UE 10 is capable of switching to a PDN connection using a different gateway as an endpoint, such as the capability information 2.

Alternatively, the MME 30B can determine to perform gateway switching when the UE 10 is capable of establishing a PDN connection for SIPTO, such as the capability information 1.

It should be noted that the type of capability information used as the basis for determining the performance of gateway selection can be configured by the communication carrier.

Alternatively, whether or not to perform gateway switching can be determined on the basis of the APN.

For example, the MME 30B can determine to perform gateway switching when the APN used by the UE 10 for establishing the currently established PDN connection is an APN in which switching to a PDN connection using a different gateway as an endpoint is permitted.

Alternatively, the MME 30B can determine to perform gateway switching when the APN used by the UE 10 for establishing the currently established PDN connection is an APN in which establishment of a PDN connection for SIPTO is permitted.

It is noted that the type of capability information used as the basis for determining the performance selection can be configured by the communication carrier.

Furthermore, whether or not to perform gateway switching can be determined by combining two or more of the conditions described above.

Thus, a PDN connection to be reestablished canbe a PDN connection managed by associating with permission information such as the permission information 1 or the permission information 2. Furthermore, the PDN connection to be reestablished can be a PDN connection managed by associating with capability information such as the capability information 1 or the capability information 2.

In addition, the PDN connection to be reestablished can be a part of a plurality of established PDN connections. In the present embodiment, the PDN connection to be reestablished is assumed to be the first PDN connection.

According to the method of detection of gateway switching described above, when detecting gateway switching, the MME 30B can transmit, to the MME 30A, the relocation transfer response message while including it in the indicator 1. It should be noted that when not detecting gateway switching, the MME 30B can transmit, to the MME 30A, the relocation transfer response message without including the indicator 1.

Furthermore, the MME 30A that has received the response message to the relocation transfer transmits the handover command to the eNB 20A. Here, when receiving the indicator 1, the MME 30A can transmit the handover command while including it in the indicator 1.

In addition, the eNB 20A that has received the handover command transfers the handover command to the UE 10 (S828). The UE 10 receives the handover command from the eNB 20A.

It should be noted that when receiving the indicator 1 from the MME 30A, the eNB 20A can transmit, to the UE 10, the handover command while including it in the indicator 1.

Thus, the UE 10 can obtain the indicator 1. Meanwhile, the eNB 20A transmits an eNB status transfer to the MME 30A (S830). The MME 30A transmits a notification of access context transfer to the MME 30B (S832). The MME 30B transmits a response to the access context transfer to the MME 30A (S834). The MME 30B transmits an MME status transfer to the eNB 20B (S836).

Next, the eNB 20B causes the UE 10 to detach from an old cell and synchronize with a new cell (S838). Here, an old cell refers to a cell formed by the eNB 20A, and a new cell refers to a cell formed by the eNB 20B.

The UE 10 which is detached from an old cell and synchronized with a new cell transmits a handover confirmation to the eNB 20B (S840). The eNB 20B transmits a handover notification to the MME 30B (S842). The MME 30B transmits a relocation transfer complete notification to the MME 30A (S844). The MME 30A transmits a relocation transfer complete response to the MME 30B (S846).

The MME 30B transmits a bearer change request to the SGW 50B (S848). The SGW 50B transmits the bearer change request to the PGW 60A (S850). The PGW 60A transmits a bearer change response to the SGW 50B (S852). The SGW 50B transmits the bearer change response to the MME 30B (S854). Transmission from the eNB status transfer (S830) to the transmission of the bearer change response is similar procedures to the conventional one, and thus, a detailed description thereof is omitted.

The MME 30B can transmit a bearer change request to the LGW 40B rather than the SGW 50B (S848). The LGW 40B can transmit the bearer change request to the LGW 40A (S850). The LGW 40A can transmit a bearer change response to the LGW 40B (S852). The LGW 40B that has received the bearer change request can transmit the bearer change response to the MME 30B (S854).

The MME 30B makes the UE 10A perform a tracking area update procedure (S856). It should be noted that a specific method of the tracking area update procedure will be described later, and thus, a detailed description thereof is omitted.

Meanwhile, the MME 30A transmits a session deletion request to the SGW 50A (S858). The SGW 50A transmits a session deletion response to the MME 30A (S864).

Here, the MME 30A can transmit a session deletion request to the LGW 40A, not to the SGW 50A (S858). The LGW 40A can transmit a session deletion response to the MME 30A (S864).

Furthermore, the MME 30A transmits a UE context release command to the eNB 20A (S860). The eNB 20A transmits a context release complete to the MME 30A (S862).

Furthermore, the MME 30A transmits an indirect data forwarding tunnel start request to the SGW 50A (S866). The SGW 50A transmits an indirect data forwarding tunnel deletion response to the MME 30A (S868).

Furthermore, the MME 30A can transmit an indirect data forwarding tunnel start request to the LGW 40A (S866). The LGW 40A can transmit an indirect data forwarding tunnel deletion response to the MME 30A (S868).

Furthermore, the MME 30B transmits an indirect data forwarding tunnel deletion response to the SGW 50B (S870). The SGW 50B transmits an indirect data forwarding tunnel deletion response to the MME 30B (S872).

Furthermore, the MME 30B can transmit an indirect data forwarding tunnel deletion response to the LGW 40B (S870). The LGW 40B can transmit an indirect data forwarding tunnel deletion response to the MME 30B (S872).

It should be noted that the procedures for the transmission from the session deletion request (S858) to the transmission of the indirect data forwarding tunnel deletion response (S872) are similar to the conventional procedure, and thus, a detailed description thereof is omitted.

According to the above handover procedure 2, while the UE 10 is performing data exchange from Source eNB 20A via Source SGW 50A and PGW 60A, the UE 100 moves so that it is possible for the UE 10 to switch to data exchange from Target eNB 20B via Target SGW 50B and PGW 60A.

That is, when the UE 10 has already established the optimal initial PDN connection in advance and is performing data exchange in SIPTO, the movement of the UE 10 occurs, and thus, the initial PDN connection that is not optimal is established through the handover procedure 2.

Here, through the handover procedure 2, the UE 10 can move while the UE 10 performs data exchange from Source eNB 20A via the LGW 40A so that the UE 10 switches to data exchange from Target eNB 20B via the LGW 40B and the LGW 40A.

The MME 30A is capable of announcing that the tracking area update procedure is needed, by including the indicator 1 in the handover command.

Furthermore, by including the indicator 1 in the handover command, the MME 30A can detect reestablishment of the PDN connection for SIPTO and announce to the UE 10, a command for reestablishment.

The eNB 20A is capable of announcing that the tracking area update procedure is needed, by including the indicator 1 in the handover command. Furthermore, by including the indicator 1 in the handover command, the eNB 20A can detect reestablishment of the PDN connection and announce the reestablishment.

The UE 10 is capable of detecting the tracking area update procedure by receiving the handover command including the indicator 1. Furthermore, by detecting that the tracking area update procedure is needed, the UE 10 is capable of starting the tracking area update procedure.

In addition, by receiving the handover command including the indicator 1, the UE 10 can detect reestablishment of the PDN connection. Furthermore, by detecting the reestablishment of the PDN connection, the UE 10 may start the PDN connectivity procedure.

1.3.3. Tracking Area Update Procedure

Figure 10:
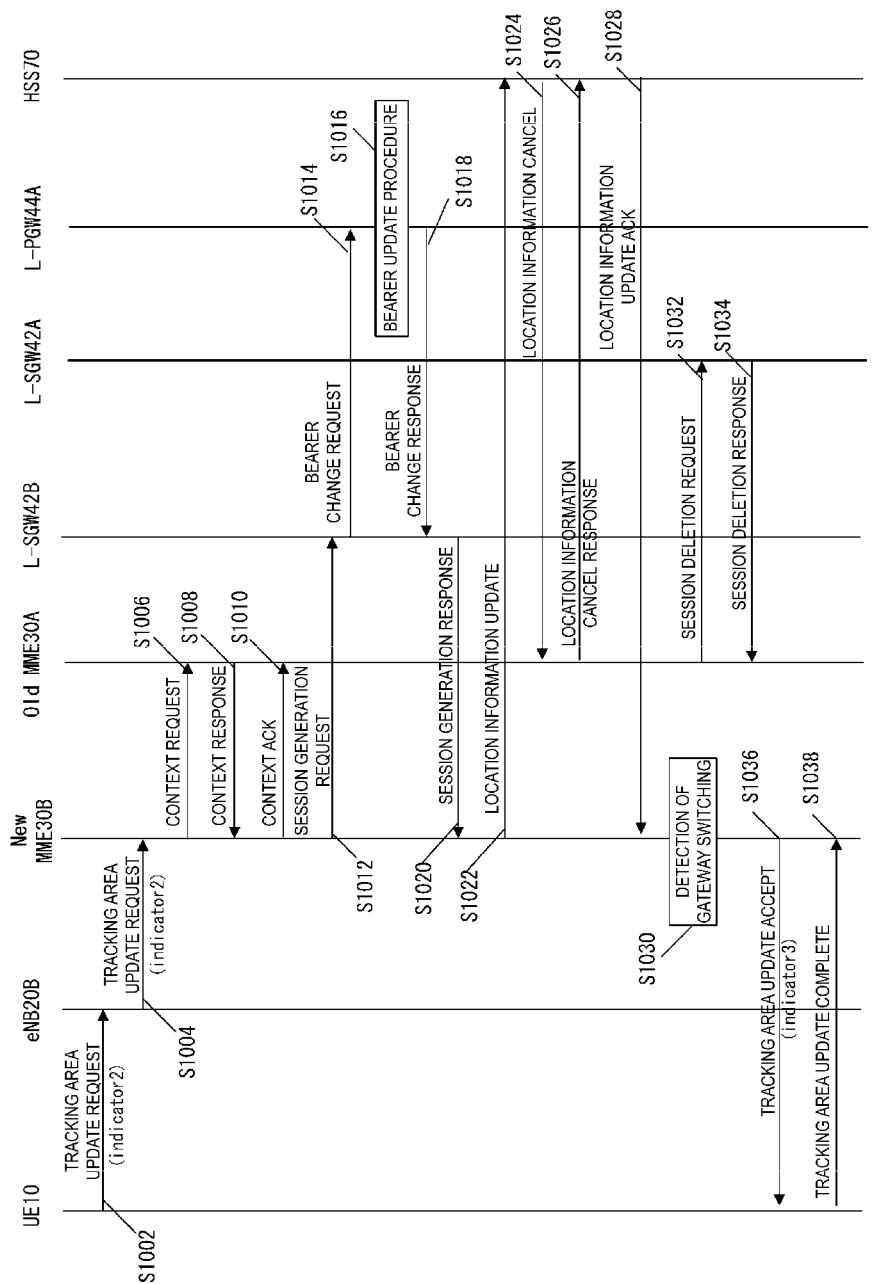
FIG. 10 is a diagram illustrating a tracking area update procedure according to the embodiment.

Next, an example of a more detailed procedure for the tracking area update procedure (S606) described in FIG. 6 will be described in FIG. 10.

The UE 10 can start a tracking area update procedure on the basis of the detection of trigger of the tracking area update procedure (S604) described in FIG. 6.

It should be noted that in the tracking area update procedure, the MME 30B is an MME 30 performing location management after the UE 10 moves. Furthermore, the MME 30A is a device that has performed the location management before the UE 10 moves. In this way, in the tracking area update procedure, the MME can be changed to update the tracking area. In addition, if MME relocation does not occur after the UE 10 moves, the MME 30B does not need to perform the location management of the UE 10, and the MME 30A can perform the location management of the UE 10. That is, the MME 30B and the MME 30A may be the same device. In this case, the exchange of control information between MMEs described later is considered as an internal process executed within the MME.

First, the UE 10 may transmit a tracking area update request to start the tracking area update procedure (S1002). Here, the UE 10 can transmit the tracking area update request by including in it an indicator 2.

FIG. 11A shows the message contents of the tracking area update request. A tracking area update request message is transmitted from the UE 10 to the MME 30B.

As shown in FIG. 11A, the tracking area update request includes a protocol identifier, a security header type, a tracking area update request message ID, an EPS update type, a NAS key set ID, and an old GUTI. In addition to that, a non-current native NAS key set ID, a GPRS encryption key sequence number, an old Packet-Temporary Mobile Subscriber Identity Signature (P-TMSI signature), an additional GUTI, a NOUNCE, UE network capability, a last visited registered Tracking Area ID (TAI), a Discontinuous Reception (DRX) parameter, an update of required UE radio capability information, an EPS bearer context status, MS network capability, an old location area ID, a TMSI status, a mobile station classification symbol 2, a mobile station classification symbol 3, supported codecs, an additional update type, preference of voice area and usage configuration of UE, an old GUTI type, device properties, MS network feature support, a TMSI based NRI container, a T3324 value, a T3412 extended value, and the Indicator 2.

The protocol identifier includes a message regarding EPS movement management in the layer 3. The security header type includes information on the security of NAS message. The tracking area update request message ID includes an identifier indicating the tracking area update request. The EPS update type includes information for clarifying associated area information. The NAS key set ID includes information assigned by the network.

The old GUTI includes a valid GUTI. The GUTI is constituted of an information element that identifies the MME 30 (GUMMEI) and an information element that identifies the UE 10 within the MME 30 (M-TMSI). The non-current native NAS key set ID includes an information element assigned by the network. The GPRS encryption key sequence number includes authentication assigned by the network and an encrypted message.

The old P-TMSI signature includes a valid P-TMSI signature. The P-TMSI signature is authentication information assigned to a mobile station through an attach procedure, a routing area update, etc.

When managing a valid GUTI, a P-TMSI, and an RAI, the GUTI (the information element that identifies the MME 30 (GUMMEI) and the information element that identifies the UE 10 within the MME 30 (M-TMSI)) is included in the additional GUTI.

The NOUNCE includes authentication information of the IMS. The UE network capability includes information using an encryption method.

The last visited registered TAI includes a TAI that was last visited and registered. The TAI is information indicating location information of the UE 10. The DRX parameter is a parameter for saving power consumption required for the UE 10 to perform transmission (uplink) or reception (downlink).

The update of required UE radio capability information includes information indicating whether or not the MME 30 needs to delete UE radio capability information. The EPS Bearer context status includes information indicating a status of EPS bearer context.

The old location area ID includes location information covered by the 3GPP system (3GPP network). An MCC, an MNC, and an LAC are included as location information. The TMSI status includes information indicating whether the TMSI is valid or not.

The mobile station classification symbol 2 includes information on the feature of the UE 10. The network changes command and notification to the UE 10 depending on the information on the mobile station classification symbol 2. Furthermore, the mobile station classification symbol 2 includes information on the priority of the UE 10.

The mobile station classification symbol 3 includes information on the nature of the UE 10. The network changes command and notification to the UE 10 depending on information of the mobile station classification symbol 3. Furthermore, the mobile station classification symbol 3 includes information on all of the frequency bands supported by the UE 10.

In addition, the supported codec list includes information on a voice codec supported by the UE 10. The additional update type includes additional information on a request type in the attach procedure and the tracking area update procedure.

The preference of voice area and usage configuration of UE includes information for selecting a RAT/Frequency Selection Priority (RFSP) index. Specifically, the preference of voice area and usage configuration of UE includes a usage configuration of UE and preference of voice area of the E-UTRAN.

The old GUTI type includes information indicating whether the GUTI is a native GUTI or a mapped GUTI. The device properties include information indicating whether or not the UE 10 is configured with a process with low priority regarding NAS signaling. The network utilizes the device properties for a congestion process or a process for charge of the core network.

The TMSI based NRI container includes information on a part of the TMSI that the network assigns for determining an actual NRI. The T3324 value includes a timer value specified in the GPRS. The T3324 value is the time for controlling the duration of the time in which the UE 10 is in a READY status.

The T3412 extended value includes a timer value specified in the GPRS timer 3. The T3412 extended value includes the time for controlling the duration of the time in which the UE 10 performs bearer update. It should be noted that when the indicator 2 is included, the indicator 2 can be included under a different name.

Here, the indicator 2 shown in FIG. 11A is described such that the indicator 2 is separately constituted from the information elements of the protocol identifier to the T3412 extended value described above; however, the indicator 2 may be included in the information elements from the protocol identifier to the T3412 extended value. For example, the indicator 2 can be included in the mobile station classification symbol 2, the mobile station classification symbol 3, or the UE network capability.

The eNB 20B that has received the tracking area update request from the UE 10 transfers the tracking area update request to the MME 30B (S1004). At this time, the eNB 20B can determine, by means of the GUMMEI or the GUTI included in the tracking area update request from the UE 10, the MME 30B, to which the tracking area update request is transferred. Here, the eNB 20B can select the MME 30A by the GUMMEI or the GUTI. When the eNB 20B selects the MME 30A, the MME 30A may transmit the tracking area update request to the MME 30A.

The following description assumes that the eNB 20B selects the MME 30B. Here, the eNB 20B can include identification information of a neighboring gateway managed by the eNB 20B, such as an IP address of the LGW 40B or the L-PGW 44B, into the tracking area update request.

Furthermore, the eNB 20B can include a Local HeNB Network ID (LHN ID) corresponded to the LGW 40B or the L-PGW 44B. It is noted that the LHN ID can be used as information capable of detecting that the LGW 40B or the L-PGW 44B is capable of establishing a PDN connection for SIPTO.

Furthermore, the eNB 20B can announce such information in advance to the MME 30B without using the tracking area update request message.

For example, the eNB 20B can announce, to the MME 30B, the LHN ID by including the LHN ID into an initial UE message or an uplink NAS transport message, separate from the tracking area update request. Furthermore, the eNB 20B can announce, to the MME 30B, the information that identifies a neighboring gateway, such as an LGW address of the LGW 40B, by including the information into an initial UE message or an uplink NAS transport message, separate from the tracking area update request.

The MME 30B receives the tracking area update request. In addition, the MME 30B obtains the indicator 2 included in the tracking area update request.

Furthermore, the MME 30B can perform core network reselection to detect whether the MME relocation has occurred, by using the GUTI included in the tracking area update request.

Furthermore, the MME 30B detects the LGW 40B if the LGW address is included in the tracking area update request. Furthermore, the MME 30B detects the LGW address of the LGW 40B included in the initial UE message or the uplink NAS transport message.

It should be noted that the MME 30B detects reestablishment of the PDN connection by detecting the LGW 40B. Here, the MME 30B can detect that the PDN connection is not optimal, therefore not detecting reestablishment of the PDN connection. Furthermore, the MME 30B can detect that it is possible to establish an optimal PDN connection. Furthermore, the MME 30B can detect GW switching.

Furthermore, the MME 30B can detect that the eNB 20B manages the LGW 40B if the LHN ID is included in the tracking area update request. Furthermore, the MME 30B detects the LHN ID of the LGW 40B included in the initial UE message or the uplink NAS transport message.

It should be noted that the MME 30B can detect reestablishment of the PDN connection, by detecting the LGW 40B by using the LHN ID. Here, the MME 30B can detect that the PDN connection is not optimal, therefore not detecting reestablishment of the PDN connection. Furthermore, the MME 30B can detect that it is possible to establish an optimal PDN connection. Furthermore, the MME 30B may detect GW switching.

In addition, the MME 30B can detect reestablishment of the PDN connection, by detecting the indicator 2 and the LGW address.

Furthermore, the MME 30B can detect reestablishment of the PDN connection, by detecting the indicator 2 and the LHN ID. Here, the MME 30B can detect that the PDN connection is not optimal, not detecting reestablishment of the PDN connection. Furthermore, the MME 30B can detect that it is possible to establish an optimal PDN connection. Furthermore, the MME 30B can detect GW switching.

Furthermore, the MME 30B can detect reestablishment of the PDN connection by performing the GW selection. In the GW selection, PGW selection can be performed.

Furthermore, in order to select an optimal PGW 60B, the MME 30B can make an inquiry to an HSS 70 to determine the optimal PGW 60B. The selection of the PGW 60B can be performed by transmitting the indicator 2 to the HSS 70 to receive identification information of the PGW 60B.

It should be noted that the MME 30B can detect reestablishment of the PDN connection by comparing a PGW identifier detected by the GW selection and a PGW identifier associated with the PDN connection managed in the MME 30B.

It should be noted that a target of the PDN connection detected to be reestablished can be a PDN connection to which permission information of SIPTO or permission information for switching to a PDN connection having a different gateway, is associated. Furthermore, the target of the PDN connection detected as reestablished can be a PDN connection in which establishment of a PDN connection using a different gateway as an endpoint is permitted.

The MME 30 can detect that the PDN connection is not optimal, not detecting reestablishment of the PDN connection. Furthermore, the MME 30 can detect that it is possible to establish an optimal PDN connection, therefore not detecting reestablishment of the PDN connection. Furthermore, the MME 30 may detect GW switching, therefore not detecting reestablishment of the PDN connection.

Next, the MME 30B can transmit a context request to the MME 30A (S1006). Furthermore, the MME 30A receives the context request and transmits a context response to the MME 30B (S1008).

It should be noted that a context to be transmitted can include permission information of the UE 10 such as the permission information 1 and the permission information 2, capability information of the UE 10 such as the capability information 1 and the capability information 2, identification information of a neighboring gateway of the eNB 20A, such as an address of the LGW 40A or L-PGW 44A, the LHN ID corresponded to the LGW 40 or the L-PGW 44A, etc.

The MME 30B receives the context response. It should be noted that the MME 30B can detect reestablishment of the PDN connection of the UE 10, on the basis of information included in the context response from the MME 30A.

For example, the MME 30B can determine to reestablish the PDN connection of the UE 10, by detecting that a neighboring gateway of the eNB 20B and a neighboring gateway of the eNB 20A are different gateways. Alternatively, the MME 30B can detect reestablishment of the PDN connection of the UE 10, if the LHN ID corresponded to a neighboring gateway of the eNB 20B and the LHN ID corresponded to a neighboring gateway of the eNB 20A are different.

The MME 30 can detect that the PDN connection is not optimal, therefore not detecting reestablishment of the PDN connection. Furthermore, the MME 30 can detect that it is possible to establish an optimal PDN connection, not detecting reestablishment of the PDN connection. Furthermore, the MME 30 can detect GW switching, not detecting reestablishment of the PDN connection.

Furthermore, the MME 30B transmits context ACK to the MME 30A (S1010). Here, the MME 30B can include, into the context ACK, information indicating reestablishment of the PDN connection.

The MME 30A receives the context ACK. It should be noted that the MME 30A can perform location management without performing MME relocation even after the UE 10 moves to the eNB 20B, and the MME 30B can serve as the MME 30A. That is, the MME 30B can perform an internal process without transmitting the context request to the MME 30A. Furthermore, the MME 30A can perform an internal process without transmitting the context response to the MME 30B. Furthermore, the MME 30A can perform the internal process without transmitting the context ACK to the MME 30B.

Next, the MME 30B transmits a session generation request to the L-SGW 42B (S1012). Furthermore, the L-SGW 42B receives the session generation request and transmits a bearer change request to the L-PGW 44A (S1014). When receiving the bearer change request, the L-PGW 44A performs a bearer update procedure (S1016). When performing the bearer change procedure, the L-PGW 44A transmits a bearer change response to the L-SGW 42B (S1018). Furthermore, the L-SGW 42B receives the bearer change response and transmits a session generation response (S1020).

Here, the MME 30B can transmit a session generation request to the L-SGW 42B (S1012). Furthermore, the L-SGW 42B can receive the session generation request and transmit a bearer change request to the L-PGW 44A (S1014). When receiving the bearer change request, the L-PGW 44A can perform a bearer update procedure (S1016). When performing the bearer change procedure, the L-PGW 44A can transmit a bearer change response to the L-SGW 42B (S1018). Furthermore, the L-SGW 42B may receive the bearer change response and transmit a session generation response (S1020).

Next, the MME 30B transmits location information update to the HSS 70 (S1022). The HSS 70 receives the location information update from the MME 30B and detects that an update of location information in the UE 10 has been performed by the MME 30B.

Next, the HSS 70 transmits location information cancel to the MME 30A (S1024). The MME 30A receives the location information cancel from the HSS 70 and detects that an update of location information in the UE 10 has not been performed. The MME 30A transmits a location information cancel response to the HSS 70 (S1026).

The HSS 70 receives the location information cancel response from the MME 30A, detects that the MME 30A does not change the location information of the UE 10, and transmits location information update ACK to the MME 30B (S1028). Here, the HSS 70 can transmit information on the UE 10 to the MME 30B. The information on the UE 10 can be an International Mobile Subscriber Identity (IMSI) and contractor information of the UE 10, for example. It should be noted that the contractor information can include permission information of the UE 10 such as the permission information 1 and the permission information 2. Furthermore, the contractor information can include information on the location of the UE 10.

It should be noted that when the MME 30B is not changed in accordance with the movement of the UE 10 (when not detecting the MME relocation), the MME 30B does not need to transmit the location information update (S1022).

That is, the MME 30B can perform transmission from the location update (S1022) to the location information update ACK of the HSS 70 (S1028).

The MME 30B detects the necessity for gateway switching (S1030).

Detection of gateway switching in the MME 30B and an example of the procedure based on the detection result will be described below. It should be noted that gateway switching can refer to the detection of switching the PDN connection currently established by the UE 10 by reestablishing a new PDN connection. Furthermore, the new PDN connection can be a PDN connection established by using, as an endpoint, a gateway different from that of the currently established PDN connection.

The MME 30B can determine to perform gateway switching by detecting that the identification information of a neighboring gateway of the eNB 20B is different from the identification information of a neighboring gateway of the eNB 20A.

As described above, the identification information of a gateway can be an L-PGW, LGW address, or an LHN ID.

For example, the MME 30B can determine to perform gateway switching on the basis of the fact that the identification information of a neighboring gateway of the eNB 20B is an address of the L-PGW 44B, and the identification information of a neighboring gateway of the eNB 20A is an L-PGW 44A.

As described above, the identification information of a gateway can be the LHN ID. The MME 30B, the eNB 20A can determine to perform gateway switching when the identification information of a gateway that is an endpoint of the PDN connection currently established by the UE 10 is different from the L-PGW or LGW address selected on the basis of the LHN ID.

Here, the eNB 20A can first perform transmission, to the MME 30A, by including therein the close gateway identification information 244 managed by the eNB 20A, and then the MME 30A can transmit a context response message (S1008) by including in it the close gateway identification information 244 managed by the eNB 20A. Thus, the MME 30B can obtain the close gateway identification information 244 managed by the eNB 20A.

In addition, the eNB 20B can transmit the tracking area update request (S1004), by including in it the close gateway identification information 244 managed by the eNB 20. Thus, the MME 30B can obtain the close gateway identification information 244 managed by the eNB 20B.

Alternatively, the MME 30B can determine to perform gateway switching by detecting that the identification information of a gateway that is an endpoint of the PDN connection currently established by the UE 10, is different from the obtained identification information of a neighboring gateway of the eNB 20B.

As described above, the identification information of a gateway can be the LHN ID. The MME 30B, the eNB 20A can determine to perform gateway switching when the identification information of a gateway that is an endpoint of the PDN connection currently established by the UE 10 is different from the L-PGW or LGW address selected on the basis of the LHN ID.

For example, the MME 30B can determine to perform gateway switching on the basis of the fact that the identification information of a neighboring gateway of the eNB 20B is an address of the L-PGW 44B, and the identification information of a neighboring gateway of the eNB 20A is an L-PGW 44A.

It should be noted that the MME 30B manages, in the MME communication path context 442, identification information of a gateway that is an endpoint of the PDN connection currently established by the UE 10. Here, the MME communication path context 442 can be obtained from the MME 30A. Moreover, the MME communication path context 442 can be obtained from the one that is included in the context response message (S1008) and transmitted.

Furthermore, a method of obtaining the close gateway identification information 244 managed by the eNB 20B is described below. The eNB 20B can transmit the tracking area update request (S1004), by including in it the close gateway identification information 244 managed by the eNB 20B. Thus, the MME 30B can obtain the close gateway identification information 244 managed by the eNB 20B.

In this way, the MME 30B can detect, by using the identification information of a neighboring gateway, that the PDN connection currently established by the UE 10 is not optimal. Furthermore, reestablishment of an optimal PDN connection can be detected. It should be noted that when the identification information of a gateway is the LHN-ID, it is also possible to detect the necessity of gateway switching by using a similar method.

Furthermore, whether or not to perform gateway switching can be determined on the basis of the permission information of the UE 10.

For example, the MME 30B can determine to perform gateway switching when the UE 10 is permitted to switch to a PDN connection using a different gateway as an endpoint, such as the permission information 2 or the permission information 4.

Alternatively, whether or not to perform gateway switching can be determined on the basis of the permission information of the UE 10.

For example, the MME 30B can determine to perform gateway switching when the UE 10 is permitted to switch to a PDN connection using a different gateway as an endpoint, such as the permission information 2.

Alternatively, the MME 30B can determine to perform gateway switching when the UE 10 is permitted to establish a PDN connection for SIPTO, such as the permission information 1.

It should be noted that the type of permission information used as the basis for determining the performance of gateway selection can be configured by the communication carrier.

Alternatively, whether or not to perform gateway switching can be determined on the basis of the capability information of the UE 10.

For example, the MME 30B can determine to perform gateway switching when the UE 10 is capable of switching to a PDN connection using a different gateway as an endpoint, such as the capability information 2.

Alternatively, the MME 30B can determine to perform gateway switching when the UE 10 is capable of establishing a PDN connection for SIPTO, such as the capability information 1.

It is noted that the type of capability information used as the basis for determining the performance of gateway selection can be configured by the communication carrier.

Alternatively, whether or not to perform gateway switching can be determined on the basis of the APN.

For example, the MME 30B can determine to perform gateway switching when the APN used by the UE 10 for establishing the currently established PDN connection is an APN in which switching to a PDN connection using a different gateway as an endpoint is permitted.

Alternatively, the MME 30B can determine to perform gateway switching when the APN used by the UE 10 for establishing the currently established PDN connection is an APN in which establishment of a PDN connection for SIPTO is permitted.

It is noted that the type of capability information used as the basis for determining the performance of gateway switching can be configured by the communication carrier.

Furthermore, whether or not to perform gateway switching can be determined by combining two or more of the conditions described above.

Thus, a PDN connection to be reestablished can be a PDN connection managed by associating with permission information such as the permission information 1 or the permission information 2. Furthermore, the PDN connection to be reestablished can be a PDN connection managed by associating with capability information such as the capability information 1 or the capability information 2.

In addition, the PDN connection to be reestablished can be a part of a plurality of established PDN connections. In the present embodiment, the PDN connection to be reestablished is assumed to be the first PDN connection. It should be noted that the MME 30B can detect reestablishment of the PDN connection by comparing a PGW identifier detected by the GW selection and a PGW identifier associated with the PDN connection managed in the MME 30B.

The MME 30B transmits a tracking area update accept message as a response to a received tracking area request message (S1036). Here, the MME 30B can transmit the tracking area update accept by including in it the indicator 3. Furthermore, whether or not to include the indicator 3 may be determined on the basis of the detection of gateway switching. Specifically, when it is determined that gateway switching is needed, transmission can be performed by including the indicator 3, and when it is determined that gateway switching is not needed, transmission may be performed without the inclusion of the indicator 3.

Furthermore, when announcing the indicator 3, the MME 30A can transmit the indicator 3 in association with information that identifies the PDN connection. Thus, the MME 30A can announce, to the UE 10, information that designates a PDN connection for which reestablishment is requested. It should be noted that the information that identifies the PDN connection can be information corresponded to the PDN connection, such as a PDN connection ID, a bearer ID, an APN, an IP address (PDN address) or a TEID.

FIG. 11B shows the contents of the tracking area update accept message. A tracking area update accept message is transmitted from the MME 30B to the UE 10.

As shown in FIG. 11B, the tracking area update accept includes a protocol identifier, a security header type, a tracking area update accept message ID, an EPS update result, a spare half octet. In addition to that, a T3412 value, a GUTI, a TAI list, an EPS bearer context status, a location area ID, an MS ID, an EMM cause, a T3402 value, a T3423 value, equivalent PLMNs, an emergency number list, an EPS network feature support, an additional update result, a T3412 extended value, a T3324 value, and the Indicator 3.

It should be noted that the protocol identifier includes a message regarding EPS movement management in the layer 3. The security header type includes information on the security of NAS message. The tracking area update accept message ID includes an ID indicating the tracking area update accept message. The EPS update result includes information indicating the result of associated update procedure.

The spare half octet includes a spare (zero "0"). The T3412 value includes a timer value for GPRS. The T3412 includes information regarding the duration of time during which the tracking area update procedure is regularly controlled.

The GUTI includes a GUTI assigned to the UE 10. The TAI list includes a TAI. The EPS bearer context status includes information indicating a status of the EPS bearer context.

The location area ID includes location information covered by the 3GPP system (3GPP network). The MSID includes information that identifies the UE 10. The information that identifies the UE 10 can be any one of an IMSI, a TMSI, an International Mobile Equipment Identity (IMEI), and an International Mobile Equipment Identity together with the Software Version number (IMEISV). Furthermore, the TMSI can be a Packet switched-TMSI (P-TMSI), or an MME-TMSI (M-TMSI).

The EMM cause includes information regarding the reason why the tracking area update failed. The T3402 value includes a timer value specified in the GPRS. After the tracking area update procedure failed, the T3402 then specifies the time until the tracking area update procedure is started.

The T3423 includes a timer value specified in the GPRS. In the T3412, when detecting that there is no cell available for the UE 10, Temporary Identity used in Next update (TIN) needs to be rewritten into the P-TMSI after the time is configured in the T3412.

The equivalent PLMNs include a new PLMN list assignment to the UE 10. The emergency number list includes information for emergency service.

The EPS network feature support includes information indicating whether or not certain features are supported in the network. Some features include: information indicating whether or not IMS voice is supported on a packet session (IMS VoPS, IMS voice over PS session indicator); information indicating whether an emergency bearer service (EMC BS, EMergenCy Bearer Services indicator) is supported; information indicating whether or not a location information service notification is supported in EPC (EPC-LCS, Location Service indicator in EPC); information indicating whether or not a location information service notification is supported in CS (CS-LCS, Location Service indicator in CS); and information indicating whether or not an extended service request for a packet service (ESP PS, Support of EXTENDED SERVICE REQUEST for packet service) is supported.

The additional update result includes information indicating the result of the associated update procedure, in addition to the update result shown above. As an additional update result, it is possible to indicate that CS fall back is not preferred, or to indicate that only SMS is valid. It should be noted that as an additional update result, it is possible to indicate that there is no new information.

The T3412 extended value includes a timer value shown in the GPRS timer 3. The T3412 extended value includes the duration of time during which the UE 10 performs bearer update.

The T3324 value includes information shown in the GPRS timer. When detecting a state in which there is no cell available for the UE 10, the T3324 value indicates the time until the transition to a Power Saving Mode (PSM). It should be noted that the indicator 3 may have a name different from the indicator 3.

Here, the indicator 3 shown in FIG. 11B is described such that the indicator 3 is separately constituted from the information elements of the protocol identifier to the T3342 value described above; however, the indicator 3 may be included in the information elements described above. For example, the indicator 3 may be included in the EMM cause.

The UE 10 receives the tracking area update accept. Furthermore, the UE 10 may receive the indicator 3 included in the tracking update accept. Furthermore, in this way, the UE 10 can detect that reestablishment of the PDN connection is needed.

In addition, the UE 10 can receive information indicating the indicator 3 and the first PDN connection upon the reception of the tracking area update accept.

Meanwhile, the MME 30A transmits a session deletion request to the L-SGW 42A (S1032). Furthermore, the L-SGW 42A transmits a session deletion response to the MME 30A (S1034). It should be noted that when connection between the eNB 20A and the L-SGW 42A is deleted, the MME 30A does not need to transmit the session deletion request (S1032) and the L-SGW 42A does not need to transmit the session deletion request.

In this way, the UE 10 is capable of completing the tracking area update procedure. Through the tracking area update procedure, the UE 10 detects reestablishment of the PDN connection. By reestablishing the PDN connection, the UE 10 detects establishment of the second PDN connection and deletion of the first PDN connection.

It should be noted that, as described by using FIG. 6, the tracking area update procedure described above is described to be executed after the handover procedure (S604) is completed and the detection of trigger (S604) is performed; however, the tracking area update procedure may be executed during handover procedure such as the handover procedure 1 or the handover procedure 2.

Figure 7:
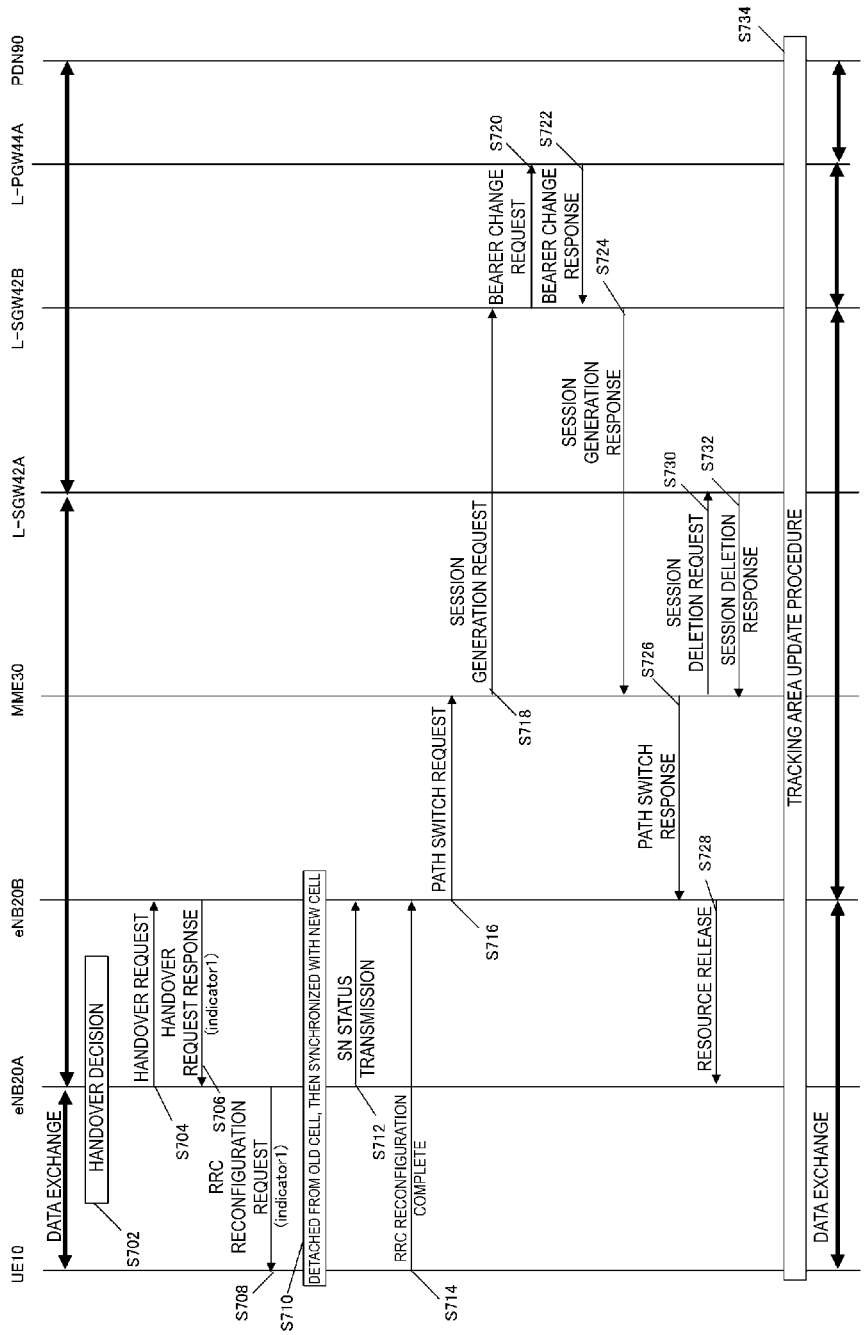
FIG. 7 is a diagram illustrating a handover procedure according to the embodiment.

For example, the tracking area update procedure (S734) described in the handover procedure 1 described by using FIG. 7 can be this tracking area update procedure. Furthermore, the tracking area update procedure (S856) described in the handover procedure 2 described by using FIGS. 8A and 8B can be this tracking area update procedure. It should be noted that these tracking area update procedures can be executed only when the trigger detection procedure (S604) described by using FIG. 6 is executed and a trigger is detected subsequently.

1.3.4 PDN Connectivity Procedure

Next, the details of the PDN connectivity procedure (S608) described in FIG. 6 will be described. The UE 10 is capable of establishing the second PDN connection by executing the PDN connectivity procedure.

In addition, the UE 10 can detect that it is possible to establish a more optimal PDN connection compared to the first PDN connection and then start the PDN connectivity procedure. It should be noted that such a detection procedure is as described above. The PDN connectivity procedure can be started on the basis of the obtainment of the indicator 1. Or, the UE 10 can start the PDN connectivity procedure on the basis of the obtainment of the indicator 3. Or, the UE 10 can start the PDN connectivity procedure on the basis of the obtainment of the indicator 1 and the indicator 3.

It is noted that the second PDN connection can be established by utilizing the information of the first PDN connection.

First, the UE 10 transmits a PDN connectivity request to the MME 30B and starts a PDN connectivity procedure (S1202).

It is noted that the UE 10 can start the PDN connectivity procedure immediately after the detection of reestablishment of the PDN connection, or can suspend reestablishment of the PDN connection until transitioning to an idle mode and after transitioning to an idle mode, then start the PDN connectivity procedure.

The UE 10 can transmit a PDN connectivity request message by including in it an APN. Furthermore, the UE 10 can transmit the PDN connectivity request by including in it information that identifies the first PDN connection. Here, it is noted that the information that identifies the PDN connection can be information corresponded to the first PDN connection, such as an LBI, a PDN connection ID, a bearer ID, an APN, an IP address (PDN address) or a TEID.

Furthermore, the UE 10 can transmit the PDN connectivity request while including in it identification information indicating to request to request the same IP address as the IP address assigned to the first PDN connection. It should be noted that the identification information can be the APN used when establishing the first PDN connection, an IP address corresponded to the first PDN connection, an LBI, a PDN connection ID, a bearer ID, or a TEID. Furthermore, the UE 10 can transmit the PDN connectivity request by including in it permission information of the UE 10, such as the permission information 1 or the permission information 2.

Here, an example in which the UE 10 requests establishment of the second PDN connection by using the APN used when establishing the first PDN connection is described; however, the UE 10 may request establishment of the second PDN connection by using a different APN.

For example, the UE 10 can request establishment of the second PDN connection by using the APN 1, and establish a PDN connection that is a PDN connection for SIPTO as well as a PDN connection in which switching to a PDN connection using a different gateway as an endpoint is not permitted.

Furthermore, the UE 10 can request establishment of the second PDN connection by using the APN 2, and can establish a PDN connection that is a PDN connection for SIPTO as well as a PDN connection in which switching to a PDN connection using a different gateway as an endpoint is permitted.

Furthermore, the UE 10 can request establishment of the second PDN connection by using the APN 3, and can establish a PDN connection that is a PDN connection using a PDN gateway included in the core network 7 as an endpoint as well as a PDN connection in which switching to a PDN connection using a different gateway as an endpoint is not permitted.

Furthermore, the UE 10 can request establishment of the second PDN connection by using the APN 4, and can establish a PDN connection that is a PDN connection using a PDN gateway included in the core network 7 as an endpoint as well as a PDN connection in which switching to a PDN connection using a different gateway as an endpoint is not permitted.

Furthermore, the UE 10 may transmit the PDN connectivity request by including therein capability information of the UE 10, such as the capability information 1 or the capability information 2.

It should be noted that the PDN connectivity request transmitted by the UE 10 is transmitted via the eNB 20B. Here, the eNB 20B can include in the PDN connectivity request to be transmitted to the MME 30B, identification information of a neighboring gateway managed by the eNB 20B, such as the L-PGW 44B or the LGW 40B. Furthermore, the eNB 20B can include in the PDN connectivity request to be transmitted to the MME 30B, the LHN ID indicating a network of the L-PGW 44B or LGW 40B.

Furthermore, the eNB 20B can announce such information in advance to the MME 30B without using the PDN connectivity request message.

For example, the eNB 20B can announce, to the MME 30B, the LHN ID by including the LHN ID in an initial UE message or an uplink NAS transport message, separately from the PDN connectivity request message. Furthermore, the eNB 20B can announce, to the MME 30B, the information that identifies a neighboring gateway, such as an LGW address of the LGW 40B, by including the information in an initial UE message or an uplink NAS transport message, separately from the PDN connectivity request message.

The MME 30B receives the PDN connectivity request from the UE 10 or the eNB 20. The MME 30B receives the PDN connectivity request and detects that the UE 10 reestablishes the PDN connection. Here, the information indicating that the UE 10 reestablishes the PDN connection can be the APN included in the PDN connectivity request or the identification information of the first PDN connection. That is, the MME 30B can perform on the basis of the APN included in the PDN connectivity request or the identification information of the first PDN connection. Furthermore, the MME 30B can detect reestablishment of the PDN connection on the basis of the permission information or capability information of the UE 10.

Furthermore, the MME 30B can determine to assign, to the second PDN connection, the IP address that has been assigned to the first PDN connection. Moreover, the MME 30B can announce, to the L-PGW 40B, the IP address and request assignment of this IP address to the UE 10.

It should be noted that this determination can be made on the basis of the reception of the identification information that is transmitted by the UE 10 and indicates to request to request the same IP address as the IP address assigned to the first PDN connection.

Furthermore, the MME 30B can perform GW selection for establishing a PDN connection by using the APN included in the PDN connectivity request. Here, the GW selection refers to selecting a gateway device serving as an endpoint of the second PDN connection established by the UE 10.

It should be noted that the MME 30B can select a neighboring gateway of the eNB 20B to establish a PDN connection.

Furthermore, the MME 30B can select a gateway included in the access network when receiving an APN in which establishment of a PDN connection for SIPTO is permitted, such as the APN 1 or the APN 2. Also, when receiving an APN such as the APN 3 or the APN 4, a gateway included in the core network 7 can be selected.

Furthermore, the MME 30B can detect, by the PDN connection ID included in the PDN connectivity request, that the GW selection for reestablishing the PDN connection has been is performed. Furthermore, the MME 30B can detect, by the bearer ID included in the PDN connectivity request, that the GW selection for reestablishing the PDN connection has been performed.

Here, the MME 30B can detect that the PDN connection is not optimal, therefore not reestablishing the PDN connection. Furthermore, the MME 30B can detect that it is possible to establish an optimal PDN connection. The MME 30B can detect GW switching.

It should be noted that the MME 30B selects, on the basis of the reception of the PDN connectivity request, a gateway serving as an endpoint of the second PDN connection.

The MME 30B selects a gateway device close to the eNB 20B, such as the L-PGW 44B or the LGW 40B.

The MME 30B can select, by the LHN ID of the LGW 40B announced from the eNB 20B, a neighboring gateway of the eNB 20B.

Furthermore, the MME 30B can select a gateway by making an inquiry to the HSS 70. The MME 30B can transmit an APN to the HSS 70 and receive identification information of the L-PGW 44B or LGW 40B.

Next, the MME 30B transmits a session generation request to the L-SGW 42B (S1204). Here, the MME 30B can include information regarding the PDN connection in the session generation request. The information regarding the PDN connection can be a PDN connection ID, a bearer ID, an APN, or an IP address. By including the information regarding the PDN connection in the session generation request, the MME 30B can request assignment of the IP address that has assigned in the first PDN connection, in the second PDN connection to be established for the reestablishment.

The L-SGW 42B transmits the session generation request to the L-PGW 44B (S1206). Furthermore, the L-SGW 42B can include the information regarding the PDN connection in the session generation request. The L-PGW 44B that has received the session generation request performs a session establishment procedure (S1208). Here, when the information regarding the PDN connection is included in the session generation request, the L-PGW 44B can determine that in order to perform reestablishment, it is required to assign, also in the second PDN connection to be established, the IP address that has assigned in the corresponding first PDN connection.

When detecting that in order to perform reestablishment, it is required to assign the assigned IP address also in the second PDN connection to be established, the L-PGW 44B can use the IP address that has assigned in the first PDN connection as an IP address to be assigned to the second PDN connection. Here, when the assignment of the IP address is consigned to a third server device (a DHCP, for example), the L-PGW 44B can indicate information indicating an assignment from the third server device.

When not detecting that, in order to perform reestablishment, it is requested to assign, also in the second PDN connection to be established, the IP address that has assigned in the first PDN connection, the L-PGW 44B may optionally determine the IP address to be assigned to the second PDN connection.

It should be noted that, other than the above, the procedures from the transmission of the session generation request (S1204) to the transmission of the session generation request (S1208) are similar to the conventional procedure.

The L-PGW 44B that has completed the session establishment procedure transmits a session generation response to the L-SGW 42B (S1210). Here, before transmitting the session generation response, the L-PGW 44B can assign a PDN connection ID. The assigned PDN connection ID can be managed in the L-SGW 42B, the MME 30B, and the UE 10. The assigned PDN connection ID can be transmitted by including the ID into the session generation response.

It should be noted that the L-PGW 44B can detect establishment of the PDN connection and then assign a PDN connection ID. The L-PGW 44B can newly assign identification information of the PDN connection, or assign the same PDN connection ID as that of the first PDN connection to the second PDN connection.

Meanwhile, the L-PGW 44B that has completed the session establishment procedure can perform an internal process without transmitting a session generation response (S1210). Here, before transmitting the session generation response, the L-PGW 44B can assign a PDN connection ID. The assigned PDN connection ID can be managed in the L-PGW 44B, the L-SGW 42B, the MME 30B, and the UE 10. The assigned PDN connection ID can be transmitted by including the ID in the session generation response.

In addition, the L-SGW 42B transmits the session generation response to the MME 30B (S1211). Here, when the L-SGW 42B receives the PDN connection ID from the L-PGW 44B, the L-SGW 42B can include the PDN connection ID in the session generation response.

The MME 30B receives the session generation response. When the PDN connection ID is included in the session generation response, the MME 30B can manage the PDN connection ID. Or, when the PDN connection ID is not included, the MME 30B can assign a PDN connection ID.

Alternatively, the MME 30B can assign an EPS bearer ID. It should be noted that the EPS bearer ID can be associated with the PDN connection and managed.

Next, the MME 30B transmits to the eNB 20B, a bearer configuration request/PDN connection permission notification (S1212). It should be noted that the MME 30B notifies information regarding a newly established PDN connection by including the information in the bearer configuration request or the PDN connection permission notification. It should be noted that the MME 30B can include, in the PDN connection permission notification, information indicating deletion of the non-optimal PDN connection. Furthermore, the information indicating deletion of the non-optimal PDN connection includes a wide variety of identifiers, but can be any one of the EPS bearer ID, the PDN connection ID, the APN, and the PDN address. Furthermore, the information indicating deletion of the non-optimal PDN connection can be a combination of the bearer ID, the PDN connection ID, the APN, and the PDN address.

Furthermore, the MME 30B can include information indicating a PDN connection to be newly assigned. It should be noted that the information indicating a PDN connection to be newly assigned includes wide variety of identifiers, but can be any one of the bearer ID, the PDN connection ID, the APN, and the PDN address. Furthermore, the information indicating a PDN connection to be newly assigned may be a combination of the bearer ID, the PDN connection ID, the APN, and the IP address.

In addition, the eNB 20B receives the bearer configuration request/PDN connection permission notification, and transmits an RRC connection reconfiguration notification to the UE 10 (S1214). It should be noted that the eNB 20B includes the PDN connection permission notification in the RRC connection reconfiguration notification to the UE 10. Here, the eNB 20B can include the PDN connection permission notification, separate from the RRC connection reconfiguration notification to the UE 10. That is, the eNB 20B announces the information regarding a newly established PDN connection by transferring the PDN connection permission notification. Furthermore, by eNB 20B can announce the information indicating deletion of the non-optimal PDN connection, by transferring the PDN connection permission notification.

The UE 10 receives the RRC connection reconfiguration notification from the eNB 20B. Here, the UE 10 detects the information regarding a newly established PDN connection included in the PDN connection permission notification from the eNB 20B, and manages the same in the UE 10. It should be noted that the information indicating a PDN connection to be newly assigned includes a wide variety of identifiers, but may be any one of the EPS bearer ID, the PDN connection ID, the APN, and the PDN address. Furthermore, the information indicating a PDN connection to be newly assigned can be a combination of the bearer ID, the PDN connection ID, the APN, and the PDN address. Furthermore, the UE 10 can manage the PDN connection with the bearer ID, the PDN connection ID, the APN, and the PDN address being associated.

Furthermore, the UE 10 detects the information indicating deletion of the non-optimal PDN connection, the information being included in the PDN connection permission notification from the eNB 20B. Furthermore, the information indicating deletion of the non-optimal PDN connection includes a wide variety of identifiers, but can be any one of the bearer ID, the PDN connection ID, the APN, and the PDN address. Furthermore the information indicating deletion of the non-optimal PDN connection can be a combination of the bearer ID, the PDN connection ID, the APN, and the PDN address.

The UE 10 transmits an RRC connection reconfiguration complete notification to the eNB 20B (S1216). The eNB 20B transmits a bearer configuration response to the MME 30B (S1218).

In addition, the UE 10 transmits a direct transfer to the eNB 20B (S1220). The eNB 20B transmits a PDN connection complete to the MME 30B (S1222). The MME 30B transmits a bearer change request to the L-SGW 44B (S1224). The L-SGW 44B transmits a bearer change response to the MME 30B (S1230).

It should be noted that from the transmission of the RRC connection reconfiguration notification (S1214) to the transmission of the bearer change response (S1224) are similar to the conventional procedures, and thus, a detailed description thereof is omitted.

Through the above procedures, the UE 10 is capable of establishing an optimal second PDN connection and performing data exchange by using the second PDN connection.

1.3.5 PDN Disconnection Procedure

Figure 13:
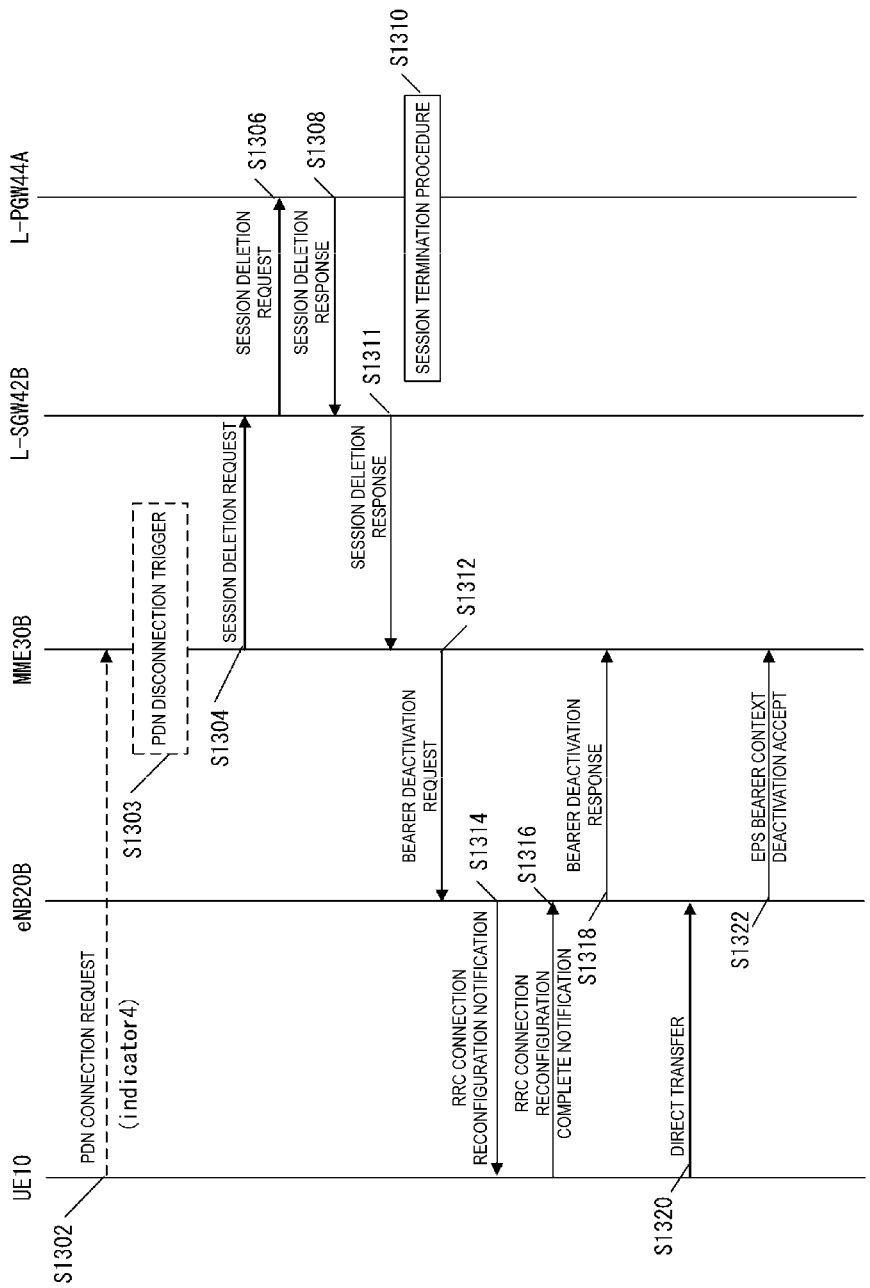
FIG. 13 is a diagram illustrating a PDN disconnection procedure according to the embodiment.

Next, the details of the PDN disconnection procedure (S610) described by using FIG. 6 will be described in FIG. 13. Through the PDN disconnection procedure, it is possible to delete the first PDN connection that is not optimal. It should be noted that the PDN disconnection procedure includes a PDN disconnection procedure requested to the UE 10 and a PDN disconnection procedure requested to the MME 30B. The PDN disconnection procedure requested to the UE is a UE-initiated PDN disconnection procedure that is started by the UE 10. Furthermore, the PDN disconnection procedure requested to the MME 30B is an MME 30B-initiated PDN disconnection procedure.

1.3.5.1 PDN Disconnection Procedure Requested to UE

Figure 12:
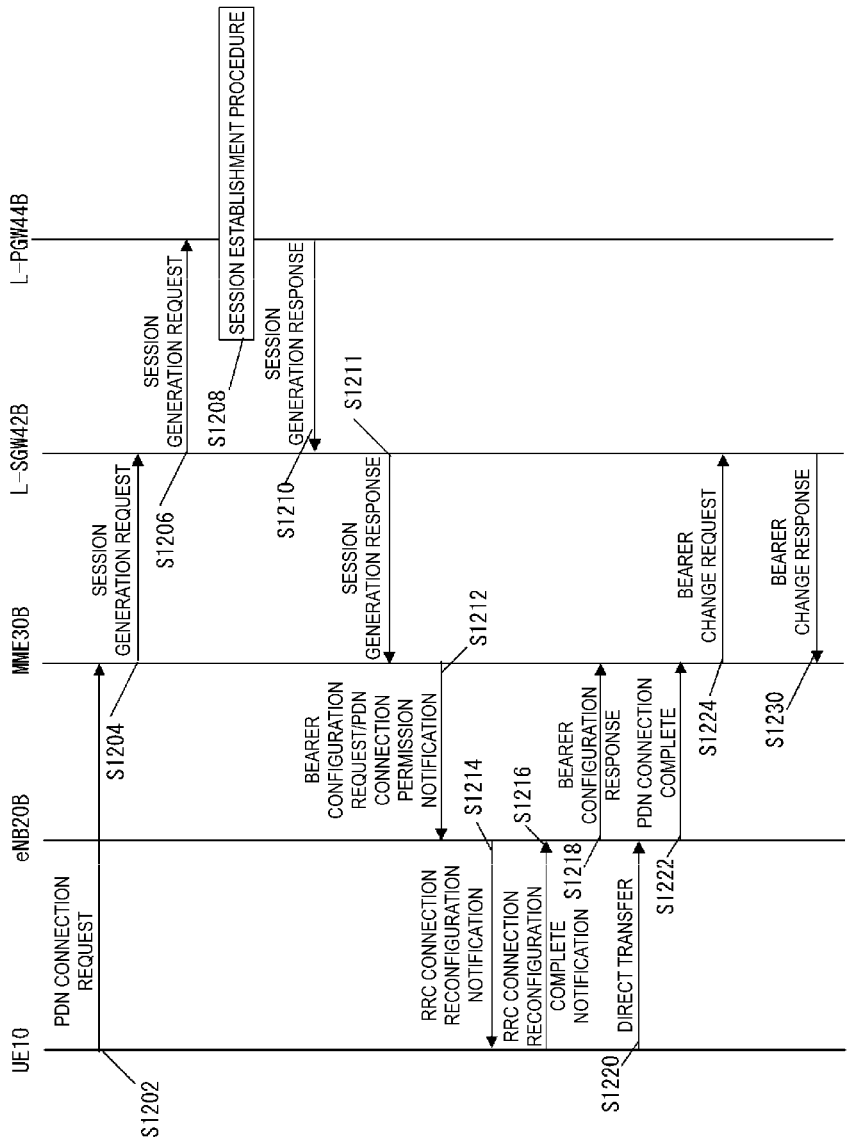
FIG. 12 is a diagram illustrating a PDN connectivity procedure according to the embodiment.

The UE 10 transmits a PDN disconnection request to the MME 30B (S1302). The PDN connectivity request transmitted here can be the same message as the PDN establishment request message for establishing the second PDN connection described in FIG. 12. That is, the UE 10 can request establishment of the second PDN connection and deletion of the first PDN connection by a single PDN connectivity request message.

In addition, the UE 10 can transmit the PDN connectivity request by including in it an indicator 4. The indicator 4 is information indicating that in the PDN connectivity request, the second PDN connection has been newly established and the non-optimal first PDN connection established by the UE 10 has been deleted.

It should be noted that the UE 10 can determine, on the basis of the capability information of the UE 10 such as the capability information 1 or the capability information 2, whether or not to include the indicator 4 in the PDN connectivity request. Alternatively, the UE 10 can determine whether to use indicator 4 on the basis of the permission information of the UE 10, such as the permission information 1 or the permission information 2.

Furthermore, a specific indicator 4 can serve as the permission information or capability information of the UE 10.

Methods other than the above have been described in the PDN connectivity request (1202), and thus a detailed description thereof is omitted. That is, in addition to the information elements described in the PDN connectivity request (1202), the UE 10 can perform transmission by including in it the indicator 4. Furthermore, in 1202, the UE 10 can perform transmission by including the indicator 4.

It should be noted that by including the LBI, bearer ID, PDN connection ID, APN, and PDN address that is associated with the first PDN connection, the UE 10 is capable of indicating reestablishment of the PDN connection.

It should be noted that the UE 10 can include in the PDN disconnection request, the information that is included in the PDN connection permission notification, indicating deletion of the non-optimal first PDN connection. The information indicating deletion of the PDN connection can be any one of the LBI, the bearer ID, the PDN connection ID, the APN, and the PDN address.

The MME 30B receives from the UE 10, the PDN connectivity request including the indicator 4. By receiving the indicator 4 included in the PDN connectivity request, the MME 30B detects reestablishment of the PDN connection. That is, the MME 30B performs a process for establishing a PDN connection and detects deletion of the non-optimal PDN connection.

Here, the MME 30B can judge, on the basis of the capability information such as the capability information 1 or the capability information 2, whether or not to detect reestablishment of the PDN connection. Furthermore, the MME 30B can judge, on the basis of the permission information of the UE 10 such as the permission information 1 or the permission information 2, whether or not to reestablish the PDN connection.

FIG. 14 shows the contents of the PDN connectivity request message. A PDN connectivity request message is transmitted from the UE 10 to the MME 30B.

As shown in FIG. 14, the PDN connectivity request includes a protocol identifier, an EPS bearer ID, a procedure processing ID, a PDN connectivity request message ID, a request type, a PDN type, an ESM information transfer flag, an access point name, protocol configuration options, device properties, and the indicator 4.

The protocol identifier includes a message regarding EPS movement management in the layer 3. The EPS bearer ID includes an identifier for identifying an EPS bearer. The procedure processing ID includes an identifier for identifying a procedure processing in layer 3.

The PDN connectivity request message ID includes an identification value indicating the PDN connectivity request. The request type includes information indicating whether or not it is a request by the UE 10 to establish a new connection. The request type includes any one information indicating that it is an initial request, information indicating handover, and information indicating that a connection to a PDN providing an emergency service has been requested. The PDN type includes information indicating an IP version supported by the UE 10. The PDN type includes information indicating only IPv4, information indicating only IPv6, and information indicating IPv4 and IPv6.

The ESM information transfer flag includes information indicating whether or not it is needed to protect ESM information (protocol configuration options, APN) by security when being transferred. The access point name includes an identifier that identifies an APN.

It is possible to include information regarding many protocols in the protocol configuration options. Information regarding IMS, information regarding IP address, information regarding encryption, etc. can be included.

The device properties include information indicating whether or not the UE 10 is configured with a process with low priority in a NAS signaling. It should be noted that the indicator 4 can have a name different from the indicator 4.

It should be noted that the indicator 4 may include an APN in which switching to a PDN connection having a different gateway is permitted. By receiving the APN in which CSIPTO is permitted, a process for establishing a PDN connection associated with the APN can be performed and deletion of the non-optimal PDN connection can be announced.

In addition, the indicator 4 can include the identification information of the first PDN connection. By transmitting the indicator 4, newly establishing the second PDN connection and deleting the first PDN connection can be requested.

It should be noted that the UE 10 can start the PDN disconnection procedure upon completion of the establishment of the second PDN connection. At this time, the PDN disconnection procedure can be started when the UE 10 transmits the PDN disconnection request to the MME 30B.

The UE 10 can determine to transmit the PDN disconnection request upon detecting that a PDN connection has been newly established. Furthermore, the UE 10 can make determine to transmit the PDN disconnection request on the basis of the information indicating deletion of the non-optimal first PDN connection, the information being included in the PDN connection permission notification from the MME 30B or the eNB 20B. It should be noted that the information indicating deletion of the non-optimal PDN connection includes a wide variety of identifiers, but can be any one of the LBI (information associated with the bearer ID), the bearer ID, the PDN connection ID, the APN, and the PDN address. Furthermore, the information indicating deletion of the non-optimal PDN connection can be a combination of the LBI, the bearer ID, the PDN connection ID, the APN, and the PDN address.

The MME 30B transmits a session deletion request to the L-SGW 44A (S1304). The L-SGW 44A transmits the session deletion request to the L-PGW 44A (S1306). The L-PGW 44A transmits a session deletion response to the L-SGW 44A (S1308). The L-SGW 42A transmits the session deletion response to the MME 30B (S1311). Meanwhile, the L-PGW 44A performs a session termination procedure (S1310).

In addition, the MME 30B transmits a bearer deactivation request (S1312). The eNB 20B transmits an RRC connection reconfiguration notification to the UE 10 (S1314).

The UE 10 transmits an RRC connection reconfiguration complete notification to the eNB 20B (S1316). The eNB 20B transmits a bearer deactivation response to the MME 30B (S1318).

Furthermore, the UE 10 transmits an eNB direct transfer (S1320). The eNB 20B transmits an EPS bearer context deactivation accept message to the MME 30B (S1322).

Through the above procedures, the UE 10 is capable of deleting the first PDN connection that is not optimal.

1.3.5.2 PDN Disconnection Procedure Requested to MME

Alternatively, disconnection of the first PDN connection can be initiated by the MME. A PDN connectivity procedure requested to the MME 30B will be described in FIG. 13. In the PDN disconnection procedure requested to the UE, the PDN disconnection procedure is started when the UE 10 transmits a PDN connectivity request including the indicator 4, and the MME 30B receives the PDN connectivity request including the indicator 4; however, in the PDN disconnection procedure requested to the MME, the PDN disconnection procedure is started without the MME 30 receiving the PDN connectivity request including the indicator 4 or a PDN disconnection request from the UE 10.

First, the MME 30B detects a trigger of PDN disconnection (S1303).

As a method by which the MME 30B detects the trigger of PDN disconnection, the trigger of PDN disconnection may be detected by the completion of establishment of the first PDN connection. For example, the MME 30B can detect, by receiving a bearer change response (S1230), that the PDN connection is established, then detect the trigger of PDN disconnection. It should be noted that the first PDN connection subject to deletion of the PDN connection can be judged on the basis of the information included in the bearer change response.

Here, when the MME relocation does not occur in accordance with the movement of the UE 10, the MME 30A can detect the trigger of PDN disconnection. It should be noted that the method by which the MME 30A detects the trigger of PDN disconnection can be utilized also by the MME 30B.

Subsequent procedures are similar procedures to the PDN disconnection procedure requested to the UE, and thus, a detailed description thereof is omitted. That is, the procedures from the transmission of session deletion request (S1304) to the transmission of EPS bearer context deactivation accept (S1322) are similar to the PDN disconnection procedure requested to the UE.

Through the above procedures, the UE 10 is capable of deleting the first PDN connection that is not optimal.

Thus, when the UE 10 moves and the non-optimal PDN connection is held, by performing a handover procedure and a tracking area update procedure as well as by performing a PDN connectivity procedure and a PDN disconnection procedure, it is possible to perform data exchange in which a non-optimal PDN connection is switched to an optimal PDN connection.

2. Modification

A procedure to switch a PDN connection for SIPTO has been described above; however, a PDN connection to be switched may be a PDN connection established between a gateway included in the core network 7 and the UE 10. In this case, a plurality of PGWs 60 (for example, PGW 60A and PGW 60B) is arranged in the core network 7.

In other words, the first PDN connection can be a PDN connection established between the UE 10 and the PGW 60A. Furthermore, the second PDN connection may be a PDN connection established between the UE 10 and the PGW 60B.

More specifically, as illustrated in FIG. 5B, the UE 10 can establish the first PDN connection with the PGW 60A via the eNB 20A and the SGW 50A. In addition, in accordance with the handover, it is possible to continue communication by using the first PDN connection. At that time, the first PDN connection becomes a PDN connection that connects the UE 10 and the PGW 60A via the eNB 20B and the SGW 50B.

The UE 10 detects that the first PDN connection is not an optimal communication path, and the UE 10 establishes the second PDN connection. Here, the second PDN connection is a PDN connection established between the UE 10 and the PGW 60B via the eNB 20B and the SGW 50B. Thus, the UE 10 may switch to an optimal communication path to continue communication.

It should be noted that processes of the SGW 50A, SGW 50B, PGW 60A, and PGW 60B can be similar to that of the L-SGW 42A, L-SGW 42B, L-PGW 44A, and L-PGW 44B, respectively. It should be noted that processes executed by the L-SGW 42A, L-SGW 42B, L-PGW 44A, and L-PGW 44B are as described above, and thus, a detailed description thereof is omitted.

Moreover, storage information and processes in each device including the UE 10 can serve as one in which the L-SGW 42A is replaced by the SGW 50A, the L-SGW 42B is replaced by the SGW 50B, the L-PGW 44A is replaced by the PGW 60A, and the L-PGW 44B is replaced by the PGW 60B.

For example, the information that is managed by the base station or the MME 30 and indicates a neighboring gateway of the eNB 20A can serve as identification information of the PGW 60A. Furthermore, the information of a neighboring gateway of the eNB 20B may be the PGW 60B.

Furthermore, the UE 10 can replace the APN used by the UE 10 from the APN 1 to the APN 3. That is, by executing a process with the APN 3, the process used to be executed with the APN 1, the UE 10 is capable of establishing the PDN connection 1 or the PDN connection 2.

In addition, the APN used by the UE 10 can be replaced from the APN 2 to the APN 4. That is, by executing a process with the APN 4, the process used to be executed with the APN 2, the UE 10 is capable of establishing the PDN connection 1 or the PDN connection 2.

Furthermore, it is possible to replace a process being executed with the APN 1 in the MME 30 till now to being executed with the APN 3.

Furthermore, it is possible to replace a process being executed with the APN 2 in the MME 30 till now to being executed with the APN 4.

In addition, the APN 4 is an APN in which switching to a PDN connection using a different gateway as an endpoint is permitted. Thus, it is possible to similarly perform processes, as they are, for each device such as the MME 30 etc. that are performed on the basis of the fact that switching to a PDN connection using, as an endpoint, a gateway with different APNs is permitted.

In this way, it is possible to apply a method described in the embodiments described above to the storage information and processes in each device including the UE 10, and thus, a detailed description thereof is omitted.

An embodiment and a plurality of modifications related thereto have been described above. Each modification may be independently applied to the embodiment, respectively. Furthermore, an embodiment of the present invention has been described in detail thus far with reference to the drawings, but the specific configuration is not limited to the embodiment. Other designs and the like that which do not depart from the essential spirit of the invention also fall within the scope of the patent claims.

Additionally, the programs run on the devices in the embodiments are programs that control a CPU and the like (programs that cause a computer to function) so as to realize the functions of the embodiments described above. The information handled by these devices is temporarily held in a transitory storage device (RAM, for example) at the time of processing, and is then stored in various storage devices such as a ROM and an HDD, read out by the CPU as necessary, and edited and written.

Here, a semiconductor medium (a ROM, a non-volatile memory card, or the like, for example), an optical recording medium/magneto-optical recording medium (a Digital Versatile Disc (DVD), a Magneto Optical Disc (MO), a Mini Disc (MD), a Compact Disc (CD), a BD, or the like, for example), a magnetic recording medium (magnetic tape, a flexible disk, or the like, for example), and the like can be given as examples of recording media for storing the programs. In addition to realizing the functions of the above-described embodiments by executing programs that have been loaded, there are also cases where the functions of the present invention are realized by the programs running cooperatively with an operating system, other application programs, or the like on the basis of instructions included in those programs.

When delivering these programs to market, the programs can be stored in a portable recording medium, or transferred to a server computer connected via a network such as the Internet. In this case, the storage device serving as the server computer is of course also included in the present invention.

Additionally, each device in the above-described embodiment may be partially or completely realized as Large Scale Integration (LSI), which is a typical integrated circuit. The functional blocks of each device may be individually realized as chips, or may be partially or completely integrated into a chip. Further, the circuit integration technique is not limited to LSI, and the integrated circuits may be realized as dedicated circuits or a multi-purpose processor. Furthermore, if advances in semiconductor technology produce circuit integration technology capable of replacing LSI, it is of course possible to use integrated circuits based on the technology.

REFERENCE SIGNS LIST

1 Mobile communication system
5 IP mobile communication network
7 Core network
9 LTE access network
10 UE
20 eNB
30 MME
40 LGW
50 SGW
60 PGW
70 HSS
80 PCRF
90 PDN

The invention claimed is:

1. A User Equipment (UE) comprising:
transmission and reception circuitry; and
a controller, wherein
  a first connection is a connection to a Data Network (DN) via a first anchor in a core network,
  the transmission and reception circuitry performs transmission and reception of data by using the first connection,
  in a first procedure for changing a connection anchor, the transmission and reception circuitry receives, from the core network, first information identifying the first connection, and
  after receiving the first information, the controller initiates a second procedure for establishing a second connection to the DN via a second anchor in the core network.

2. The UE according to claim 1, wherein
after moving transmission and reception of data from the first connection to the second connection, or after the second connection is established, the controller performs a third procedure for releasing the first connection.

3. The UE according to claim 1, wherein
the second connection is established with the same Access Point Name (APN) as the first connection.

4. A core network device comprising:
transmission and reception circuitry; and
a controller, wherein
  a first connection is a connection to a Data Network (DN) via a first anchor in a core network,
  the transmission and reception circuitry performs transmission and reception of data by using the first connection,
  in a first procedure for changing a connection anchor, the transmission and reception circuitry transmits, to a User Equipment (UE), first information identifying the first connection,
  after transmitting the first information, the controller performs a second procedure for establishing a second connection to the DN via a second anchor in the core network, and
  the second procedure is initiated by the UE.

5. The core network device according to claim 4, wherein
after moving transmission and reception of data from the first connection to the second connection, or after the second connection is established, the controller performs a third procedure for releasing the first connection.

6. The core network device according to claim 4, wherein
the second connection is established with the same Access Point Name (APN) as the first connection.

7. A communication control method performed by a User Equipment (UE), the communication control method comprising:
performing transmission and reception of data by using a first connection which is a connection to a Data Network (DN) via a first anchor in a core network;
in a first procedure for changing a connection anchor, receiving, from the core network, first information identifying the first connection; and
after receiving the first information, initiating a second procedure for establishing a second connection to the DN via a second anchor in the core network.

8. The communication control method performed by the UE according to claim 7, the communication control method further comprising:
after moving transmission and reception of data from the first connection to the second connection, or after the second connection is established, performing a third procedure for releasing the first connection.

9. The communication control method performed by the UE according to claim 7, wherein
the second connection is established with the same Access Point Name (APN) as the first connection.

10. A communication control method performed by a core network device, the communication control method comprising:
performing transmission and reception of data by using a first connection which is a connection to a Data Network (DN) via a first anchor in a core network;
in a first procedure for changing a connection anchor, transmitting, to a User Equipment (UE), first information identifying the first connection; and
after transmitting the first information, performing a second procedure for establishing a second connection to the DN via a second anchor in the core network,
wherein the second procedure is initiated by the UE.

11. The communication control method performed by the core network device according to claim 10, the communication control method further comprising:
after moving transmission and reception of data from the first connection to the second connection, or after the second connection is established, performing a third procedure for releasing the first connection.

12. The communication control method performed by the core network device according to claim 10, wherein
the second connection is established with the same Access Point Name (APN) as the first connection.

* * * * *

UNITED STATES PATENT AND TRADEMARK OFFICE
CERTIFICATE OF CORRECTION

| | | |
|---|---|---|
| PATENT NO. | : 10,972,946 B2 | Page 1 of 1 |
| APPLICATION NO. | : 16/212232 | |
| DATED | : April 6, 2021 | |
| INVENTOR(S) | : Masayuki Enomoto et al. | |

It is certified that error appears in the above-identified patent and that said Letters Patent is hereby corrected as shown below:

In the Claims

At Column 64, Lines 10-11 (Claim 7):
Change "User Equipment (LTE)," to -- User Equipment (UE) --

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*